US012543960B2

(12) United States Patent
Drori et al.

(10) Patent No.: US 12,543,960 B2
(45) Date of Patent: Feb. 10, 2026

(54) SYSTEMS AND METHODS FOR MONITORING THE FUNCTIONALITY OF A BLOOD VESSEL

(71) Applicant: PatenSee Ltd., Or Yehuda (IL)

(72) Inventors: Hagay Drori, Tel-Aviv (IL); Oz Moshe Seadia, Bat Yam (IL); Gal Goshen, Modiln (IL); Ruben Langer, Ramat HaSharon (IL)

(73) Assignee: PatenSee Ltd., Or Yehuda (IL)

( * ) Notice: Subject to any disclaimer, the term of this patent is extended or adjusted under 35 U.S.C. 154(b) by 881 days.

(21) Appl. No.: 17/769,796

(22) PCT Filed: Oct. 18, 2020

(86) PCT No.: PCT/IL2020/051100
§ 371 (c)(1),
(2) Date: Apr. 18, 2022

(87) PCT Pub. No.: WO2021/074920
PCT Pub. Date: Apr. 22, 2021

(65) Prior Publication Data
US 2022/0378300 A1    Dec. 1, 2022

Related U.S. Application Data

(63) Continuation-in-part of application No. 16/656,585, filed on Oct. 18, 2019.

(51) Int. Cl.
*A61B 5/02*     (2006.01)
*A61B 5/00*     (2006.01)

(52) U.S. Cl.
CPC ........ *A61B 5/02007* (2013.01); *A61B 5/0077* (2013.01); *A61B 5/0075* (2013.01)

(58) Field of Classification Search
None
See application file for complete search history.

(56) References Cited

U.S. PATENT DOCUMENTS

| 8,888,714 B1 | 11/2014 | Soto |
| 9,636,041 B2 | 5/2017 | Zalevsky et al. |

(Continued)

FOREIGN PATENT DOCUMENTS

| CN | 108348179 | 7/2018 |
| CN | 108939185 | 12/2018 |

(Continued)

OTHER PUBLICATIONS

Sahnan et al. ("innovation in the imaging of perianal fistula: a step toward personalized medicine"; Therapeutic Advances in Gastroenterology; vol. 11, 2018; hereinafter Sahnan).*

(Continued)

*Primary Examiner* — Shahdeep Mohammed

(57) ABSTRACT

A method for monitoring blood vessels, the method including using a system for monitoring blood vessel functionality to look, listen and feel blood vessel functionality by imaging a patient's body to obtain blood vessel geometry, imaging a patient body to obtain a shape of a location of the patient's body using image analysis, and analyzing vibrations of the patient's body at a location of the patient's body which includes the blood vessels. A method for monitoring blood vessel functionality, the method including illuminating one or more blood vessels through a patient's skin, capturing at least one image of the blood vessels, analyzing the at least one image, and calculating a parameter associated with blood vessel functionality based upon the image analysis. Related apparatus and methods are also described.

18 Claims, 30 Drawing Sheets

(56) References Cited

U.S. PATENT DOCUMENTS

| | | | |
|---|---|---|---|
| 9,668,672 | B2 | 6/2017 | Zalevsky et al. |
| 2002/0099286 | A1 | 7/2002 | Sandler et al. |
| 2008/0294037 | A1 | 11/2008 | Richter |
| 2009/0080757 | A1 | 3/2009 | Roger et al. |
| 2009/0287066 | A1 | 11/2009 | Meissner et al. |
| 2010/0130864 | A1 | 5/2010 | Donnelly |
| 2011/0103657 | A1 | 5/2011 | Kang |
| 2013/0245456 | A1 | 9/2013 | Ferguson, Jr. et al. |
| 2014/0148658 | A1 | 5/2014 | Zalevsky et al. |
| 2014/0236019 | A1 | 8/2014 | Rahum |
| 2015/0034255 | A1 | 2/2015 | Dendulk et al. |
| 2015/0265162 | A1* | 9/2015 | Lavi .................... A61B 6/5217 600/408 |
| 2016/0367154 | A1 | 12/2016 | Gladshtein et al. |
| 2017/0119258 | A1* | 5/2017 | Kotanko ................ G06T 7/20 |
| 2017/0209047 | A1 | 7/2017 | Zalevsky et al. |
| 2017/0231598 | A1 | 8/2017 | Baek et al. |
| 2017/0287132 | A1 | 10/2017 | Ertel et al. |
| 2017/0337412 | A1 | 11/2017 | Bhat et al. |
| 2018/0000354 | A1 | 1/2018 | DeBusschere et al. |
| 2018/0078216 | A1* | 3/2018 | Baker .................. A61B 3/0025 |
| 2018/0250463 | A1 | 9/2018 | Olivarez |
| 2018/0326142 | A1 | 11/2018 | Perng et al. |
| 2019/0223958 | A1* | 7/2019 | Kohli .................. A61B 8/4427 |
| 2021/0015991 | A1 | 1/2021 | Drori et al. |
| 2022/0142484 | A1* | 5/2022 | DiMaio ................ G16H 30/40 |

FOREIGN PATENT DOCUMENTS

| | | |
|---|---|---|
| JP | 2009-254678 | 11/2009 |
| JP | 2015-61605 | 4/2015 |
| WO | WO 2017/191639 | 11/2017 |
| WO | WO 2021/074920 | 4/2021 |

OTHER PUBLICATIONS

Interview Summary Dated Mar. 28, 2024 from the US Patent and Trademark Office Re. U.S. Appl. No. 16/656,585. (2 pages).

Final Official Action Dated Nov. 3, 2022 from the US Patent and Trademark Office Re. U.S. Appl. No. 16/656,585. (25 pages).

Sharma et al. "Arteriovenous Fistula (AVF) Monitoring and Surveillance", Clinical Queries: Nephrology, 3(1): 46-50, Jan.-Mar. 2014.

Official Action Dated Dec. 7, 2023 from the US Patent and Trademark Office Re. U.S. Appl. No. 16/656,585. (28 pages).

Official Action Dated Jul. 18, 2024 From the US Patent and Trademark Office Re. U.S. Appl. No. 16/656,585. (13 Pages).

Razi et al. "Acquired Arteriovenous Fistula at an Unusual Site", American Journal of Roentgenology, 188(6): 547-549, Jun. 2007.

Official Action Dated Dec. 18, 2024 From the US Patent and Trademark Office Re. U.S. Appl. No. 16/656,585. (31 Pages).

Notice of Reason(s) for Rejection Dated Aug. 6, 2024 From the Japan Patent Office Re. Application No. 2022-523145 and Its Translation Into English. (11 Pages).

Advisory Action Dated Nov. 4, 2024 together with Interview Summary from the US Patent and Trademark Office Re. U.S. Appl. No. 16/656,585. (7 pages).

Hill et al. "Examination of the Extremities: Pulses, Bruits, and Phlebitis", Clinical Methods: The History, Physical, and Laboratory Examinations. 3rd edition, 148-152, 1990.

International Preliminary Report on Patentability Dated Apr. 28, 2022 From the International Bureau of WIPO Re. Application No. PCT/IL2020/051100. (9 Pages).

International Search Report and the Written Opinion Dated Jan. 27, 2021 From the International Searching Authority Re. Application No. PCT/IL2020/051100. (20 Pages).

Official Action Dated Jan. 21, 2022 from US Patent and Trademark Office Re. U.S. Appl. No. 16/656,585. (25 pages).

Besarab "Access Monitoring Is Worthwhile and Valuable", Blood Purification, 24(1): 77-89, 2006.

Krizhevsky et al. "ImageNet Classification With Deep Convolutional Neural Networks", Communication of the ACM, 60(6): 84-90, Jun. 2017.

Malindretos et al. "Computer-Assisted Sound Analysis of Arteriovenous Fistula in Hemodialysis Patients", The International Journal of Artificial Organs, 37(2): 173-176, Published Online Nov. 29, 2013.

Miller et al. "Spectral Analysis of Arterial Bruits (Phonoangiography): Experimental Validation", Circulation, 61(3): 515-520, Mar. 1980.

Noor "Non-Imaging Acoustical Properties in Monitoring Arteriovenous Hemodialysis Access. A Review", Journal of Engineering and Technological Sciences, 47(6): 658-673, Dec. 31, 2015.

Rajabi-Jaghargh et al. "Combined Functional and Anatomical Diagnostic Endpoints for Assessing Arteriovenous Fistula Dysfunction", World Journal of Nephrology, 4(1): 6-18, Published Online Feb. 6, 2015.

Schmidli et al. "Vascular Access: 2018 Clinical Practice Guidelines of the European Society for Vascular Surgery (ESVR)", European Journal of Vascular and Endovascular Surgery, p. 1-62, 2018.

Turmel-Rodrigues et al. "Slavage of Immature Forearm Fistulas for Haemodialysis by Interventional Radiology", Nephrology, Dialysis, Transplantation, 16(12): 2365-2371, Dec. 2001.

Zalevsky et al. "Simultaneous Remote Extraction of Multiple Speech Sources and Heart Beats From Secondary Speckles Pattern", Optics Express, 17(24): 21566-21580, Published Online Nov. 11, 2009.

Supplementary European Search Report and the European Search Opinion Dated Oct. 24, 2023 From the European Patent Office Re. Application No. 20876006.6. (9 Pages).

Notification of Office Action and Search Report Dated Jun. 13, 2025 From the State Intellectual Property Office of the People's Republic of China Re. Application No. 202080088222.7 with English Summary and Machine Translation of Office Action. (21 Pages).

Official Action Dated Jun. 27, 2025 from the US Patent and Trademark Office Re. U.S. Appl. No. 16/656,585. (32 pages).

Xu et al. "Application of Ultrasound Combined with CT Angiography in Ostomy for Patients with Uremia Undergoing Hemodialysis", Chinese Journal of CT and MRI, 15(7): 123-126, Jul. 2017. (Abstract).

Official Action Dated Nov. 19, 2025 from the US Patent and Trademark Office Re. U.S. Appl. No. 16/656,585. (35 Pages).

Kazmi et al. "Flux or Speed? Examining Speckle Contrast Imaging of Vascular Flows", Biomedical Optics Express, 6 (7): 2588-2608, Jun. 18, 2015.

* cited by examiner

| Exam Steps | Fistula (Normal) | Graft (Normal) | Flow-related Dysfunction or Poor Maturation (Abnormal) | Infection, Steal Syndrome, or Aneurysm/Pseudoaneurysm (Abnormal) |
|---|---|---|---|---|
| Look | Well-developed main venous outflow, no irregular/dilated areas or aneurysm formations, adequate areas of straight vein that can be used for 2 needle, rope-ladder cannulation. Vessel collapses when arm is elevated above head. | Uniform sized graft in a loop or straight configuration. No irregular areas or aneurysms or serous formations with organized scar retention used for cannulation. | AVF with poor maturation – multiple venous outflow veins (accessory veins), poorly defined cannulation areas. AVF: Stenosis can occur in artery or any venous outflow vein. Look for a narrowing of the outflow vein, abnormal pulsations or aneurysm formations. AVF or AVG: Dilated neck veins or surface collateral veins in the arm or neck observe the vascular access. | Infection: Redness, swelling, induration, drainage or pus. Steal Syndrome: Extremity / hand discoloration, skin ulceration due to poor arterial blood flow to the hand. Check nail beds, fingers and hand for unusual skin changes. Aneurysm: abnormal areas of dilatations with overlying skin thinning. |
| Listen with a stethoscope | Low pitch continuous diastolic and systolic | Low pitch continuous diastolic and systolic | High pitch discontinuous systolic only | Steal Syndrome: AVF may have a very strong bruit |
| Feel with your fingers | Thrill at the arterial anastomosis and throughout the entire outflow vein that is easy to compress | Thrill strongest at the arterial anastomosis, but should be felt over entire graft and easy to compress | AVF: Pulse at the site of a stenotic lesion – may be water hammer in quality and feel. AVG: Thrill and/or pulse strong at the site of stenotic lesions pulse has a water hammer feel. An AVG with a low intra-access blood flow feels mushy. Local area of the graft that feels mushy or irregular in shape can be a sites of aneurysm formation. | Infection: Warm or painful to touch, swelling (hands and fingers) and compare for the access limb to be the same as the nonaccess limb. Compare temperature, grip strength and range of motion, and any complaints of changes in sensation or pain. If the access limb has any major differences than the nonaccess limb, consider steal syndrome. |

FIG. 16A

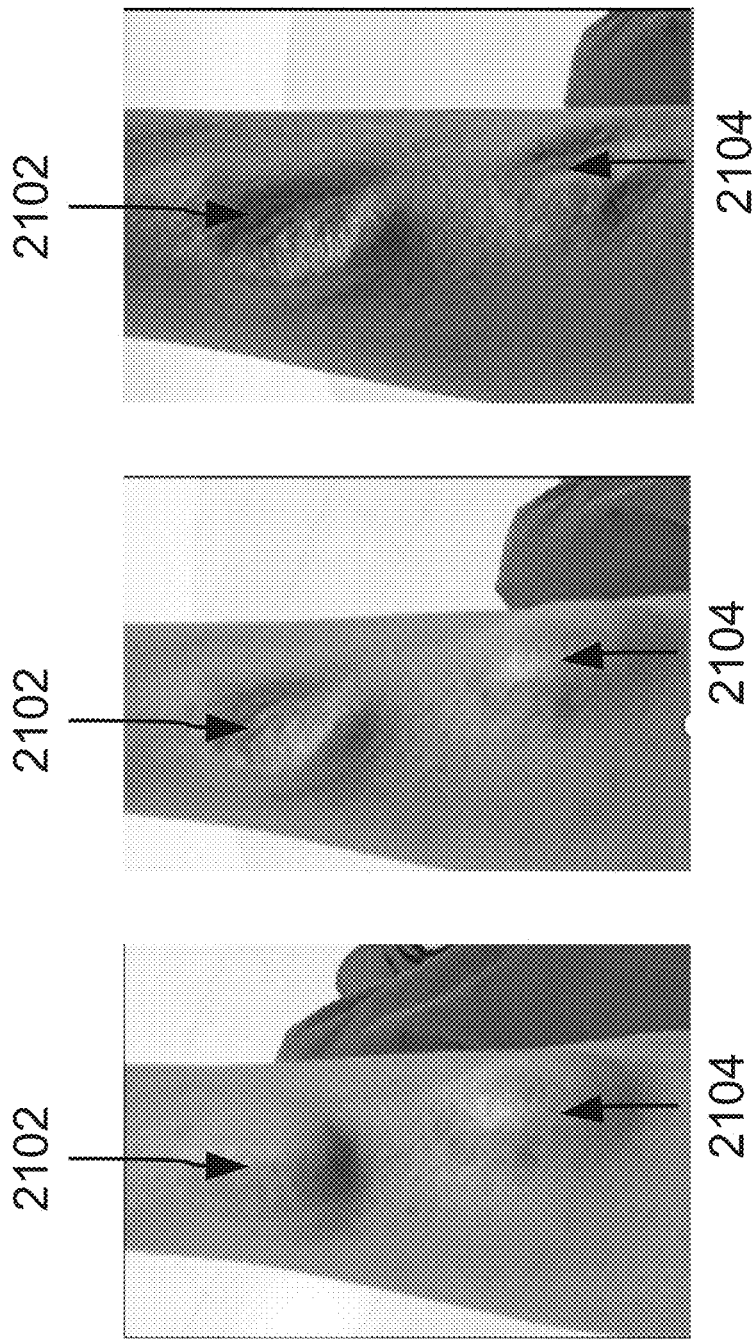

SYSTEMS AND METHODS FOR MONITORING THE FUNCTIONALITY OF A BLOOD VESSEL

RELATED APPLICATIONS

This application is a National Phase of PCT Patent Application No. PCT/IL2020/051100 having International filing date of Oct. 18, 2020, which is a Continuation-in-Part of U.S. patent application Ser. No. 16/656,585 filed on Oct. 18, 2019. The contents of the above applications are all incorporated by reference as if fully set forth herein in their entirety.

FIELD AND BACKGROUND OF THE INVENTION

The invention relates generally to the field of monitoring blood vessels in patients. Some aspects relate more particularly to early diagnosis of failure in blood vessel functionality, and even more particularly to early detection of failure of vascular access in patients undergoing hemodialysis treatments. Some aspects relate more particularly to measurements of fistulas.

Dialysis vascular access (VA, fistula or graft) makes life-saving hemodialysis treatments possible but also prone to access related problems.

The term "VA", or "vascular access", in all its grammatical forms, is used throughout the present specification and claims to mean all types of vascular access constructs, biological as well as synthetic, including, by way of some non-limiting examples, an arteriovenous fistula (AV), a synthetic graft, and an intravenous catheter.

One type of long-term access is an AV fistula. A surgeon connects an artery to a vein, usually in an arm or leg, to create an AV fistula. When the surgeon connects the artery to the vein, the vein grows wider and thicker, making it easier to place needles for dialysis. The AV fistula also has a large diameter that allows blood to flow out and back into a body quickly. A goal of an AV fistula is to allow high blood flow so that a large amount of blood can pass through a dialyzer.

- Over 25% of hospitalizations in hemodialysis (HD) patients in the United States are access related.
- Over 30,000 patients required dialysis-related arteriovenous thrombectomy in 2013.

The annual cost of access morbidity has been estimated at close to $1 billion.

VA function and patency are essential for optimal management of HD patients. Low VA flow and loss of patency limit hemodialysis delivery, extend treatment times, and may result in under-dialysis that leads to increased morbidity and mortality. In long-term VAs, especially grafts, thrombosis is the leading cause of loss of VA patency and increases healthcare expenditure.

The basic concept for VA monitoring and surveillance is that progressive stenoses develop over variable intervals in the great majority of VAs and, if detected and corrected (corrective procedure such as percutaneous transluminal angioplasty—PTA), under-dialysis can be minimized or avoided (dialysis dose protection) and the rate of thrombosis can be reduced. A number of monitoring and surveillance methods are available: sequential VA flow, sequential dynamic or static pressures, recirculation measurements, and physical examination.

Monitoring is the examination and evaluation of the VA to diagnose VA dysfunction using physical examination, usually within the HD unit, in order to detect the presence of dysfunction and correctable lesions before VA loss.

Physical examination can be used as a monitoring tool to exclude low flow associated with impending fistula and graft failures. Typically, there are 3 components to the VA examination: inspection, palpation, and auscultation.

A simple inspection can reveal the presence of swelling, ischemic fingers, aneurysms, and rich collateral veins. A strong pulse and weak thrill in the vein central to the anastomosis indicates a draining vein stenosis. Strictures can be palpated, and the intensity and character of the bruits can suggest the location of stenoses. A local intensification of bruit over the graft or the venous anastomosis compared with the adjacent segment suggests a stricture or stenosis. Physical examination can also include the elevation test, which consists of the elevation of the extremity with the VA and examination of the normal collapse of the access. The test is considered normal when the fistula collapses after the organ is elevated above the heart level of the patient.

Additional background art includes:

Besarab et al, "Access Monitoring Is Worthwhile and Valuable", Blood Purif 2006; 24:77-89, February 2006;

Ehsan Rajabi-Jaghargh, Rupak K Banerjee, "Combined functional and anatomical diagnostic endpoints for assessing arteriovenous fistula dysfunction" World J Nephrol 2015 Feb. 6; 4(1): 6-18 ISSN 2220-6124;

Luc Turmel-Rodrigues, "Salvage of immature forearm fistulas for haemodialysis by interventional radiology", Nephrol Dial Transplant. 2001 December; 16(12):2365-71; and Jürg Schmidli et al., Editor's Choice e Vascular Access: 2018 Clinical Practice Guidelines of the European Society for Vascular Surgery (ESVS) Eur J Vasc Endovasc Surg (2018) 55, 757e818.

The disclosures of all references mentioned above and throughout the present specification, as well as the disclosures of all references mentioned in those references, are hereby incorporated herein by reference.

SUMMARY OF THE INVENTION

The invention relates generally to automating monitoring of blood vessels in patients, more particularly to early diagnosis of failure in blood vessel functionality, and even more particularly to early detection of failure of vascular access in patients undergoing hemodialysis treatments.

According to an aspect of some embodiments of the present invention there is provided a system for monitoring blood vessel functionality, including an illumination source, a detector, a display, a processor configured to identify a change in pulse wave velocity relative to a baseline measurement, identify a change in at least one parameter indicative of development of one or more collateral vessels relative to a baseline measurement, identify a change in the diameter of the blood vessel relative to a baseline measurement, identify a change in the blood vessel's spectroscopy analysis, correlate the identified changes, and determine the probability of failure of the blood vessel's functionality failure based on the correlated identified changes.

According to some embodiments of the invention, the at least one parameter indicative of development of one or more collateral vessels includes one or more of shape, density and distance from the blood vessel.

According to some embodiments of the invention, the processor is configured to calculate the rate of change in at least one of pulse wave velocity, the at least one parameter indicative of development of one or more collateral vessels, the diameter of the blood vessel and the blood vessel's spectroscopy analysis.

According to some embodiments of the invention, the blood vessel is in an arm of a patient, and the processor is further configured to identify a change in the collapse of the blood vessel when the patient's arm or leg is elevated.

According to some embodiments of the invention, the processor is further configured to calculate the rate of changes in the collapse of the blood vessel when the patient's arm or leg is elevated.

According to some embodiments of the invention, the processor is further configured to identify changes in the composition of the blood flowing within the blood vessel.

According to an aspect of some embodiments of the present invention there is provided a system for monitoring blood vessel functionality, including an illumination source, a detector, a display, a processor configured to identify a change in at least one parameter indicative of development of one or more collateral vessels relative to baseline measurement, determine the probability of failure of the blood vessel's functionality based on the identified change.

According to some embodiments of the invention, the processor is further configured to identify changes relative to baseline measurements in one or more of pulse wave velocity, the diameter of the blood vessel and the blood vessel's spectroscopy analysis, correlate the change identified in the one or more of pulse wave velocity, the blood vessel's diameter and the blood vessel's spectroscopy analysis with the change identified in the at least one parameter indicative of development of one or more collateral vessels, and determine the probability of failure of the blood vessel's functionality based on the correlated changes.

According to some embodiments of the invention, the blood vessel is positioned in an arm or leg of a patient, and the processor is further configured to identify a change in the collapse of the blood vessel when the patient's arm or leg is elevated, correlate the change identified in the collapse of the blood vessel when the patient's arm or leg is elevated with the change identified in the at least one parameter indicative of development of one or more collateral vessels, and determine the probability of failure of the blood vessel's functionality based on the correlated changes.

According to an aspect of some embodiments of the present invention there is provided a method for monitoring blood vessel functionality, including identifying changes in pulse wave velocity relative to baseline measurements, identifying changes in parameters indicative of collateral vessels development relative to baseline measurements, identifying changes in the blood vessel's diameter relative to baseline measurement, correlating the identified changes, and determining the probability of failure of the blood vessel's functionality based on the correlated identified changes.

According to some embodiments of the invention, further including the step of calculating the rate of change in at least one of pulse wave velocity, the at least one parameter indicative of development of one or more collateral vessels and the blood vessel's diameter.

According to an aspect of some embodiments of the present invention there is provided a method for monitoring blood vessel functionality, including identifying changes in at least one parameter indicative of development of one or more collateral vessels relative to baseline measurement, and determining the probability of failure of the blood vessel's functionality based on the identified changes.

According to some embodiments of the invention, further including identifying changes relative to baseline measurements in one or more of pulse wave velocity, the blood vessel's diameter and the bloods vessel's spectroscopy analysis, correlating the changes identified in the one or more of pulse wave velocity, the diameter of the blood vessel the bloods vessel's spectroscopy analysis, with the change identified in the at least one parameter indicative of development of one or more collateral vessels, and determining the probability of failure of the blood vessel's functionality based on the correlated changes.

According to some embodiments of the invention, the blood vessel is in an arm or leg of a patient, and the method further includes identifying changes in the collapse of the blood vessel when the patient's arm or leg is elevated, correlating the changes identified in the collapse of the blood vessel when the patient's arm or leg is elevated with the change identified in the at least one parameter indicative of development of one or more collateral vessels, and determining the probability of failure of the blood vessel's functionality based on the correlated changes.

According to some embodiments of the invention, the method further includes the step of identifying changes in the composition of the blood flowing within the blood vessel.

According to some embodiments of the invention, the blood vessel is in an arm or leg of a patient and the measurements are taken while the patient's arm or leg is positioned approximately parallel to the ground.

According to some embodiments of the invention, the blood vessel is in an arm or leg of a patient and the measurements are taken while the patient's arm or leg is positioned approximately perpendicular to the ground.

According to some embodiments of the invention, the blood vessel is in an arm or leg of a patient and the measurements are taken while the patient's arm or leg is positioned lower than the patient's heart.

According to some embodiments of the invention, the blood vessel is in an arm or leg of a patient and the measurements are taken while the patient's arm or leg is positioned higher than the patient's heart.

According to an aspect of some embodiments of the present invention there is provided a method for monitoring blood vessel functionality, the method including illuminating one or more blood vessels through a patient's skin, capturing at least one image of the blood vessels, analyzing the at least one image, and calculating a parameter associated with blood vessel functionality based upon the image analysis.

According to some embodiments of the invention, further including automatically detecting a location of vascular access (VA) in the at least one image.

According to some embodiments of the invention, further including automatically detecting a location of a fistula in the at least one image.

According to some embodiments of the invention, further including a physician marking a location of vascular access (VA) in the at least one image.

According to some embodiments of the invention, wherein the capturing at least one image of the blood vessels is performed by a device configured to provide an image including at least one artery and at least one vein under the patient's skin.

According to some embodiments of the invention, wherein the illuminating one or more blood vessels through a patient's skin includes trans-illuminating the patient's organ.

According to some embodiments of the invention, wherein the calculating a parameter associated with blood vessel functionality includes calculating at least one parameter selected from a group consisting of pulse wave velocity, a parameter indicative of development of one or more collateral vessels, a count of collateral vessels, a diameter of a blood vessel, the blood vessel's spectral analysis, a size of an arteriovenous fistula, and a size of a synthetic graft VA.

According to some embodiments of the invention, further including estimating a probability of failure of a blood vessel's functionality based on the parameter.

According to some embodiments of the invention, further including calculating a rate of change of one or more of the parameters based on performing several measurements, at different times, of the one or more of the parameters, some of the measurements based on historical data associated with the patient retrieved from a database.

According to some embodiments of the invention, further including estimating a probability of failure of a blood vessel's functionality based on the rate of change of the one or more of the parameters.

According to some embodiments of the invention, further including estimating a maturity of a VA based on the rate of change of the one or more of the parameters.

According to some embodiments of the invention, further including automatically detecting collateral veins by counting a number of veins in a specific image area in different images taken at different times.

According to some embodiments of the invention, wherein the automatically detecting a location of vascular access (VA) in the at least one image includes detect the location of the VA by detecting a meeting of a vein and an artery.

According to some embodiments of the invention, wherein the detecting a meeting of a vein and an artery is performed using a device capable of providing an image of both an artery and a vein under the patient's skin.

According to some embodiments of the invention, wherein the automatically detecting a location of vascular access (VA) in the at least one image includes performing spectral analysis of the at least one image.

According to some embodiments of the invention, further including measuring a pulse wave parameter by detecting a pulse wave location in two images taken at different times and comparing the pulse wave location in the two images.

According to some embodiments of the invention, further including measuring pulse wave velocity by detecting a pulse wave location in two images and dividing a distance along a center line of a blood vessel in the two images by a time difference between capturing the two images.

According to an aspect of some embodiments of the present invention there is provided a method for replacing a physical examination performed by medical staff for monitoring blood vessel functionality in dialysis patients, the method including producing at least one image of a patient organ instead of manually manipulating the patient's organ, analyzing the at least one image, and classifying the patient's status to be one of suitable for dialysis or at risk for stenosis.

According to some embodiments of the invention, further including illuminating one or more blood vessels through a patient's skin, and wherein the analyzing the at least one image includes calculating a parameter associated with blood vessel functionality based upon the image analysis.

According to an aspect of some embodiments of the present invention there is provided a system for monitoring blood vessel functionality, the system including an illuminator configured to illuminate a patient's blood vessels through the patient's skin, a camera configured to capture at least one image of the blood vessels through the patient' skin, an image analyzer configured to process the at least one image, a calculator configured to calculate a parameter associated with blood vessel functionality based upon the image analysis, a classifier configured to classify the patient's status to be one of suitable for dialysis or at risk for dialysis, and a display configured to provide a report of at least one of the patient' status and a parameter associated with blood vessel functionality to a caregiver.

According to an aspect of some embodiments of the present invention there is provided a system and methods for measuring parameter related to fistulas.

In some embodiments, there is provided a system which includes optical apparatus to acquire one or more images of the same patient's fistula along a surveillance period.

In some embodiments, one or more measurements and/or features are optionally extracted from the image(s)—and their changes over time are optionally monitored. In some embodiments, the features are timeline derivatives of parameters measured or estimated in the image(s), by way of a non-limiting example changes in number & size of collateral veins happening over a period of time, such as days/weeks/month.

In some embodiment, a feature of interest is derived from a graph representation of the identified blood vessels, and or changes over time of this representation, by way of a non-limiting example changes in the number of junctions, average or distribution of number of bifurcations in graph junctions.

In some embodiments, using a machine-learning-derived method to identify a pattern within the above changes which may potentially lead to a significant clinical end point (e.g. Stenosis of the fistula) before there are clinical signs or symptoms which human nurses can identify.

In some embodiments, a system is provided which measures parameters relating to a fistula by optical means.

In some embodiments, structured light is projected onto a patient's body or limb, and the body is imaged. In some embodiments, the structured light may include horizontal and/or vertical stripes of equal or different widths and/or various light patterns other than stripes.

In some embodiments, imaging the structured light is used to provide information about an extent of the fistula, by way of some non-limiting examples: length of a long axis of the fistula along the body; breadth of a short axis of the fistula along the body; shape of the fistula as it appears in the image; shape and/or segmentation of the fistula circumference; an eccentricity index and/or an aspect ratio of the fistula or each segment of the fistula, a smoothness and/or roughness index of the fistula outline.

In some embodiments, structured light patterns are projected onto a patient's body or limb, and the body is imaged, providing information about a three-dimensional shape of the fistula or body organ, such as arm, leg.

In some embodiments, the system identifies changes in the shape of the fistula and/or body organ. In some embodiments, a projector is used to project one or more light patterns (e.g. structured light). In some embodiments, a method measures and/or estimates how the patterns deform on a patient's organ to measure the organ's shape and shape changes over time.

In some embodiments, structured light patterns are projected onto a patient's body or limb, and the body is imaged, providing information about a three-dimensional shape of the fistula, for example one or more of: a volume of the whole fistula or of segments of the fistula (e.g. needle insertion points), characteristics and variance of curvature, changes in shape/volume of an underlying arm/organ section near the fistula, and three dimensional surface features, for example smoothness and/or roughness.

In some embodiments, Laser Speckle Interferometry (LSI) is used. In some embodiments, LSI is used to record and look at vibrations of the fistula surface that correlate with the blood flow and turbulence inside. Changes in the blood flow and turbulence are typically correlated with stenosis events, and potential development of clinical conditions.

In some embodiments, imaging the speckled light is used to provide information about dynamic effects in the fistula, for example heart pulse, blood flow turbulence, and optionally produce spectrograms of vibrations of a fistula.

In some embodiments, images of the body are taken some period of time apart, and differences between the images are optionally used to determine differences in the shape of the fistula.

In some embodiments, the images are taken days, weeks, months or years apart, and differences between the images is optionally used to measure and/or monitor changes in size or shape of the fistula.

In some embodiments, the images are taken seconds or minutes apart, for example with a limb such as a hand held horizontally followed by the hand held vertically, and differences between the images is optionally used to measure and/or monitor whether at least some of the blood in the fistula can evacuate the fistula, a rate of blood evacuation and/or degree of evacuation from the fistula or specific portions of the fistula, such as, for example, a collapse of needle insertion points.

In some embodiments, the images are taken fractions of a second apart, as a video clip or movie, and differences between image frames is optionally used to measure and/or monitor dynamic parameter related to the fistula, such as heart pulse, blood flow turbulence, and optionally produce spectrograms of vibrations of a fistula.

In some embodiments, an analysis is made of changes in the dynamic parameters relate to the fistula between imaging sessions, to monitor changes in the fistula and the patient's conditions.

In some embodiments, performing the above together with Near IR imaging potentially enables collecting data that correlates with examinations required to be perform by nurses and/or physicians and that is already clinically proven to have predictive value to identify stenosis events.

According to an aspect of some embodiments of the present invention there is provided a system and methods for implementing and recording more than one technique or modality, for example one or more of structured light; laser speckle interferometry; image analysis and Near IR imaging modalities, using one imaging device.

In some embodiments, the system includes a processor and an imaging device which includes a Digital Light Processing (DLP) projector and a Near IR camera.

According to an aspect of some embodiments of the present disclosure there is provided a method for monitoring blood vessels, the method including using a system for monitoring blood vessel functionality to look, listen and feel blood vessel functionality by imaging a patient's body to obtain blood vessel geometry, imaging a patient body to obtain a shape of a location of the patient's body using image analysis, and analyzing vibrations of the patient's body at a location of the patient's body which includes the blood vessels.

According to some embodiments of the disclosure, obtaining the shape of the location of the patient's body includes illuminating the location using structured lighting.

According to some embodiments of the disclosure, the analyzing vibrations includes illuminating using Laser Speckle Interferometry (LSI).

According to some embodiments of the disclosure, the illuminating using LSI is performed at a location based on obtaining the shape of the location of the patient's body using image analysis.

According to some embodiments of the disclosure, the illuminating using LSI at the location is performed automatically by controlling a Digital Light Processing (DLP) projector.

According to some embodiments of the disclosure, the illuminating using LSI is performed by a physician guiding LSI illumination to a location of the patient's body.

According to some embodiments of the disclosure, obtaining the shape of the location of the patient's body includes calculating a three-dimensional (3D) shape of the patient's fistula.

According to some embodiments of the disclosure, a rate of evacuation of the patient's fistula is calculated based on changes in the 3D shape of the patient's fistula.

According to some embodiments of the disclosure, performed during an elevation test.

According to some embodiments of the disclosure, one or more parameters associated with blood vessel functionality are calculated based upon the image analysis.

According to some embodiments of the disclosure, an estimation of a probability of failure of a blood vessel's functionality is calculated based on the one or more parameters.

According to some embodiments of the disclosure, an estimation when a blood vessel is likely to fail is calculated based on the one or more parameters.

According to some embodiments of the disclosure, an estimation of a probability of failure of a blood vessel's functionality is calculated based on the rate of change of the one or more parameters.

According to some embodiments of the disclosure, an estimation of a maturity of a VA is calculated based on the rate of change of the one or more parameters.

According to some embodiments of the disclosure, the calculating one or more parameters includes calculating a parameter indicative of development of one or more collateral vessels.

According to some embodiments of the disclosure, the calculating one or more parameters includes calculating a count of collateral vessels.

According to some embodiments of the disclosure, collateral veins are automatically detected by counting a number of veins in a specific image area in different images taken at different times.

According to some embodiments of the disclosure, a location of vascular access (VA) is automatically detected by detecting a meeting of a vein and an artery.

According to some embodiments of the disclosure, the image analysis includes automatically detecting a location of vascular access (VA) in at least one image.

According to some embodiments of the disclosure, the image analysis includes automatically detecting a location of a fistula in at least one image.

According to some embodiments of the disclosure, the looking at a patient's blood vessel geometry includes capturing an image including at least one artery and at least one vein under the patient's skin.

According to some embodiments of the disclosure, the patient's body is illuminated using Near Infra-Red wavelengths.

According to some embodiments of the disclosure, the illuminating includes using a Digital Light Processing (DLP) projector.

According to some embodiments of the disclosure, the analyzing vibrations of the patient's body includes analyzing intensity of light at a specific location in images of the location of the patient's body which includes the blood vessels.

According to some embodiments of the disclosure, the spectrum is produced by producing a vector of light intensity at the specific location and producing a spectrum of vibrations by transforming the vector of intensity to a vector of frequencies.

According to some embodiments of the disclosure, the analyzing vibrations includes analyzing a spectrum of vibrations over a range of vibration frequencies. According to some embodiments of the disclosure, the spectrum of vibrations is in a range corresponding to human-audible frequencies. According to some embodiments of the disclosure, the spectrum of vibrations is in a range corresponding to frequencies below human-audible frequencies. According to some embodiments of the disclosure, the analyzing body vibrations is in a range of frequencies less than 1,000 Hz.

According to some embodiments of the disclosure, analyzing vibrations of the patient's body is done by analyzing images captured at a frame rate greater than 150 Frames Per Second (FPS). According to some embodiments of the disclosure, the analyzing vibrations of the patient's body is done by analyzing images captured at a frame rate greater than 500 Frames Per Second (FPS).

According to some embodiments of the disclosure, the analyzing vibrations of the patient's body is done by analyzing selected pixels within captured images.

According to some embodiments of the disclosure, a pulse wave parameter is measured by detecting a pulse wave location in two images taken at different times and comparing the pulse wave location in the two images.

According to some embodiments of the disclosure, pulse wave velocity is measured by detecting a pulse wave location in two images and dividing a distance along a center line of a blood vessel in the two images by a time difference between capturing the two images.

According to an aspect of some embodiments of the present disclosure there is provided a method for replacing a physical examination performed by medical staff for monitoring blood vessel functionality, the method including producing at least one image of a patient organ, analyzing the at least one image, and producing parameter values associated with blood vessel functionality.

According to some embodiments of the disclosure, further including classifying the patient's status to be one of suitable for dialysis or at risk for stenosis.

According to some embodiments of the disclosure, one or more blood vessels are illuminated through a patient's skin, and the analyzing the at least one image includes calculating a parameter associated with blood vessel functionality based upon the image analysis.

According to some embodiments of the disclosure, the method is used instead of a medical practitioner performing a look listen and feel examination.

According to some embodiments of the disclosure, the method is performed by a device without the device contacting a fistula of a patient. According to some embodiments of the disclosure, the method is performed by a device without the device contacting a body of a patient.

According to an aspect of some embodiments of the present disclosure there is provided a system for monitoring blood vessel functionality, including an illuminator configured to provide both a laser spot for Laser Speckle Interferometry (LSI) and structured lighting, a camera configured to image a location where the illuminator is configured to illuminate, and a processor for processing images captured by the camera to extract data regarding shape from camera images obtained with structured lighting and data regarding vibration from camera images obtained with LSI.

According to some embodiments of the disclosure, further including a classifier configured to classify the patient's status to be one of suitable for dialysis or at risk for stenosis.

According to some embodiments of the disclosure, the illuminator includes a light source in Near Infra-Red wavelengths.

According to some embodiments of the disclosure, the illuminator includes a Digital Light Processing (DLP) projector.

According to some embodiments of the disclosure, the camera includes a camera capable of capturing images at a frame rate greater than 150 Frames Per Second (FPS).

According to some embodiments of the disclosure, the camera includes a camera capable of capturing images at less than maximum resolution of the camera and at a frame rate more than 500 FPS.

According to some embodiments of the disclosure, further including a support for locating a patient's limb where classifier configured to classify the patient's status to be one of suitable for dialysis or at risk for stenosis.

According to an aspect of some embodiments of the present disclosure there is provided a method for calculating a count of collateral vessels, the method including imaging a patient's body to obtain blood vessel geometry, and calculating a count of collateral vessels.

According to some embodiments of the disclosure, calculating a count of collateral vessels includes automatically detecting collateral veins by counting a number of veins in a specific image area in different images taken at different times.

According to some embodiments of the disclosure, further including automatically detecting a location of vascular access (VA) by detecting a meeting of a vein and an artery.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as monitoring blood vessels in patients, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 16A is a table showing a procedure for a medical person to examine a patient with reference to vascular stenotic lesions or thrombosis;

FIGS. 21A-C show three different images of a same patient's arm;

DESCRIPTION OF SPECIFIC EMBODIMENTS OF THE INVENTION

The invention relates generally to the field of monitoring blood vessels in patients. Some aspects relate more particularly to early diagnosis of failure in blood vessel functionality, and even more particularly to early detection of failure of vascular access in patients undergoing hemodialysis treatments. Some aspects relate more particularly to measurements of fistulas.

Introduction

Monitoring by physical examination is cost-effective and a proven method to detect VA abnormalities. Unfortunately, nephrologists and HD staff generally have limited availability and are not well informed. As a result, regular physical examinations of VAs are not generally carried out in HD units.

Moreover, due to the complex nature of VAs, the surveillance strategies have failed to consistently detect stenosis under different scenarios. Although a low VA flow is associated with an increased risk of thrombosis, the association does not have adequate accuracy in predicting thrombosis. In contrast, VA flow and dynamic or static pressures surveillances were found to be inaccurate predictors of graft thrombosis and instead of preventing thrombosis yielded many unnecessary intervention procedures. Moreover, PTA induces a mechanical trauma, accompanying neointimal hyperplasia (NIH), risk of stenosis and impaired VA survival.

Both flow and pressure vary in patients during and, more importantly, between dialysis sessions. This makes each single measurement a potentially inaccurate predictor of stenosis, and therefore, also of thrombosis, and an evolving lesion may go unnoticed.

The hyperbolic relationship between flow and access pressures would be expected to occur within a given access if the outflow were the only source of stenosis. Unfortunately, this is not the case. Lesions in the inflow and within the body of the access do occur, and on average, the typical access has nearly two lesions/access locations at the time of referral. The lesions change the relationship between flow and pressure. Because of these confounders due to anatomic factors and the location of stenosis, there is little, if any, correlation between a single measurement of flow and pressure.

Figure 1:
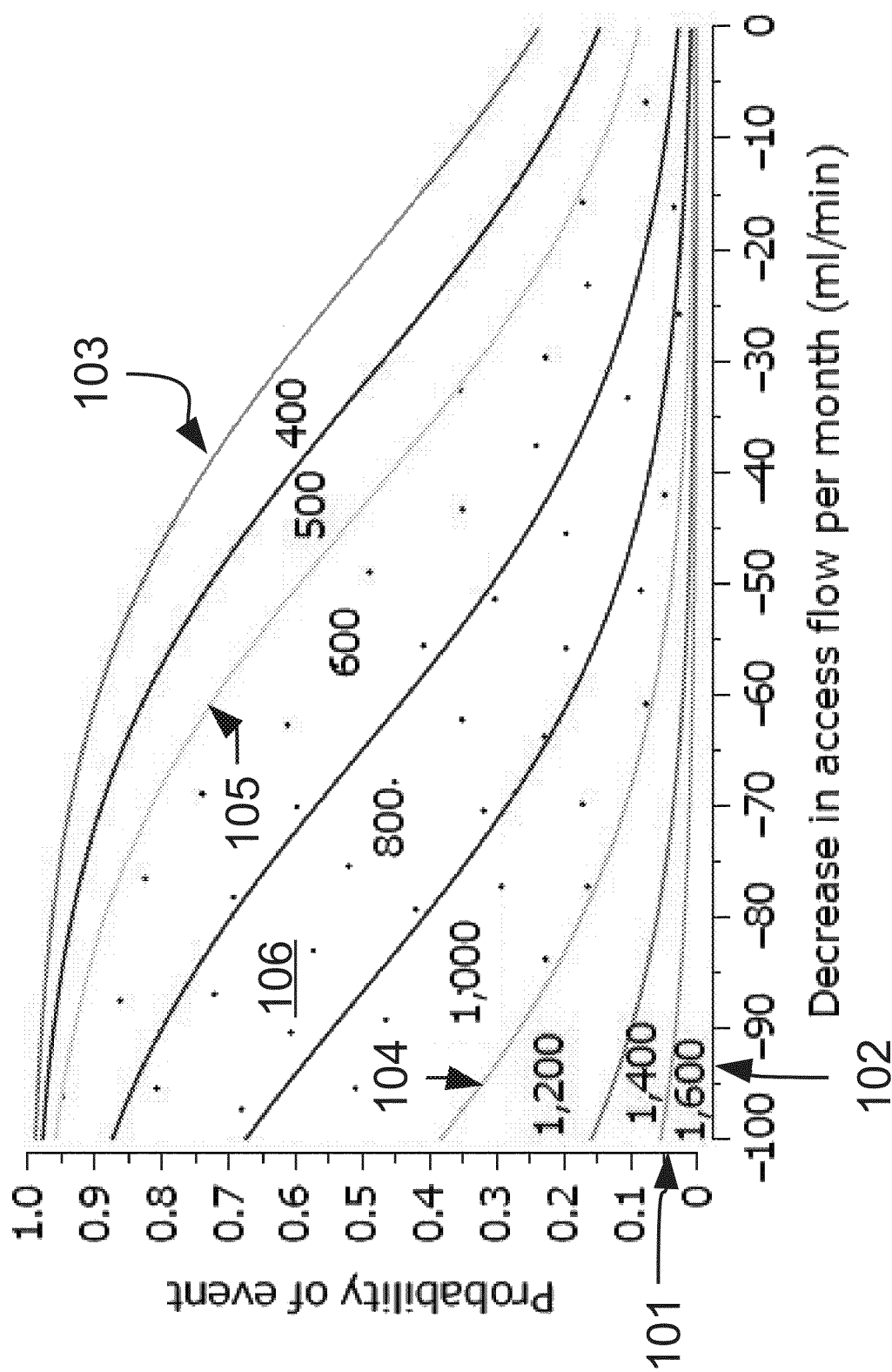
FIG. 1 is a graph showing probability of a vascular access thrombosis occurring within a 3-month period dependent on flow rate and on a change in flow rate, as reported by Besarab et al, "Access Monitoring is Worthwhile and Valuable", Blood Purification", February 2006.

Reference is now made to FIG. 1, which is a graph showing probability of a vascular access thrombosis occurring within a 3-month period dependent on flow rate and on a change in flow rate, as reported by Besarab et al, "Access Monitoring is Worthwhile and Valuable", Blood Purification", February 2006.

The graph of FIG. 1 includes a Y-axis 101 showing probability of a vascular access thrombosis occurring within a 3-month period, various lines 103 showing flow rate in units of ml/min, and an X-axis 102 showing a change in flow rate per month, in units of ml/min.

FIG. 1 shows that a probability of a vascular access thrombosis occurring within a 3-month period is dependent not only on the absolute flow at any time but also on a rate of change in the flow, if there is a change in flow (Besarab et al, "Access Monitoring is Worthwhile and Valuable", Blood Purification", February 2006).

An access with an initial flow of 600 ml/min and a 20-ml/min decrease in flow per month has a lower probability of thrombosis (22%) than an access with an initial flow of 1,200 ml/min and a decrease in flow of 100 ml/min (38%), even though the absolute flow is lower in the former (540 ml/min) than in the latter (900 ml/min) at the beginning of the observation period.

Thus, there is a need for monitoring solutions capable of detecting a forming stenosis early and predicting thrombosis, which overcome at least some of the following drawbacks of existing monitoring practices:
  Poor compliance to routine VA physical examination by dialysis centers as outlined by guidelines;
  An inherent inaccuracy related to a single-time physical examination or pressure/flow measurement of the VA;
  An inherent inaccuracy of a single parameter such as flow or pressure;
  Periodic measurements' results may be influenced by unrelated hemodynamic events; and
  Measurement by different human caretakers may introduce inconsistencies.

Overview

An aspect of some embodiments of the present invention relates to replacing or adding to physical examination performed by medical staff/nurses.

When a nurse or physician examines a patient's blood vessels, they typically use a three-step procedure: look, listen and feel.

An aspect of some embodiments is related to performing look, listen and feel by instruments measurements and computerized analysis.

In some embodiments, systems as described herein perform a look, listen and feel based on illuminating and imaging a patient's limb and analyzing the data collected from the imaging. In some embodiments, the systems teach how to predict fistula condition and potentially enable early prevention of failure.

In some embodiments, methods as described herein performs a look, listen and feel based on illuminating and imaging a patient's limb and analyzing the data collected from the imaging. In some embodiments, the systems teach how to predict fistula condition and potentially enable early prevention of failure.

In some embodiments blood flow is measured in a non-invasive manner, based on image processing of image of blood vessels in a human body. Physiological parameters which are known to affect vascular access (VA) are measured, and the measurements are optionally used to determine whether a patient should be scheduled for corrective procedure or proceed to undergo dialysis.

An aspect of some embodiments is related to performing feel, as described herein, by instruments measurements and computerized analysis.

In some embodiments, the listen as described herein is performed by instruments, optionally the same instruments.

In some embodiments, the look as described herein is performed by instruments, optionally the same instruments.

An aspect of some embodiments of the present invention relates to automatic detection and/or monitoring of an AV fistula in an images of blood vessels.

In some embodiments an image of blood vessels is analyzed, and a location where an artery is connected to a vein is optionally determined to be a location of an AV fistula.

In some embodiments an image of blood vessels is analyzed, and a location where an artery appears to be connected to a vein is optionally determined to be a location of an AV fistula.

In some embodiments an image of blood vessels is analyzed, and an AV fistula is optionally measured to estimate geometric properties.

An aspect of some embodiments of the present invention relates to automatic, non-invasive measurement of parameters associated with blood flow.

In some embodiments the non-invasive measurement includes imaging blood vessels through skin, using reflected light and/or transmitted light.

In some embodiments, a probability of failure of vascular access is optionally estimated.

In some embodiments the estimation is based on one or more of the parameters measured.

In some embodiments, a probability of occlusion formation is optionally estimated. In some embodiments the estimation is based on one or more of the parameters measured.

In some embodiments, a probability of thrombus formation is optionally estimated. In some embodiments the estimation is based on one or more of the parameters measured.

In some embodiments, a grade of stenosis is optionally estimated. In some embodiments the estimation is based on one or more of the parameters measured.

In some embodiments, a rate of stenosis formation is optionally estimated. In some embodiments the estimation is based on one or more of the parameters measured.

In some embodiments, a grade of VA maturation is optionally estimated. In some embodiments the estimation is based on one or more of the parameters measured.

In some embodiments, a rate of VA maturation is optionally estimated. In some embodiments the estimation is based on one or more of the parameters measured.

An aspect of some embodiments of the present invention relates to provide a visual report to a caregiver.

Attributes, one or more of which are related to some embodiments the invention, are listed below:
1. One or more of patient-related parameters, including images, are readily available for measurement(s) in a way that is potentially cost-effective and/or non-invasive (optionally, non-contact), and/or integrated into routine dialysis appointments.
2. An input to an algorithm described herein optionally includes one or more patient-related parameters in order to estimate probability of failure of vascular access, where each of the parameters can be available on a single-measurement basis or as multiple measurements along the time axis.
3. Some of the patient-related parameters are obtained using objective measurements, potentially not requiring high competence from a user, such as a patient and/or a health care professional.

4. Some of the patient-related parameters are optionally taken from the patient's specific medical record and include elements such as demographics (e.g. age, gender, weight and height), lab tests, imaging tests (e.g. X-ray, MRI) and results of a physical exam. It should be clear to a person skilled in the art that the parameters can be extracted in multiple ways, for example—directly typing exam results into a keyboard connected to a system as described herein, a computer process that accesses electronic medical records using a specific patient ID, speech-to-text conversion, voice recognition algorithms applied to verbal analysis of the staff and OCR of a printed/written documents.

Measurement of VA maturation: The VA has a unique tissue structure when compared with veins and arteries. The structure changes during a VA maturation process, and during a stenotic process.

Structural changes impact the mechanical and optical characteristics of the VA, thus monitoring of changes can potentially be measured, in some embodiments, by one or more of:

Imaging: by way of a non-limiting example by measuring changes in contrast or intensity of reflected light and/or transmitted light;

Non imaging: intensity of reflected light or transmitted light;

Measurement of scattering and absorption coefficients (e.g. two distance steady state photon migration measurement).

For example, in some embodiments a system is configured to detect veins, monitoring VA during a maturation period potentially alters detection results. In an example of optical sensing, the response of the VA to light (one or more of transmission, reflection, absorption, scattering) potentially changes over the maturation period. Monitoring of maturation is potentially beneficial to raise a success rate of VA maturation by suggesting a timely pre-emptive correction. Measurement of blood vessel layers, or a ratio between blood vessel layers or the changes in ratio between layers or changes in absolute values of layers during maturation or stenotic process.

Accuracy of estimating maturation (maturity level, stage, rate, completion) or probability of failure of vascular access, occlusion formation and probability of thrombus may be improved by using one or more parameters generated from non-invasive measurement. The parameters used can be directly measured or be a result of a pre-processing applied on the measurement. Such pre-processing can be application of various algorithms as well as combination of several parameters and utilization of multiple measurements over time.

Examples for metrics or phenomena that are optionally extracted and used in some embodiments of the invention:

1. Pulse wave velocity—In some embodiments detect reflection or absorption of optical radiation from at least two points in an image frame. In some embodiments changes in electrical impedance as measured by electrodes placed between and/or along the two points, along the blood vessel or tissue area. Optionally, the two points include sections known to be more susceptible to develop stenosis. More generally, at least one point is used for measuring pulse wave shape (such as, for example, pulse wave amplitude, Full-Width Half Max (FWHM)).

In some embodiments pulse wave amplitude is optionally measured. An optional method for measuring pulse wave amplitude includes measuring a first measurement of an area of a location along a vein identified as a widening of a blood vessel due to a pulse wave. An area of the same location in a different image, when the pulse wave is not at that location, is also measured in a second measurement. A difference between the first measurement and the second measurement is optionally associated with the pulse wave amplitude. In some embodiments the pulse wave amplitude is taken as a feature which corresponds to mechanical properties of a vein all, and/or with maturity of an AV through which the pulse wave travels.

In some embodiments a Pulse Wave Analysis (PWA) is optionally performed to assess variance related to vascular stiffness which is associated with additional risk factors such as cardiovascular disease or atherosclerosis which in turn—may impact viability over time of the VA. A quality of the pulse is optionally scored, and changes over time and between different sections are optionally included in the analysis, in some embodiments.

2. Appearance and development of collateral veins and their characteristics, such as: density, size, distance from the VA, orientation, filling etc. by image processing and/or other detection methods, e.g. measure contrast—by absorption of light in the visible or NIR wavelength; or emission at the far IR wavelength. Other measurement options include measuring an amount of change of absorption in the visible and near IR and amount of emission in the far IR. Another optional way to measure development of collaterals is optionally measuring temperature changes of the VA surrounding. In some embodiments detection of appearance and development of collateral veins optionally uses reference images or measurements taken from a prior examination. In some embodiments trend analysis of collateral vein development rate optionally uses frequent examinations. The examinations are optionally performed daily, every dialysis session, every week, bi-weekly, or monthly.

In some embodiments collateral veins are detected by comparing a new image to a previous image and counting veins—an increase in the number of veins is optionally taken to mean that the new veins are collateral veins.

In some embodiments, appearance and/or development of collateral veins is detected by extracting features from one image or measurement.

Rationale: detection of a collateral vessel potentially indicates a flow limiting (hemodynamic significant) lesion. Collateral vessels may develop and enlarge, dissipating the increased intra-access pressures in the setting of outflow stenosis.

3. A blood vessel's smallest diameter by image processing (stenosis location).
4. Detection of a point of narrowing by estimation of mechanical reflection waves or changes in local pressure/flow for example by measurement of electrical impedance changes.
5. A blood vessel's largest diameter by image processing (appearance and size of aneurysms).
6. Detection of vessel collapse when arm or leg is elevated.
7. Using Near Infrared (NIR) (700-1000 nm) reflected and/or transferred spectroscopy for measuring amounts of oxygenated and deoxygenated hemoglobin (Hb).
8. Spectroscopy analysis for oxygenated and deoxygenated hemoglobin (Hb)
9. Audible sound of the VA (bruit).
10. Palpated pulsation of the VA (thrill).

11. Analysis of electrical impedance changes at VA using signal processing methods known in the art.
12. In some embodiments in which multiple measurements of the same parameter are taken over time, the measurements may be synched according to a detected breathing cycle and categorized for the detection algorithm in respect to their relative time along the breathing cycle. Such synching and categorization are potentially beneficial, for example, when evaluating changes in the oxygen mix over time, but can also improve accuracy of other measurements, such as pulse wave velocity.

Output of a system as described herein may be in the form of an audible alarm, visual alarm, image, sequence of images, or a video providing the medical personnel guidance for fast and accurate intervention (e.g. give a recommendation to the medical personnel regarding the best location(s) for intervention). The system may recommend treatment for a patient (PTA, not to intervene, thrombectomy). The recommendation is optionally based on information collected by the system.

According to an aspect of some embodiments of the present invention, output of the system during a test is optionally analyzed and/or optionally used to guide a patient through a test in order to perform the test correctly. By way of a non-limiting example, in an elevation test—verifying that the elevation/position of a limb is correct. In some embodiments, there is also an alert to a nurse/technician in case a patient has not performed the test correctly or requires help.

In some embodiments, the above-mentioned output is optionally used to support a remote physical examination to be performed by a patient while the system provides feedback on correct performance of the examination and/or alerts remote support personnel, such as a nurse or technician that additional guidance is required.

In some embodiments, system output is optionally provided differently to different consumers of the data. For example: a dialysis nurse is optionally provided with a general interpretation on a likelihood of clinically meaningful stenosis formation and an interventional radiologist is optionally provided with an alert with an annotated image and/or optionally a report highlighting parameters such as location, severity and rate of stenosis formation.

According to an aspect of some embodiments of the present invention there is provided a system and methods for measuring parameter related to fistulas.

In some embodiments, there is provided a system which includes optical apparatus to acquire one or more images of the same patient's fistula along a surveillance period.

In some embodiments, one or more measurements and/or features are optionally extracted from the image(s)—and their changes over time are optionally monitored. In some embodiments, the features are timeline derivatives of parameters measured or estimated in the image(s), by way of a non-limiting example changes in number, branching & size of collateral veins happening over a period of time, such as days/weeks/months.

In some embodiments, using a machine-learning-derived method to identify a pattern within the above changes which may potentially lead to a significant clinical end point (e.g. Stenosis of the fistula) before there are clinical signs or symptoms which human nurses can identify.

In some embodiments, a system is provided which measures parameters relating to a fistula by optical means.

In some embodiments, structured light is projected onto a patient's body or limb, and the body is imaged. In some embodiments, the structured light may include horizontal and/or vertical stripes of equal or different widths and/or various light patterns other than stripes.

In some embodiments, imaging the structured light is used to provide information about an extent of the fistula, for example length of a long axis of the fistula along the body: breadth of a short axis of the fistula along the body: shape of the fistula as it appears in the image: segmentation of the fistula circumference, eccentricity index and/or aspect ratio of each segment, smoothness and/or roughness of a fistula outline In some embodiments, structured light patterns are projected onto a patient's body or limb, and the body is imaged, providing information about a three-dimensional shape of the fistula or organ.

In some embodiments, the system identifies changes in the shape of the fistula and/or an organ near the fistula. In some embodiments, a projector is used to project one or more light patterns (e.g. structured light). In some embodiments, a method measures and/or estimates how the patterns deform on a patient's organ to measure the organ's shape and shape changes over time.

In some embodiments, structured light patterns are projected onto a patient's body or limb, and the body is imaged, providing information about a three-dimensional shape of the fistula, by way of some non-limiting examples volume of an entire fistula or segments of a fistula (e.g. needle insertion points); characteristics and/or variance of curvature; changes in shape and/or volume of an underlying arm/organ section near a fistula; and three-dimensional surface features such as smoothness and/or roughness.

In some embodiments, Laser Speckle Interferometry (LSI) is used. In some embodiments, LSI is used to record and look at vibrations of the fistula surface that correlate with the blood flow and turbulence inside. Changes in the blood flow and turbulence are typically correlated with stenosis events, and potential development of clinical conditions.

In some embodiments, imaging the speckled light is used to provide information about dynamic effects in the fistula, for example heart pulse, blood flow turbulence, and optionally produce spectrograms of vibrations of a fistula.

In some embodiments, images of the body are taken some period of time apart, and differences between the images are optionally used to determine differences in the shape of the fistula.

In some embodiments, the images are taken days, weeks, months or years apart, and differences between the images is optionally used to measure and/or monitor changes in size or shape of the fistula.

In some embodiments, the images are taken seconds or minutes apart, for example with a limb such as a hand held horizontally followed by the hand held vertically, and differences between the images is optionally used to measure and/or monitor one or more of: whether at least some of the blood in the fistula can evacuate the fistula; a rate of blood evacuation; a degree of blood evacuation from the fistula and/or specific portions of the fistula; and collapse of one or more needle insertion points.

In some embodiments, the images are taken fractions of a second apart, as a video clip or movie, and differences between image frames is optionally used to measure and/or monitor dynamic parameter related to the fistula, such as heart pulse, blood flow turbulence, and optionally produce spectrograms of vibrations of a fistula.

In some embodiments, the spectrogram is optionally produced by selecting one or more pixels in the image frames which show a large or even a maximal variation of intensity over time. In some embodiments, the number of pixels selected is optionally in a range of 1-100 pixels. In some embodiments, the values of pixel intensity of this or these pixels are used to compute a function of light intensity over time. In some embodiments, a frequency spectrum of the light intensity is optionally produced by transforming from the time domain to the frequency domain, for example by a Fast Fourier Transform (FFT).

In some embodiments, an analysis is made of changes in the dynamic parameters relate to the fistula between imaging sessions, to monitor changes in the fistula and the patient's conditions.

In some embodiments, performing the above together with Near IR imaging potentially enables collecting data that correlates with examinations required to be perform by nurses and/or physicians and that is already clinically proven to have predictive value to identify stenosis events.

According to an aspect of some embodiments of the present invention there is provided a system and methods for implementing and recording more than one technique or modality, for example one or more of structured light; laser speckle interferometry; image analysis and Near IR imaging modalities, using one imaging device.

In some embodiments, the system includes a processor and an imaging device which includes a Digital Light Processing (DLP) projector and a Near IR camera.

According to an aspect of some embodiments of the present invention there are provided systems and methods for analyzing vibrations of light reflected from a patient's body.

In some embodiments, pulsatility of a heart is monitored.

In some embodiment, analyzing the pattern of vibrations caused by flow through or in vicinity to the fistula optionally detects full or partial occlusions of either the inflow or outflow pathways.

In some embodiment, analyzing the pattern of vibrations caused by flow through or in vicinity to the fistula while imposing local pressure to either inflow or outflow pathways optionally detects full or partial occlusions of either the inflow or outflow pathways.

In some embodiments, analyzing the vibrations optionally detects onset of flow through the fistula related to normal heart activity, (the diastole or systole phases of the heart cycle).

In some embodiments, analyzing the vibrations optionally detects onset of flow through the fistula related to sudden release, (partially or full collapse or expansion of the fistula).

In some embodiments, analyzing the vibrations optionally detects a period of inflow of blood to a fistula, followed by a sudden opening of an obstacle which enables blood to flow out of the fistula. Such opening may happen during high pressure of a heart systole. In some instances the sudden opening is called hammering. In some embodiments, the hammering is detected by measuring amplitude of vibrations, optionally relative to the amplitude at other times, for example other times during a heartbeat.

In some embodiments, analyzing the vibrations related to onset of flow, for any or all types of onset, optionally measures a parameter value or a change in parameter value or a change in a characteristic parameter value, or a variance of the parameter value. The parameters may be one or more of: Intensity, Energy, Steepness of onset (derivative of value), Relaxation time, Temporal-width, Duty-cycle, Spectral-content, Spectral-width, or any combination of such.

In some embodiments, analyzing the vibrations related to onset of flow optionally measures a parameter value related to the time-delay or phase-delay between onsets related to sudden release, and onsets related to normal heart activity.

In some embodiments, analyzing the vibrations related to onset of flow optionally measures a parameter value related to the regularity or self-similarity of a series of onsets of the same source.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
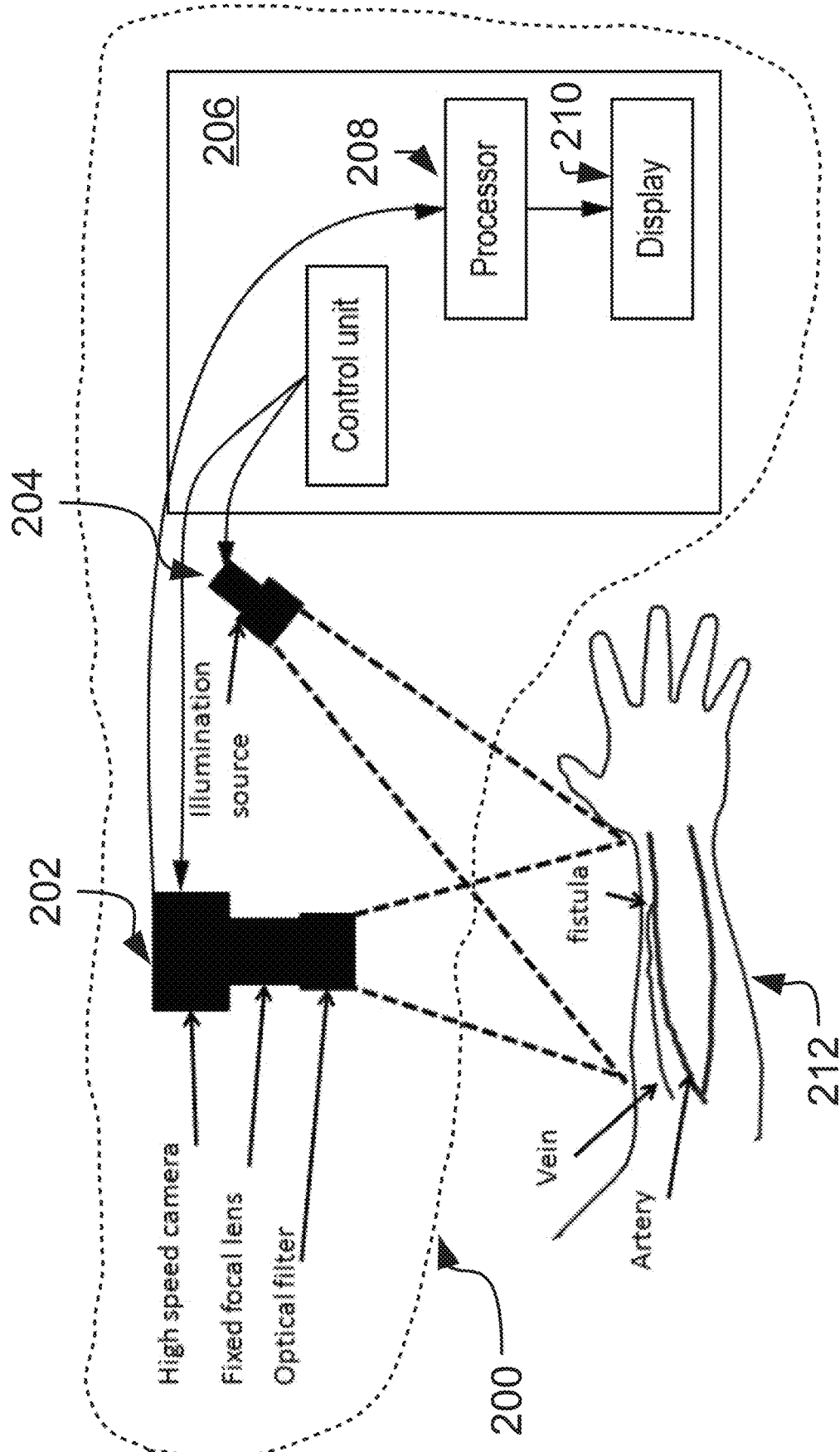
FIG. 2 is a simplified illustration of a system for measuring blood vessels according to an example embodiment of the invention.

Reference is now made to FIG. 2, which is a simplified illustration of a system for measuring blood vessels according to an example embodiment of the invention.

FIG. 2 shows a top level set up configuration of an exemplary system 200 for measuring blood vessels.

In some embodiments the system 200 may include at least one illumination source 202 and at least one detector 204, such as a camera.

In some embodiments the system 200 may further include a control unit 206, which optionally activates the illumination source 202 and the camera 204, and an optional processor 208, which optionally receives and analyzes images generated by the camera 202.

In some embodiments, the generated images and/or the data generated following the analysis of the images may be displayed on an optional display 210 coupled to the processor 208, either wirelessly or via a wired connection.

In some embodiments, the processor 208 and the display 210 may be implemented in a single device, such as a laptop, tablet or smartphone. In some embodiments, a scan system may be applied that optionally moves the detection unit (automatically or manually) and optionally scans an organ at more than one point. FIG. 2 describes the system 200 applied to an arm 212.

The system and method are capable of implementation with other organs, without limitation.

Figure 3:
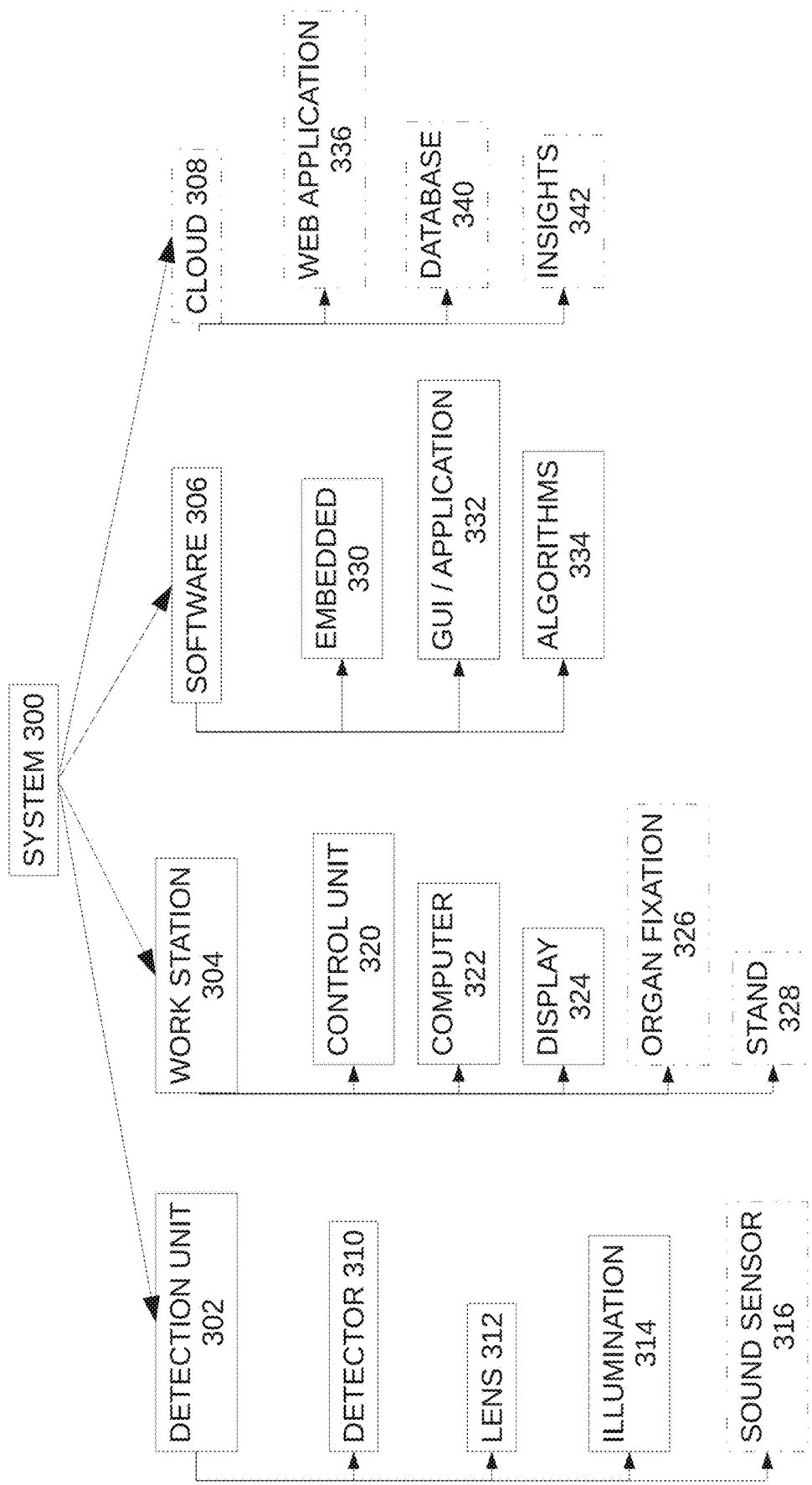
FIG. 3 is a simplified block diagram of a system for measuring blood vessels according to an example embodiment of the invention.

Reference is now made to FIG. 3, which is a simplified block diagram of a system for measuring blood vessels according to an example embodiment of the invention.

FIG. 3 describes the top-level block diagram of an exemplary system.

In some embodiments the system may include at least two main units; a detection unit 302 and a software unit 306.

The system may include additional units, such as a work station 304, optional cloud infrastructure 308, etc.

In some embodiments, the software unit 306 includes at least two sub-units, an embedded unit 330 and an algorithms unit 334. The software unit 306 may include additional blocks, such as a Graphical User Interface (GUI) unit 332, etc.

Detection Unit

In some embodiments, the detection unit 302 optionally uses:

1. visual/optical detection, to acquire images containing information to be further analyzed.
2. Speckle imaging—When an object is illuminated by laser light, the backscattered light forms an interference pattern consisting of dark and bright areas. This pattern is called a speckle pattern. If the illuminated object is static, the speckle pattern is stationary. When there is movement in the object, such as red blood cells in a tissue, the speckle pattern will change over time. The speckled images contain information related to changes in the blood vessels which is optionally analyzed and extracted by image processing.
3. Dark field\side illumination—
   a. Specular reflections not reaching the camera
   b. Only diffused scattering rays are captured by the camera
   c. Reducing surface reflection
   d. Contrast profile changes with changing the angle between light source and detector.
4. Transmitted illumination—Illuminates the back surface of a sample. The sample is placed between the illumination source and the sensor device. Transmitted illumination potentially improves the image contrast and/or potentially increases the depth at which blood vessel can be imaged.
5. Photo acoustic imaging potentially enhances contrast between different mediums because of differences in changes in the optical characteristic of the different mediums. Photo acoustic imaging potentially reduces scattering in tissue because of averaging of the refraction index gradient in tissue components, potentially resulting in a greater penetration depth of light.

In some embodiments the detection unit 302 optionally includes one or more of the following components:
1. One or more detectors/sensors/cameras 310 (e.g., CCD or CMOS, InGaAs sensor, micro bolometer), which are sensitive to one or more of visible, near infrared light, short-wave infrared (SWIR) light. In some embodiments a sensor frame rate can range between single-frame to a high frame rate. Sensor frame rate are optionally in a range of, for example, 5, 10, 16, 24, 30, 50, 60, 100, 165, 200, and even up to 300-frames per second (fps).
2. One or more lenses 312 (zoom or fixed focal length) and/or filters
3. One or more illuminators 314 or emitters (e.g., an illumination source that can be coherent or non-coherent, narrow spectra or broadband, UV, visible, SWIR, far IR, NIR—for example NIR led or green (532 nm) laser). Emitters can be coaxial or in different angles relative to the detector 310 and a VA.

The operation mode can be stills or video.
4. One or more polarization filters (elliptical and/or linear)
5. One or more optical bandpass filters
6. The detection unit optionally includes a scan system or a moving bar scanner.

In some embodiments, the detection unit 302 optionally uses an audio/sound detection sensor 316, instead of, or in addition to, visual/optical detection, and the detection unit 302 may optionally include one or more audio sensors.

In some embodiments, the detection unit 302 may include vital signs sensors.

Software Unit

In some embodiments, the software unit 306 may include one or more of the following components:
1. GUI—graphic user interface/Application 332 for one or more of: operating a test procedure, displaying images and/or results and/or inserting or importing patient clinical information.
2. Embedded 330—for controlling the detection unit 302.
3. Algorithms unit 334—the algorithms unit optionally includes algorithms, or software modules, for:
   Image processing
   Machine learning (ML)

In some embodiments, inputs for the ML algorithm are optionally images and/or data captured by the detection unit 302.

In some embodiments, the inputs may include also clinical information of the patient and/or vital signs.

In some embodiments, the work station 304 optionally includes a computer, a screen, a keyboard, one or more knob controls, a mechanical interface for the imaging unit, and an electric power supply or interface to electric power. In some embodiments, the work station 304 may also include an "organ fixation surface".

In some embodiments, the work station 304 optionally includes one or more of: a control unit 320, for controlling operation of the detection unit 302 and/or one or more of the components of the detection unit 302;
   a computer 320;
   a display 324;
   an optional organ fixation surface or device 326, for optionally placing an organ at a specific location relative to the illumination 314 and/or the detector 310; and
   a stand 328, for placing components of the system at a specific location relative to a patient's organ.

In some embodiments, the cloud infrastructure 308 optionally includes one or more of the following cloud services
   a storage (database) server 340;
   a Web application server 336;
   a computing service for machine learning, such as refining algorithm(s) based on new data; and/or for analytics—to provide measures of function and metrics to a user; and/or insight—to provide metrics related to current or a predicted future clinical condition of the VA.

A machine learning algorithm—may be supervised or unsupervised, learning based on database of images and/or of patient parameters produced by an embodiment of the invention, and/or of meta data such as a patient's, disease, vital signs, parameters from a dialysis machine and/or other data available in a medical electronic record, optionally including previous interventions for this patient, additional risk factors, comorbidities, and so on.

The steps include one or more of:
1. Feature extraction from the images
2. Trend calculation of the features
3. Running ML on the feature vectors and/or on the features vector trends.

In some embodiments an outcome of the ML is a statistical classifier model that distinguishes between less or more than 50% AV patency.

In some embodiments Analytics and Insight run on the metadata and patient records, and calculate statistics of failure of the AV based on the patient profile (metadata and medical health record).

In some embodiments analytics is optionally performed on a clinic's performance, for example how many steno sis events per year.

Reference is now made to FIGS. 4A-4E, which are simplified flow chart illustrations of algorithms according to example embodiments of the invention.

FIGS. 4A-4E show flow charts depicting exemplary algorithms which may be implemented, by way of a non-limiting example, in the system's software unit 306 or in the cloud unit 308.

Figure 4A:
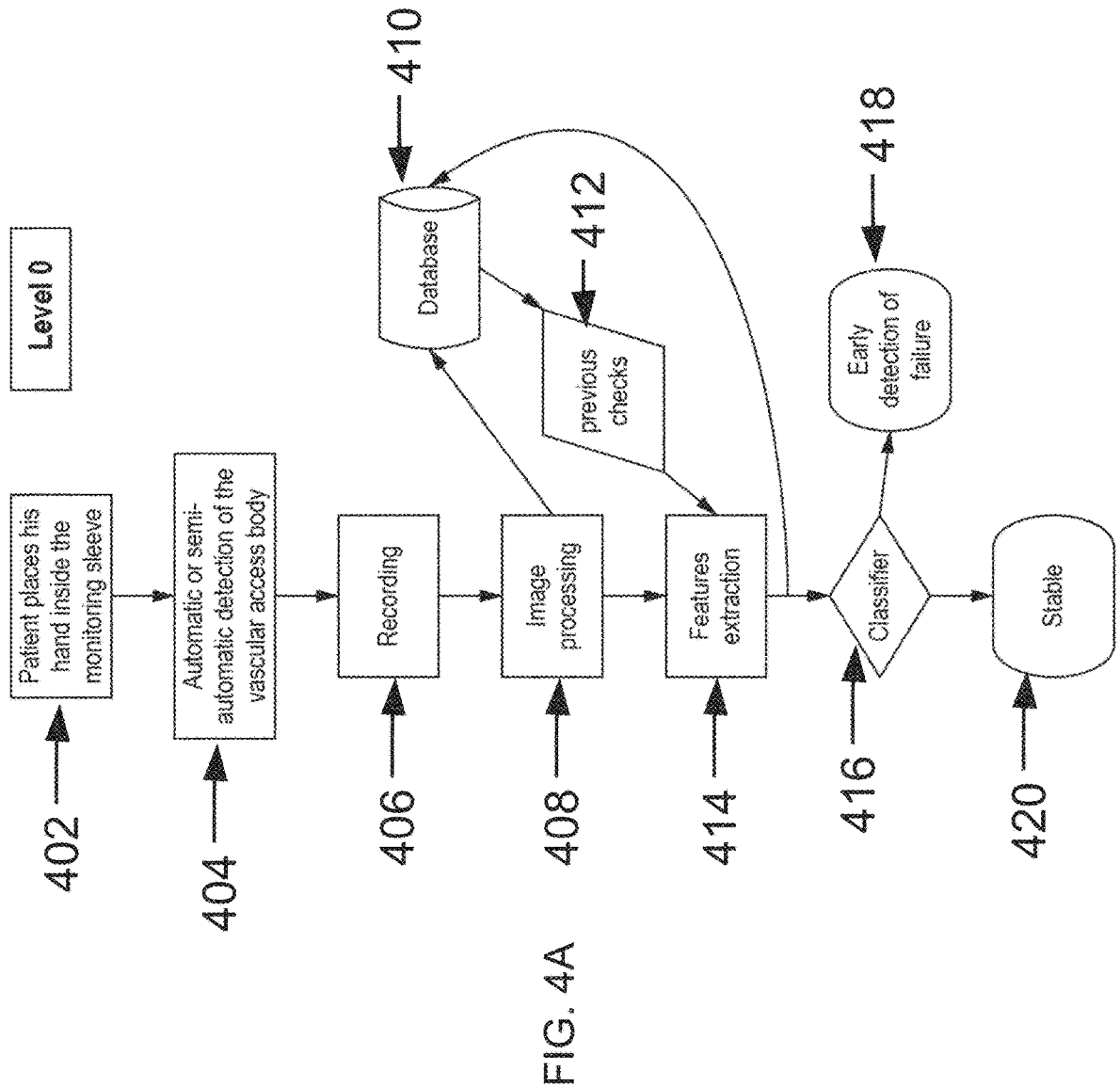
FIGS. 4A-4E are simplified flow chart illustrations of algorithms according to example embodiments of the invention.

FIG. 4A illustrates a procedure flow. FIG. 4A illustrates the procedure flow on a vascular access, as an example.

First, a subject's organ (e.g. arm) is placed inside a fixating sleeve (402), under the detection unit. In some embodiments, the organ is an arm or leg, and all measurements are taken when the organ is approximately perpendicular to the ground (pointing up or down). In some embodiments, some of the measurements are taken when the organ is approximately parallel to the ground, and some measurements are taken when the organ is perpendicular to the ground (pointing up or down). In some embodiments, some of the measurements are taken when the organ is lower than the patient's heart, and some measurements are taken when the organ is higher than the patient's heart.

Next, a region of interest (ROI) is detected (404). In some embodiments, the ROI is the vascular access body and/or surroundings of the vascular access body. The detection can be done either automatically by the system or manually by a physician/user.

A next step is taking one or more measurements (406), e.g. images, of the ROI.

The images go through a processing algorithm (408), e.g., image processing algorithm, and are then optionally saved into a database 410).

A next step is to extract features (414) from the current examination measurements, e.g., images, and from the previous examination measurements (412), e.g. images.

The features are sent to a statistical model which may classify (416) between "Early detection failure" (418) and "Stable" state (420) of the vascular access body.

Figure 4B:
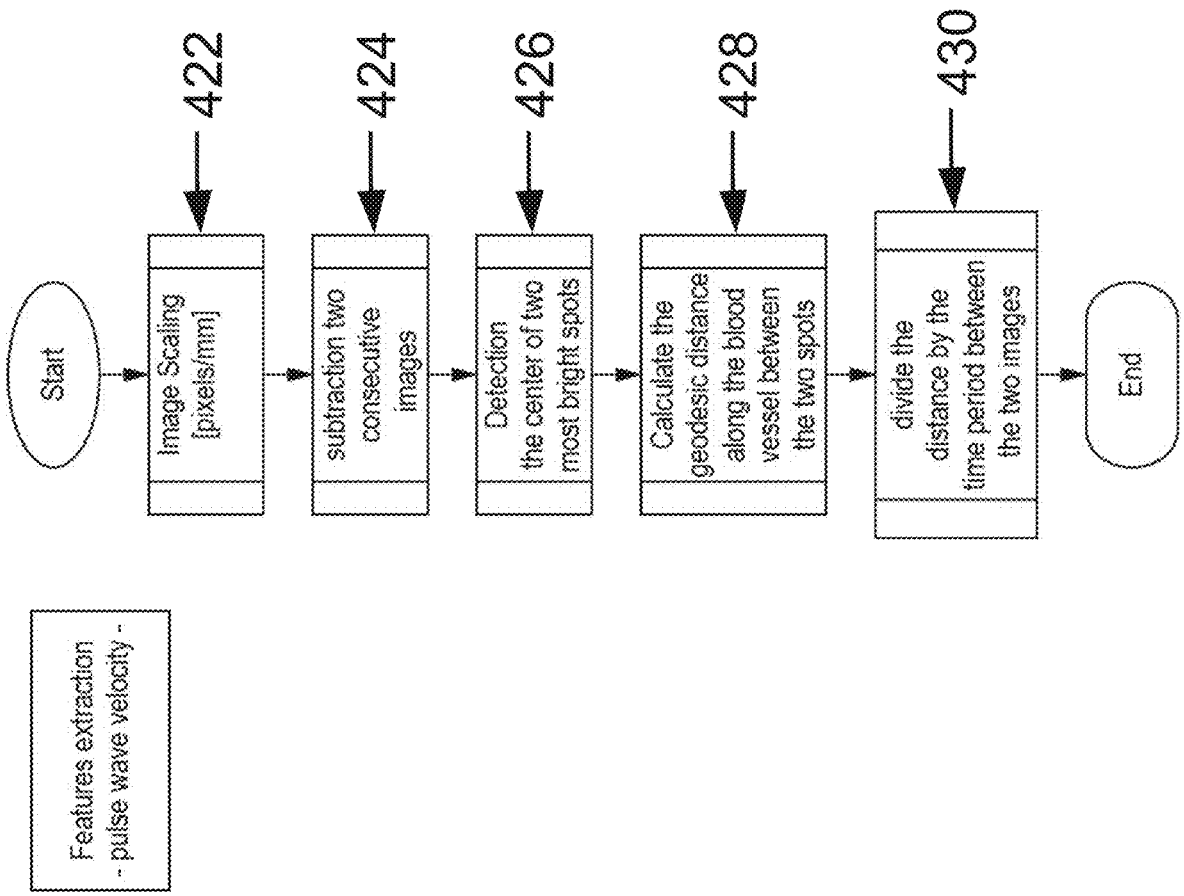

FIG. 4B illustrates an exemplary algorithm flow of extracting features of the "pulse wave velocity" phenomena.

A first step is pre-processing (422), e.g., to detect the image scale, for example in units of mm.

A second step is to subtract the first image from the second (424). The result includes two bright spots.

A next step is to detect the centers of the bright spots (426) and to calculate a distance along a path along the blood vessel between the centers of the bright spots (428).

A next step is dividing the calculated path by the time period between the two images (430), producing a result of a pulse wave velocity.

Figure 4C:
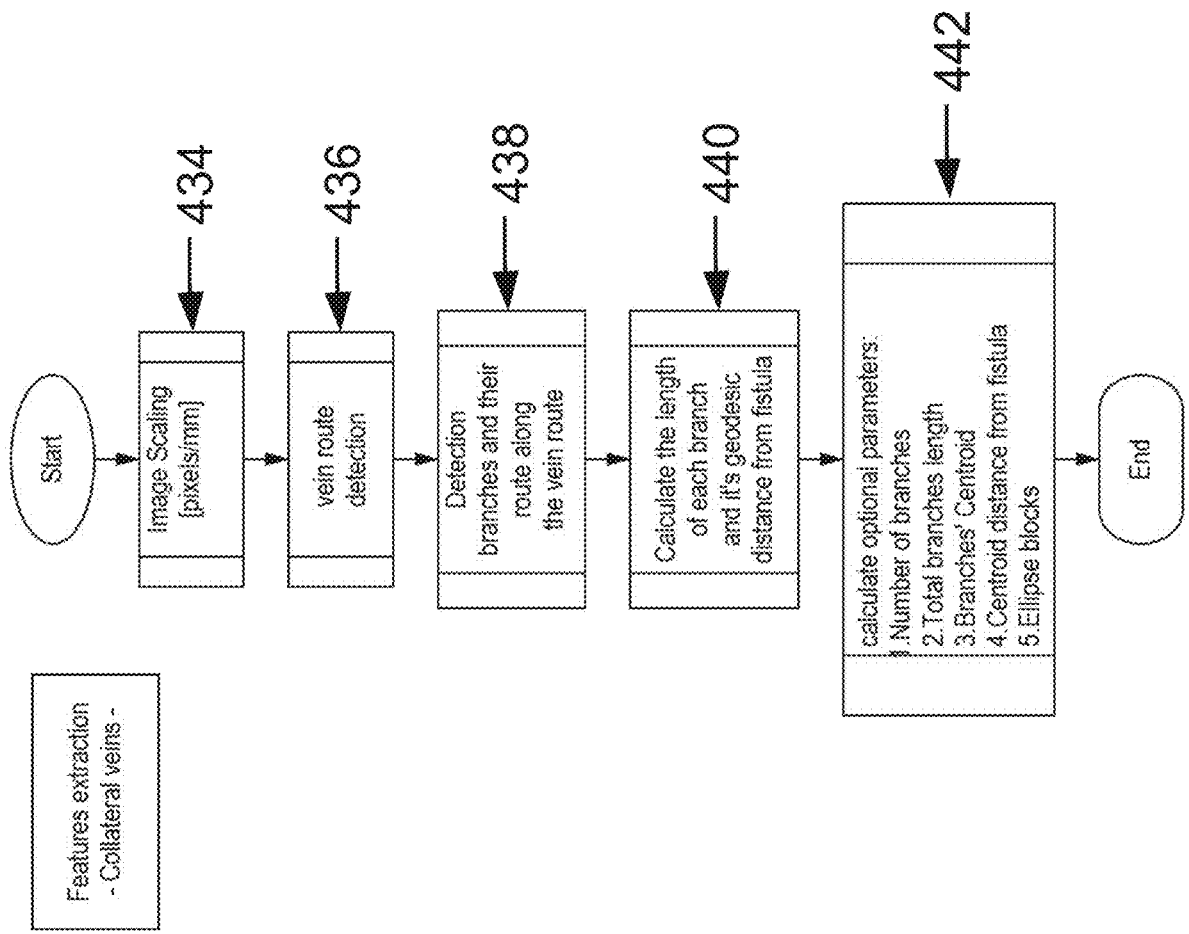

FIG. 4C shows an exemplary algorithm flow of extracting features of the collateral veins phenomena.

A first step is pre-processing (434), e.g., to detect the image scale, for example in units of mm.

A second step is to detect the vessel's route and/or branches (436).

A next step is to calculate the length of each branch and its distance, along a vein route, from a fistula (438).

The above method is also described in more detail below, under the heading of "Detection of vascular access (VA) body algorithm" and in several location where segmentation is described.

A further step includes calculating parameters that describe the collateral veins phenomena (442), including one or more parameters such as:
1. A number of branches.
2. Total branches' length.
3. Branches' centroid.
4. Centroid distance from the fistula.
5. Ellipse blocks.
6. Diameter of branches, optionally detecting blood filling the lumen of a vessel.

Figure 4D:
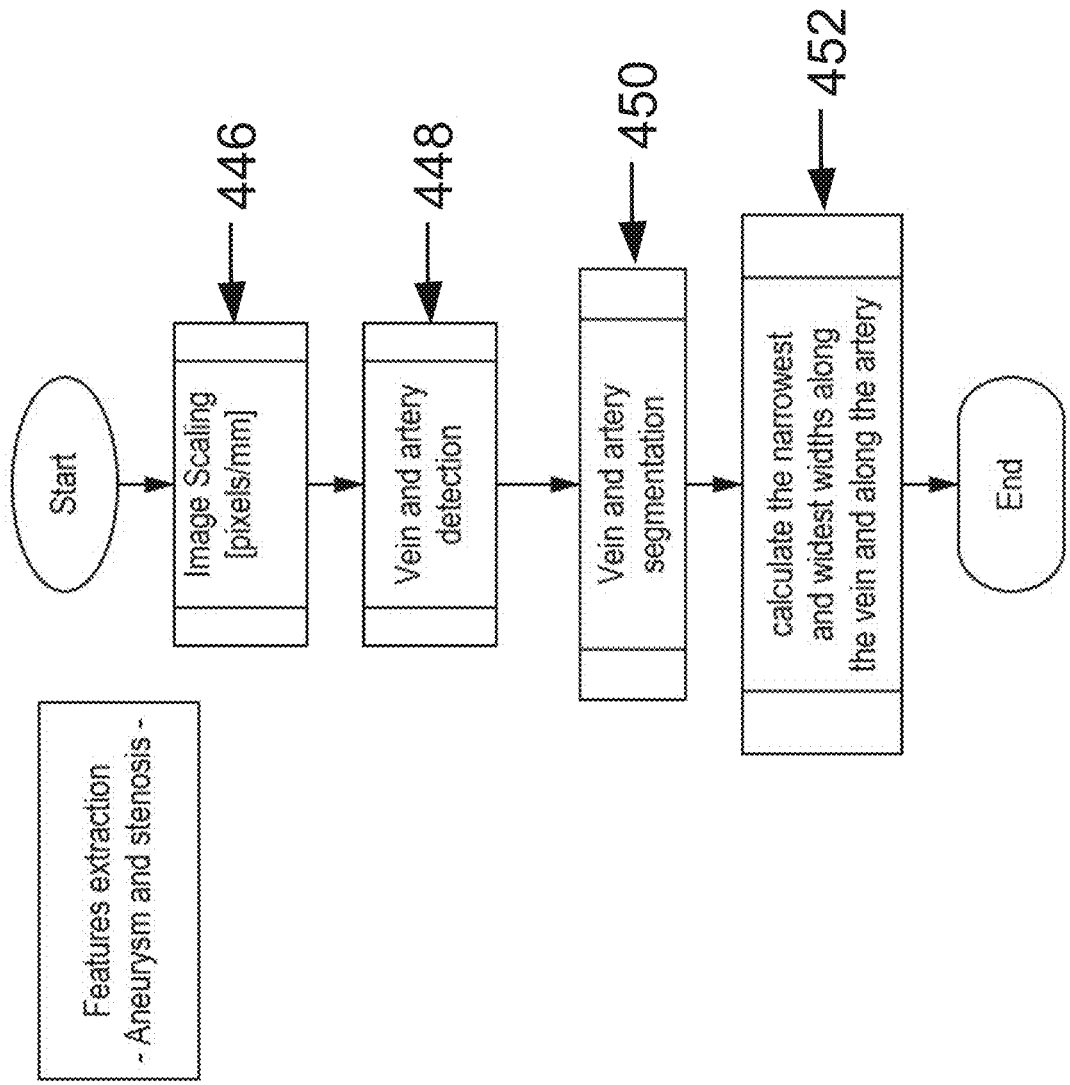

FIG. 4D shows an exemplary algorithm flow of extracting features of the aneurysm and stenosis phenomena.

A first step is pre-processing (446), e.g. to detect the image scale, for example in units if mm.

A next step is to detect the vein and/or artery route (448).

A next step is to and segment the vein and/or artery route (450).

A next step is to find and calculate the narrowest and widest widths along the vein and/or artery routes (452).

Figure 4E:
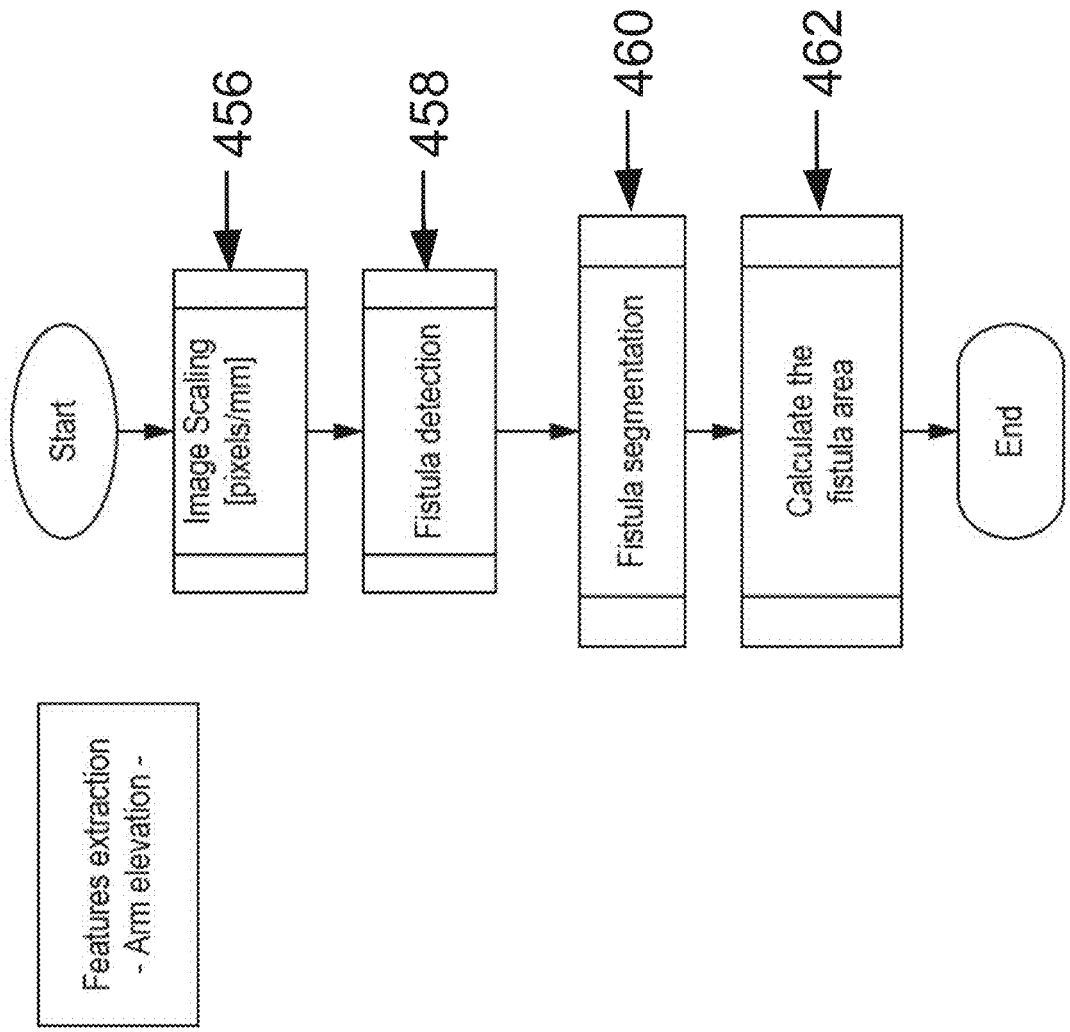

FIG. 4E shows an exemplary algorithm flow of extracting features of an arm elevation examination. It is to be understood that the algorithm flow is applicable to other subject organs, and it is not limited to the arm.

In some embodiments two images are obtained after an arm is elevated, to track changes in outflow, which translate to changes, over a short period of time, in the volume of a fistula. In a normal outflow state—the fistula contents "quickly" (over a few seconds) emptied, and a difference in shape/area between the two images is detected and/or measured. In an obstructed outflow state—the fistula contents do not evacuate fast enough, and a smaller change, if at all, is detected/measured in the shape/area of the fistula. Tracking such changes over time—enables tracking changes in patency of a fistula.

In some embodiments, arm elevation examination may be applied when the arm is elevated (pointing up or pointing down, perpendicular to the ground, and/or above the heart level).

In some embodiments, A first step is pre-processing (456), e.g., to detect the image scale, for example in units of mm.

A next step is to detect the vascular access (fistula) in the image (458).

A next step is to segment the vascular access (fistula) in the image (460), optionally segmenting the fistula from other portions of the image.

A next step is to calculate the vascular access area in the image (462).

In some embodiments, the arm elevation examination starts by taking a first image when the arm is parallel to the ground, and a second image when the arm is perpendicular to the ground (pointing up or down) above heart level.

After obtaining the first image and the second image, a next step is pre-processing, e.g., to detect the image scale, for example in units of mm, in both images.

A next step is to detect the vascular access in both images.

A next step is to calculate the vascular access area in both images.

A next step is to subtract the first vascular access area from the second vascular access area.

In some embodiment, the arm elevation examination starts by moving the arm (or any other subject organ) from a first position, where the arm is approximately parallel to the ground, to a second position, where the arm is approximately perpendicular to the ground (pointing up or down).

A next step is taking two images of the elevated arm.

A next step is pre-processing, e.g., to detect the image scale, for example in units of mm, in both images.

A next step is detecting the vascular access in both images.

A next step is to calculate the vascular access area in both images.

A next step is subtracting the first vascular access area from the second vascular access area.

A next step is dividing the calculated difference by the time period between the two images.

Figure 5A:
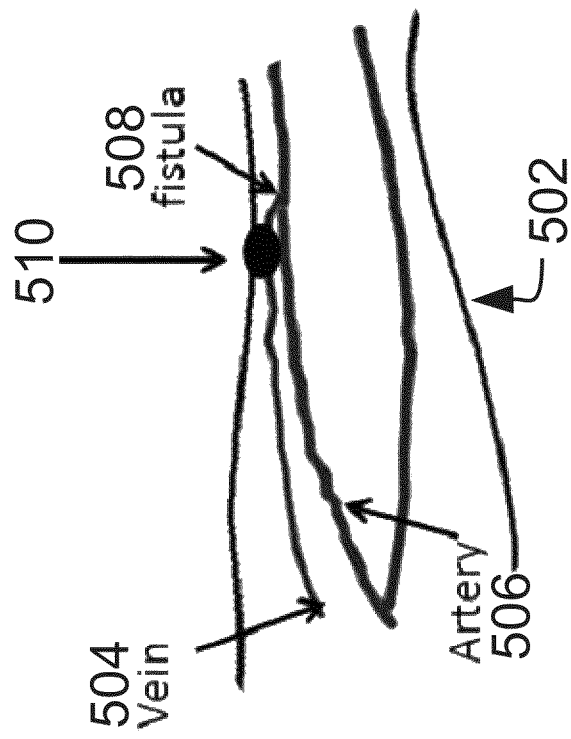
FIGS. 5A and 5B are simplified illustrations of a pulse wave travelling along a vein.
Figure 5B:
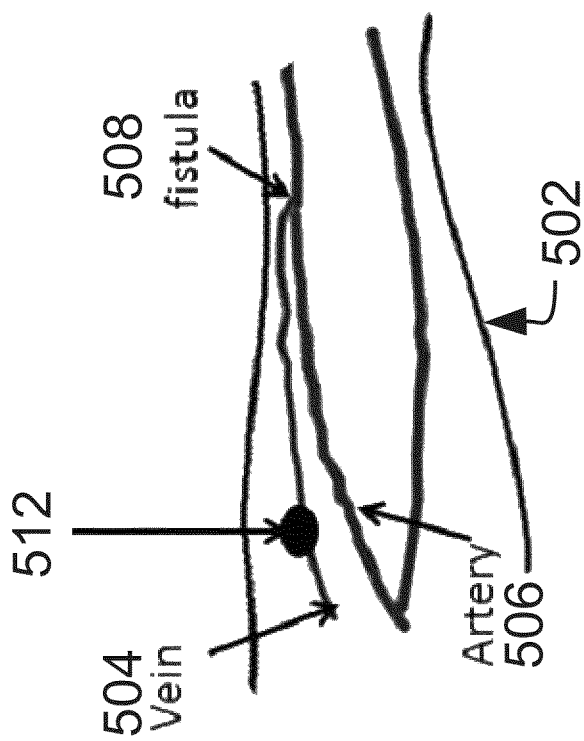

Reference is now made to FIGS. 5A and 5B, which are simplified illustrations of a pulse wave travelling along a vein.

FIG. 5A shows a first image and FIG. 5B shows a second image, taken a short time later.

The images of FIGS. 5A and 5B show an arm 502, a vein 504, an artery 506, and a fistula 508 where the vein 504 is connected to the artery 506.

FIG. 5A shows a first location 510 where the vein is enlarged by pressure of a pulse wave, at a time $t_0$.

FIG. 5A shows a second location 512 where the vein is enlarged by pressure of the pulse wave, at a time $t_1$.

The second location 512 is further along the vein 504 relative to the first location 510.

Pulse wave velocity is optionally measured by measuring a distance between the first location 510 and the second location 512, divided by a time difference between the capture of the first image and the second image.

In some embodiments the time difference is a fraction of a second. By way of a non-limiting example, when an image frame is approximately 15-30 centimeters wide, imaging a pressure wave progressing along a blood vessel is optionally done at a frame rate above 120 fps, for example at 165 fps.

In some embodiments, in order to have both of the above-mentioned locations with an image frame with a field of view of 160 mm, and for a pulsed wave velocity of approximately 20 m/s, the time different is <6 ms. Such a time difference applies to all pulse wave velocities that are smaller than 20 m/s.

One or more of the following algorithms may be implemented in the system described herein:

Predictor/Classifier Methods

Figure 6:
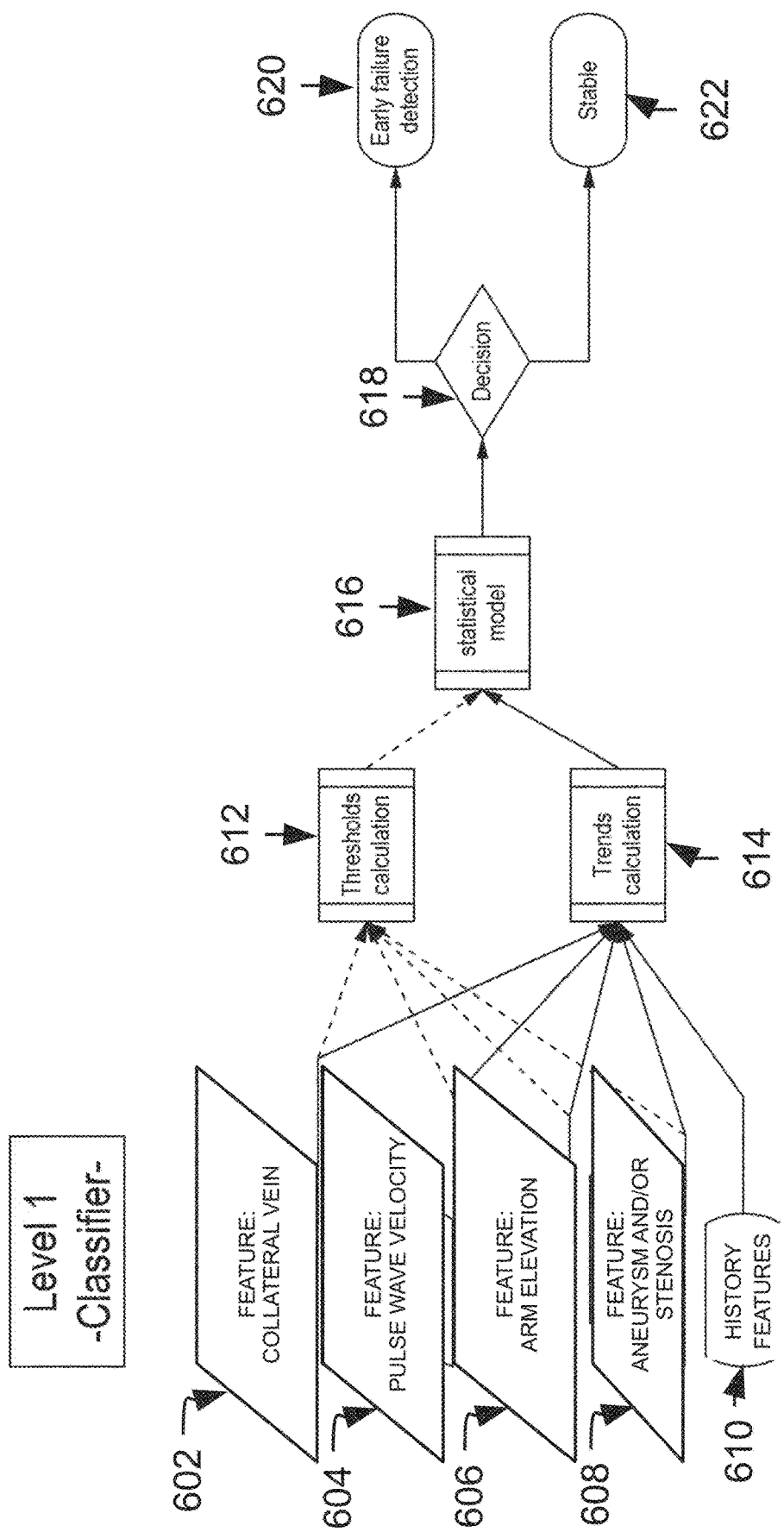
FIG. 6 is a simplified flow chart illustration of a classifier method according to an example embodiment of the invention.

Reference is now made to FIG. 6, which is a simplified flow chart illustration of a classifier method according to an example embodiment of the invention.

FIG. 6 shows input of one or more feature descriptors, such as: a collateral vein descriptor 602, a pulse wave velocity descriptor 604, an arm elevation descriptor 606, and an aneurysm and/or stenosis descriptor 608.

In some embodiments the inputs 602 604 606 608 are fed into a threshold calculation unit 612.

In some embodiments a trends calculation unit 614 optionally accepts input of a historical and/or trend descriptor 610, optionally from a local or a remote database.

In some embodiments the trend calculation unit 614 produces a trend data output.

In some embodiments the threshold calculation unit 612 produces a threshold data output.

In some embodiments one or more of the above outputs are fed into a statistical unit 616.

In some embodiments output of the statistical unit 616 is input to a decision unit 618.

The decision unit 618 optionally produces a decision that the VA is determined to be "stable" 622, or that a failure is detected 620.

FIG. 6 describes an exemplary classifier algorithm, which may be based on machine learning (supervised or non-supervised) tools or on heuristic rules that execute the following steps:

1. Data analysis, such as image processing.
2. Extracting features from one image or a set of sequential images of collateral vessels development, VA zone, etc.

Some examples of features include: smallest radius size of body of VA, pulse wave velocity, collateral veins sizes and density, distance of collateral veins from the AV or fistula. etc.

The features can also be a variation of the features between sequential images and/or a rate of variation of the features between sequential images.

3. Classifying the condition of the VA based on the extracted features.

The classification can be base rule, threshold and/or statistical model. A statistical model can be based on a machine learning algorithm, such as: SVM (Support vector machine), logistic regression, neural network, decision tree, decision forest, "k means", etc.

The classification can be between two levels (intervention needed or not) or between more than two levels.

A non-limiting example of methods used for predicting and/or classifying include one or more of:

A table of parameter values;
Regression of parameter values associated with a patient;
K Nearest Neighbors (KNN) as applied to parameter values;
Support Vector Machine (SVM);
Deep learning;
Neural Network(s).

In some embodiments, machine learning uses a training set. A non-limiting example of producing and using a training dataset includes measuring parameters as described herein, for N patients, repeatedly over a period of time.

During the period of time, recording which patients had blood vessel failures, and/or which patients were examined by additional techniques such as human examination, ultrasonography, X-ray imaging, and what the additional techniques' determination was. The parameters and the determination potentially produce a training dataset, which can be used to train the above-mentioned machine learning methods, or to produce KNN dataset.

In some embodiments, some or all of the parameters measured for the datasets described above are also measured for patients for prediction and/or classification purposes.

It is noted that parameters which are collected over time optionally include measured values and parameters calculated from measured values, first derivatives of the parameter values, and second derivatives of the parameter values.

It is noted that a nurse or physician performing a blood vessel test by the look, listen and feel method typically provide a decision or classification based on a value of one or two parameters, while systems and methods as described herein potentially use more parameters, and potentially arrive at more accurate decisions or classifications which are based on more data of the patient and/or of a group of patients used for producing the training set.

Scaling Algorithm

A scaling algorithm calculates the image scale (for example scaling pixels to mm). The scaling may be used for calculating absolute or relative values of one or more of a vessel's radius, pulse wave velocity, size of collateral vessels, density of collateral vessels, and distance of collateral vessel from VA.

Registration Algorithm

A registration algorithm may perform automatic or semi-automatic registration between two or more sequential images.

The registration algorithm may align and/or scale two or more images that contain the same object in different positions or angles of view or different fields of view.

In some embodiments inputs to the registration algorithm include at least two images and in case of semi-automatic registration, optionally, one or more points that are marked by the user on the two images.

The registration algorithm potentially enables the system to measure a variation between at least two examinations, no matter how the arm, or another examined organ, is positioned during the different examinations.

In some embodiments, registration of at least two images of the same patient that contain a VA object is optionally done by detection (e.g. segmentation) of the VA and fitting the VA image in a first image by geometrical transformation to the VA image in a second image.

Detection of Vascular Access (VA) Body Algorithm

In some embodiments automatic or semi-automatic detection of the vascular access body location in the image is performed.

In some embodiments input for an algorithm for detection of a vascular access body includes at least one image that contains the vascular access body in the image frame.

In some embodiments an optional input is a set of one or more points along a blood vessel which includes the VA body, optionally marked by a physician/nurse on an image which includes the VA body.

The algorithm output may be a set of the vascular access body pixels in the image.

In some embodiments computerized detection of the VA body is based on a unique VA shape, size, orientation, position and etc.

In some embodiments, a device such as, by way of a non-limiting example, an "ELY-1000 vascular imaging instrument for Arterial puncture" as developed by ELYNNSH MEDICAL, is used. The device, according to the manufacturer, assists medical staff in identifying subcutaneous arteries during an arterial puncture, and can conveniently & quickly display the exact location of the arteries and direction.

In some embodiments a location is detected in an image, where an artery and a vein are connected or appear to join.

In some embodiments, a blood vessel providing blood to a VA is elevated by surgery toward the skin surface. Because of depth differences of blood vessel segments, an image which cover a field-of-view (FOV) which includes a VA, the VA often appears as a closed contour centroid. Tissues surrounding the VA body are often deeper under the skin than the VA body.

In some embodiments, the difference in depth is optionally detected by the VA body potentially showing up as a darker area than native or surrounding vessels. For example, when NIR illumination is used, the NIR light is absorb in the blood Hgb, and blood vessels closer to the surface appear darker than deeper vessels.

Pulse Wave Velocity Algorithm

Reference is again made to FIGS. 5A and 5B, which describe an exemplary method for measurement of pulse wave velocity.

Pulse wave velocity is also a common indicator of blood vessel stiffness and can be obtained by measurement of the distance and the pulse wave transit time between two points of vessels. Pulse wave velocity can be measured locally, regionally or systemically.

The term locally is used to mean along a fistula and nearby related vessel structures.

Physiologically, there is a relation between the pulse velocity, blood flow and pressure inside the vessel.

The pulse wave (caused by heartbeat) travels from the heart to the arteries, and from the veins back to the heart. When the pulse is traveling, it temporarily deforms the blood vessel (e.g., the vein) at a moving discrete point and time.

For example, the vein radius may temporarily expand at a certain point along the vein. This point can be detected by measuring the absorption of light by the blood flowing in the vein—the location of the expanded vein shows as a darker or a lighter point along the vein (depending on a method of measurement, such as reflection or transmission).

By detecting points associated with an expanded blood vessel in two or more sequential images, while the time between capture of the images is known, pulse wave velocity can be calculated. Pulse wave velocity equals the distance between two points divided by the time between capture of the two images.

Example Embodiment—System Description

The system may measure one or more of the following example phenomena: vessel diameter, pulse wave velocity, NIR (e.g. 700-1000 nm) reflected spectroscopy, appearance of collateral veins and their characteristics, such as: density, size, distance from the vascular access and oxygen concentration at the vascular access.

In some embodiments the NIR spectral range is used for blood vessel imaging. A spectral window exists from approximately 700 nm to approximately 900 nm, where light can penetrate deep into tissues, and also more radiation is absorbed by venous blood vessels than by surrounding tissues.

Figure 7:
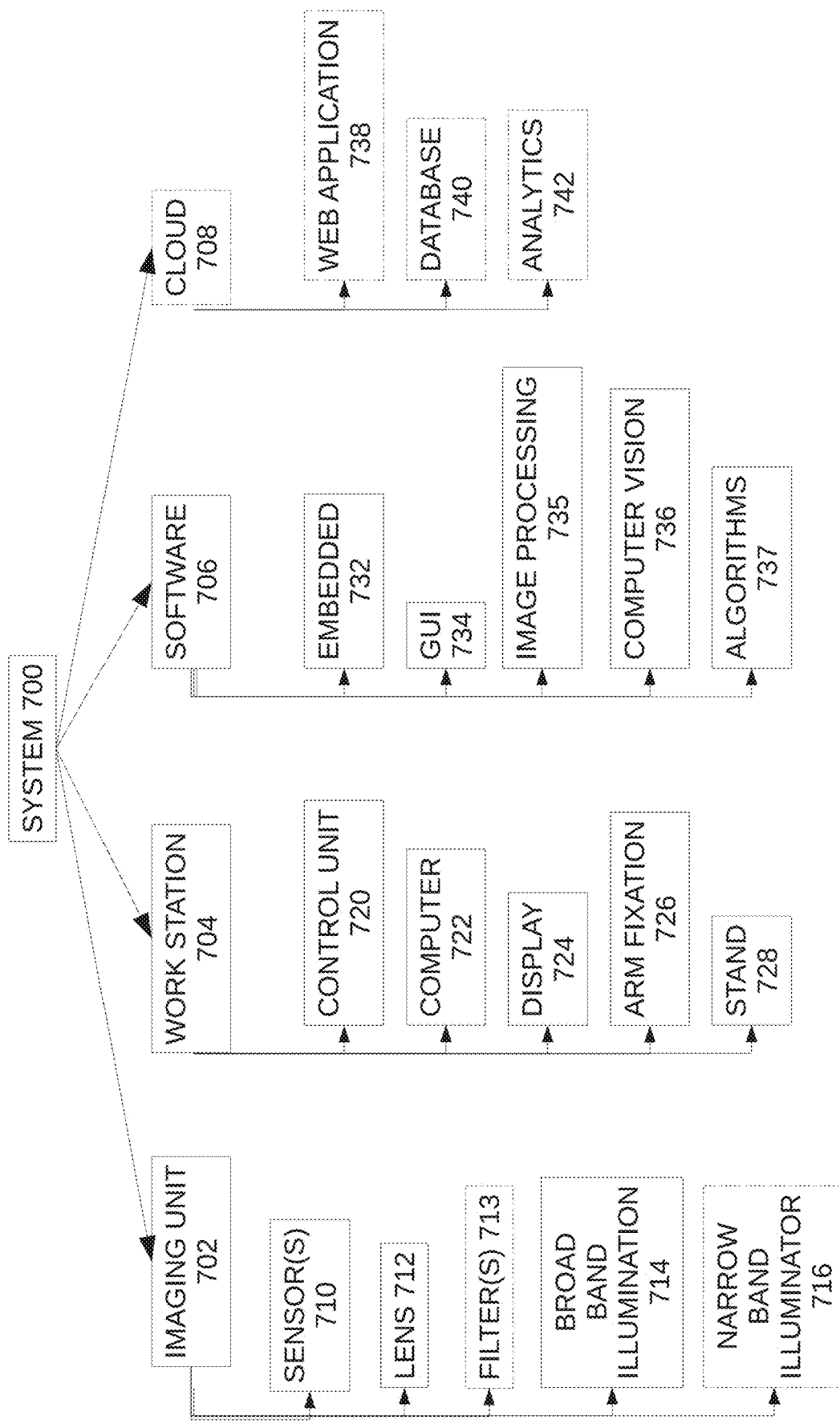
FIG. 7 is a simplified block diagram of a system for measuring blood vessels according to an example embodiment of the invention.

Reference is now made to FIG. 7, which is a simplified block diagram of a system for measuring blood vessels according to an example embodiment of the invention.

FIG. 7 shows a top-level block diagram of an example embodiment system 700. The system 700 may include an imaging/detection unit 702 and a software/computation unit 706.

The imaging/detection unit 702 optionally includes one or more sensor(s) 710, one or more lenses 712, one or more filter(s) 713, and one or more illuminator(s) 714 716.

In some embodiments the sensor(s) 710 may be CMOS sensor(s).

In some embodiments the sensor(s) 710 may be a multi-spectral and/or hyperspectral camera(s).

In some embodiments the sensor(s) 710 may be NIR sensor(s) or camera(s).

In some embodiments the lens 712 may optionally be a fixed focal length lens.

In some embodiments the lens 712 may optionally be a zoom lens.

In some embodiments the filter(s) 713 may optionally include bandpass or long-pass filter(s).

In some embodiments the illuminator(s) 714 716 may optionally include NIR LEDs, optionally in a spectral range of 700-1200 nm.

In some embodiments the illuminator(s) 714 716 may optionally include broad band NIR
LEDs.

In some embodiments the illuminator(s) 714 716 may optionally include one or more laser sources, optionally in Near IR spectral range of 850 nm and 910 nm.

In some embodiments the illuminator(s) 714 716 may optionally include narrow band illumination, optionally in a spectral range of 900 nm In some embodiments the illuminator(s) 714 716 may optionally include an array of illuminators.

In some embodiments the software/computation unit 706 optionally includes one or more of a GUI 734, an image processing unit 735, a computer vision unit 736, and a machine learning algorithm unit 737.

In some embodiments the algorithm unit 737 optionally includes one or more of: image processing algorithm(s), vein segmentation algorithm(s), collateral vein detection and/or segmentation algorithm(s), pulse wave detection algorithm(s), and classifier algorithm(s)—optionally machine learning algorithms.

The system 700 may include additional units, such as a work station 704, optional cloud infrastructure 708, etc.

In some embodiments the cloud infrastructure 708 optionally includes one or more of a web application 738, database(s) 740 (optionally including big data analytic capability), and analytic unit(s) 742.

In some embodiments, the work station 704 optionally includes one or more of:
- a control unit 720, for controlling operation of the imaging/detection unit 702 and/or one or more of the components of the imaging/detection unit 702;
- a computer 722;
- a display 724;
- an optional organ fixation surface or device 726, for optionally placing an organ at a specific location relative to the illumination 714 716 and/or the sensors 710; and
- a stand 728, for placing components of the system at a specific location relative to a patient's organ.

Figures 8A, 8B:
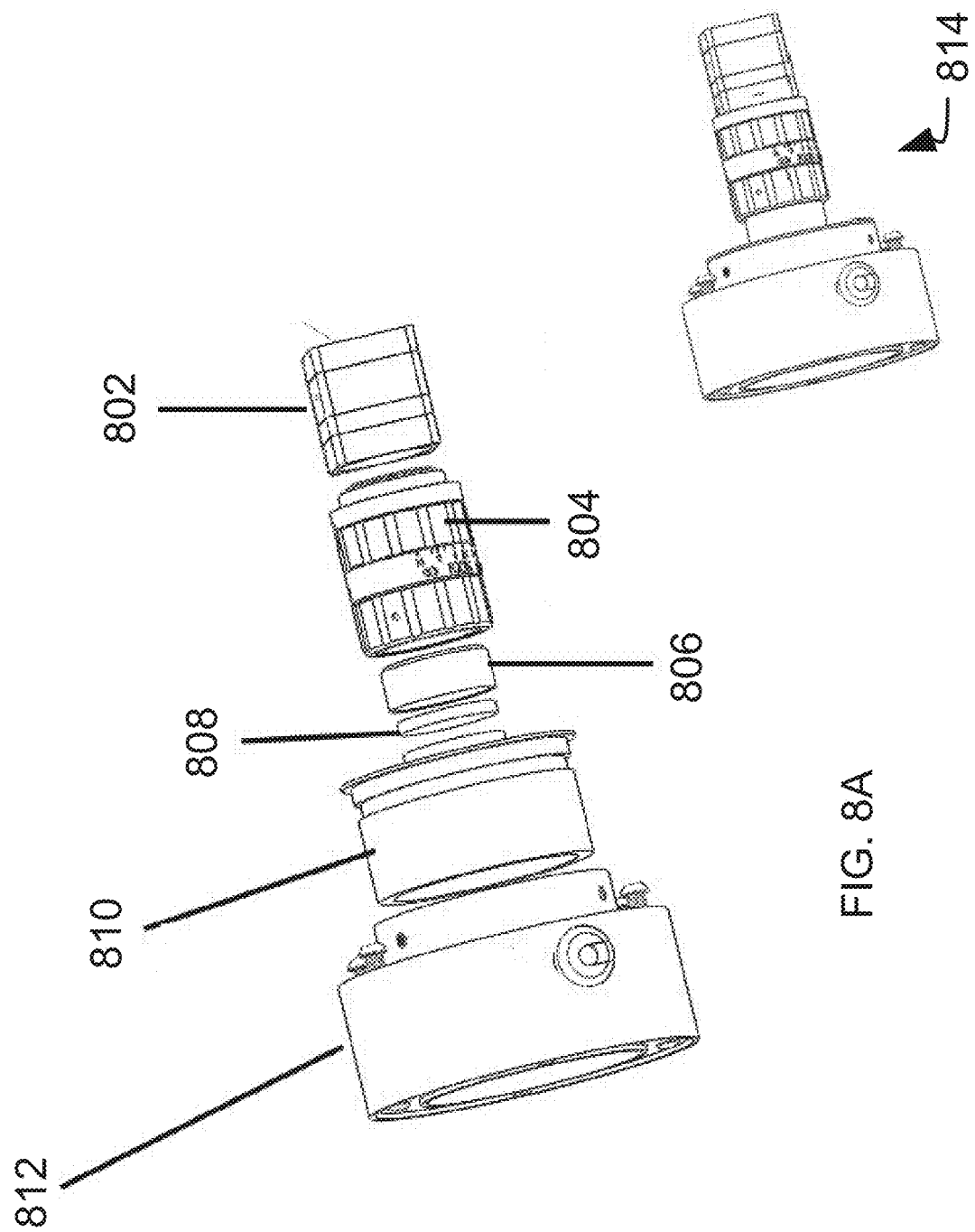
FIGS. 8A and 8B are images of optical components in a system constructed according to an example embodiment of the invention.

Reference is now made to FIGS. 8A and 8B, which are images of optical components in a system constructed according to an example embodiment of the invention.

FIGS. 8A and 8B show some of the example system's optical channel, which may include, as shown in FIG. 8A:
- a camera 802, optionally a hyper spectral sensor (camera);
- a lens 802, optionally a fixed focal length lens;
- an optional filter mount 806;
- a filter 808, in some embodiments an optical long pass filter, in some embodiments a filter with a cut off wavelength of 670 nm; and
- an illumination source 812.

In some embodiments the system includes an optional mechanical adaptor 810 to connect the illumination source 812 to the camera 802 body.

FIG. 8B show an assembled unit 814 including the components of FIG. 8A.

In some embodiments an example blood-vessel-status classifying algorithm may be divided to three blocks; image processing, feature extraction and statistical classifier.

The example algorithm TOP level flow may be similar to that shown in FIG. 4A.

Image processing: The image processing block may include several steps:
Image quality enhancement, such as contrast and illumination enhancement, sharpness, a combination of multiple polarization state images, multiple wavelength images (image of intensity ratios), multiple exposures, optionally High Dynamic Range (HDR), and contrast limited adaptive histogram equalization (CLAHE).

In some embodiments the intensity ratio images show a pixel-wise ratio between images that were captured with different wavelengths, as described the following equation:

$$R_{ij} = \frac{IM1_{ij}}{IM2_{ij}}$$

Where:
Rij is the pixel at location (i, j) in the ratio image, IM1ij is the pixel at location (i, j) in the first image, and IM2ij is the pixel at location (i, j) in the second image.
Image segmentation—locating the vascular access (VA) construction, vessels' boundary and collateral vessels' structure.

Figure 9:
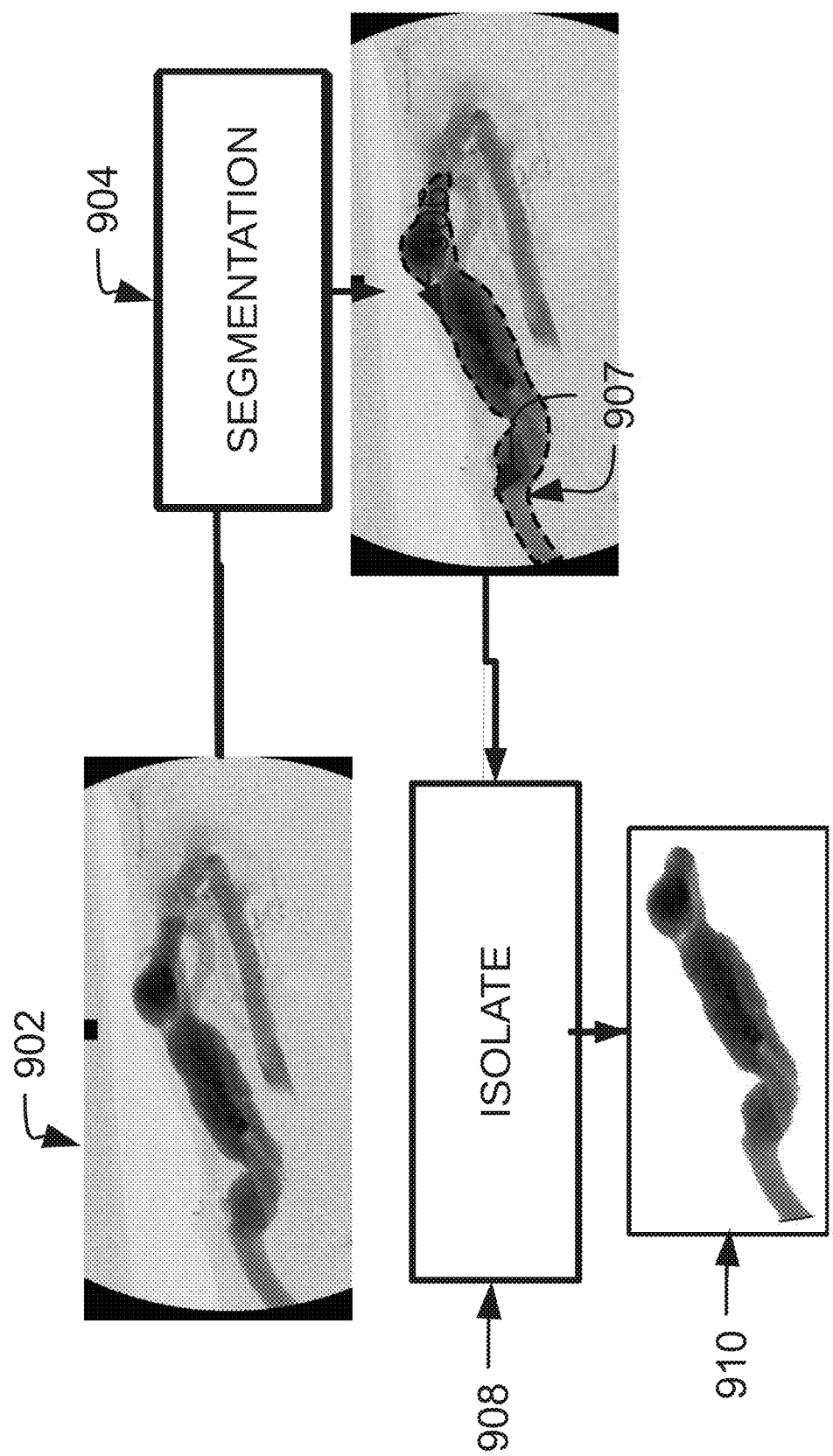
FIG. 9 is a simplified flow chart illustration of a segmentation method according to an example embodiment of the invention.

Reference is now made to FIG. 9, which is a simplified flow chart illustration of a segmentation method according to an example embodiment of the invention.

FIG. 9 shows an exemplary segmentation flow, including input of a first image 902, segmentation 904 of the first image 902 producing a second image 906 with optional segmentation lines 907, optionally isolating 908 an organ which appears in the second image 906, producing a third image 910 containing just an image of the isolated organ.

One or more of the following methods may be used: K-means algorithm, Histogram-based methods, Edge detection, Region-growing methods, Mumford and Shah Segmentation, CNN (convolutional neural networks), etc.

Registration between an image or images from an earlier examination and from following examinations. The registration step optionally scales and/or aligns new image(s) to a reference image, optionally the image(s) from the earlier examination.

Figure 10:
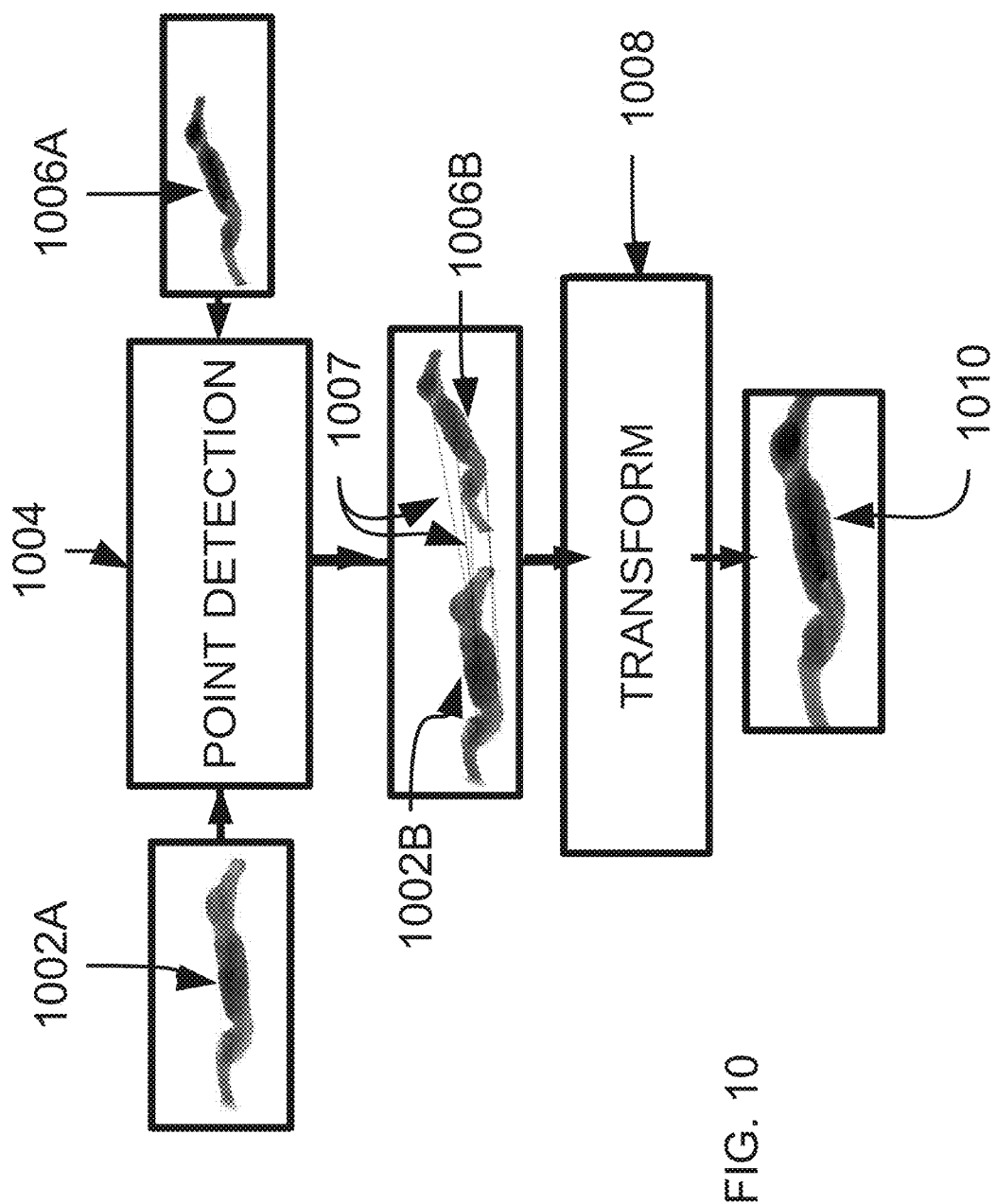
FIG. 10 is a simplified flow chart illustration of a registration method according to an example embodiment of the invention.

Reference is now made to FIG. 10, which is a simplified flow chart illustration of a registration method according to an example embodiment of the invention.

FIG. 10 shows a first image 1002A and a second image 1006A.

In some embodiments a point detection operation 1004 is optionally performed on the two images.

In some embodiments a point detection criterion is optionally one or more of: corner points, an intensity based criterion such as blob detection, SURF (speed up robust features), and so on.

In some embodiments, similarity of two points is measured by a feature metric difference between one or more feature metrics of each one of the two points.

The first image 1002A is marked by specific points detected in the first image 1002A, producing a first new image 1002B with specific points marked thereon. The second image 1006A is marked by specific points detected in the second image 1006A optionally according to same criteria used for detecting points in the first image 1002A, producing a second new image 1006B with specific points marked thereon.

FIG. 10 shows some lines 1007 connecting corresponding specific points in the first new image 1002B and the second new image 1006B.

In some embodiments one or both of the first new image 1002B and the second new image 1006B are optionally transformed 1008, using the detection of corresponding marked points to perform the transformation, optionally producing a new combined image 1010. In some embodiments the transformation 1008 includes one or more of image standardization, image scaling, image rotation, and affine transform, performed on one or both of the first new image 1002B and the second new image 1006B.

In some embodiments the registration is performed to align and/or scale a first image, for example a current examination image, to a second image, for example a prior examination image.

One or more of the following methods may be used for registration: SIFT (Scale Invariant Feature Transform), SURF (speeded up robust features) algorithm, optionally for interest-points detection, Automated Feature Detection and Matching, and Affine transform calculation.

Feature extraction: A features extraction block may include several sub-blocks that analyze data and extract features from images.

In some embodiments the feature extraction optionally produces a feature vector.

In some embodiments the feature extraction is optionally performed after an image processing step which produces a standardized image.

The features vector is a mathematical representation used to characterize data such as an image. There are several ways to characterize the data, some of which are listed below:

Feature extraction from a pre-trained DNN (A. Krizhevsky, I. Sutskever, G. E. Hinton: ImageNet Classification with Deep Convolutional Neural Networks. NIPS 2012: 1106-1114).

One method includes passing an image through a neural network that was trained on a large image data set and use its descriptors layer.

Another way is to develop specific descriptors for each phenomenon.

Figure 11:
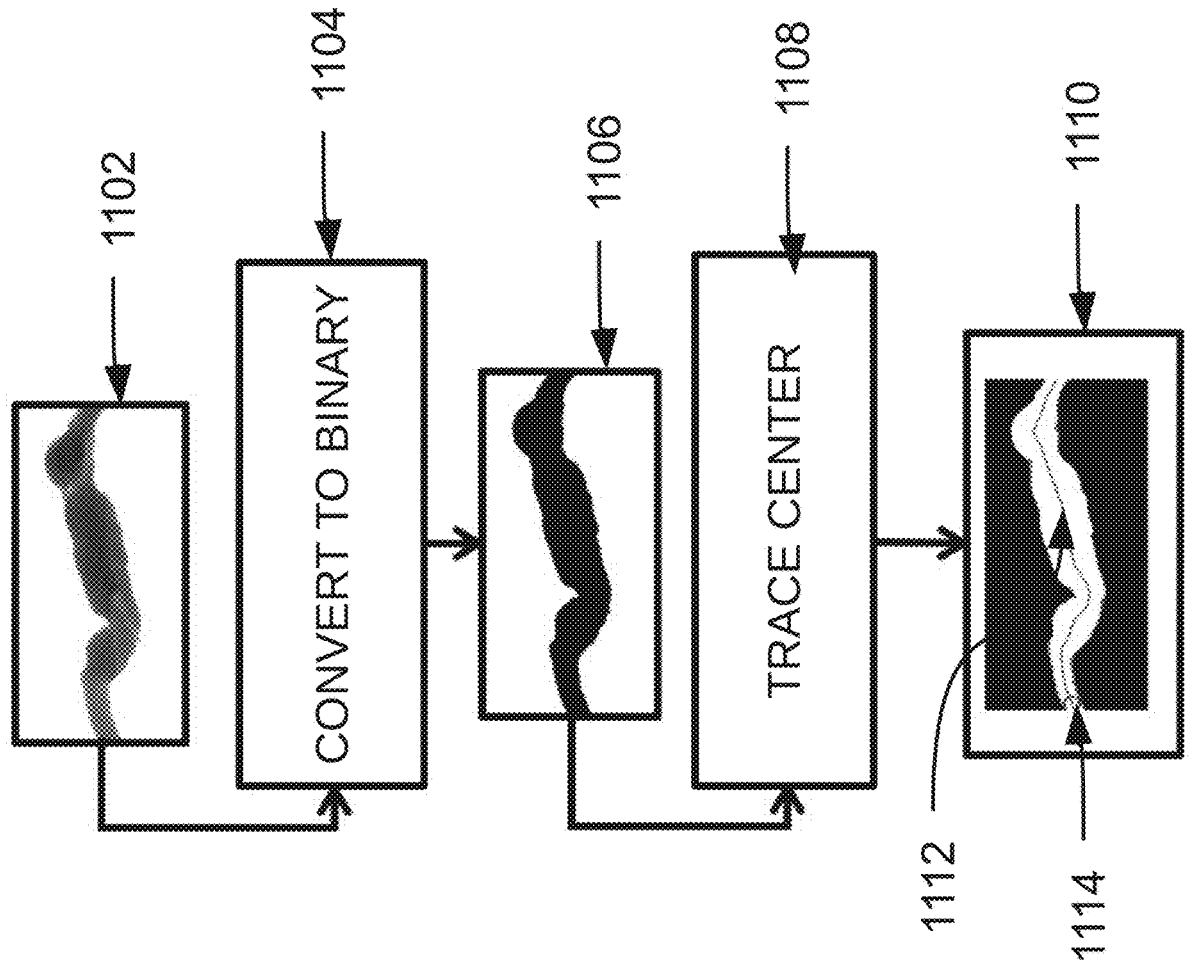
FIG. 11 is a simplified flow chart illustration of a method according to an example embodiment of the invention.

Blood vessel length and smallest diameter:

Reference is now made to FIG. 11, which is a simplified flow chart illustration of a method according to an example embodiment of the invention.

FIG. 11 illustrates a method producing a descriptor for a blood vessel's length and/or smallest diameter.

FIG. 11 shows:
- a first image 1102 as an input;
- a conversion 1104 of the first image 1102 to a binary image 1106;
- a location 1114 of a narrowest passage in the organ (blood vessel); and
- a tracing 1108 of a center line of the organ (blood vessel) appearing in the binary image 1106, producing a third image 1110 with a center line 1112 of the organ (blood vessel) marked on the third image 1110.

A similar method can also optionally be used for producing a descriptor for "pulse wave velocity", "collateral vessels development", and "aneurysm and stenosis".

In the above method, "Distance transform" and "local maxima" methods may be used on a binary image for detecting the center line of the blood vessel and the diameter.

Other methods that can be useful are: Path finding algorithm—Dijkstra's algorithm, A* search algorithm.

Figure 12:
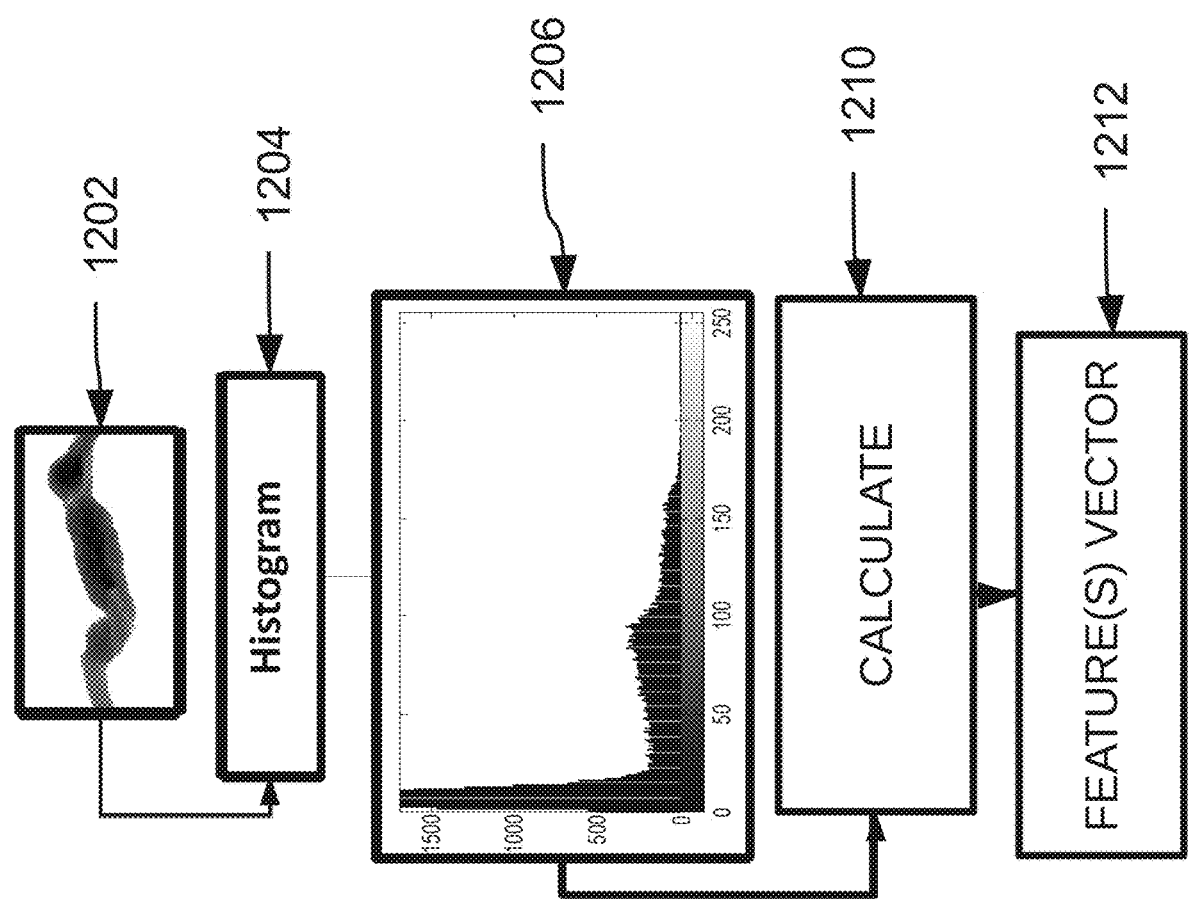
FIG. 12 is a simplified flow chart illustration of a method according to an example embodiment of the invention.

Mixed arterial and venous oxygen concentrations in the VA:

Reference is now made to FIG. 12, which is a simplified flow chart illustration of a method according to an example embodiment of the invention.

FIG. 12 illustrates a method producing a descriptor for arterial and/or venous oxygen concentrations in the VA.

FIG. 12 shows:
- a first image 1202 as an input;
- a histogram unit 1204 for producing a histogram 1206 of the first image 1202; and
- a calculation unit 1210 for producing a feature(s) vector 1212 associated with the first image 1202.

The absorption of deoxy Hb is higher than Oxy Hb at the range of 740 nm to 760 nm, so at this range, veins absorb the light radiation and arteries become relatively more transparent.

At the range of 850 nm to 1000 nm the veins become relatively more transparent and arteries absorb more radiation.

The blood in the VA is a mixture of arterial and venous blood, especially when stenosis occurs, resulting in recirculation of blood.

As long as the VA functionality is good, a higher rate of arterial blood should flow though the VA, which is indicated by a darker gray level when illuminating at 850 nm to 1000 nm. By calculating the histogram for an intensity "standardized" image, such as the first image 1202 shown in FIG. 12, and comparing the histogram to a histogram of a "reference" image, the system can create a features vector that describes a change in the blood mixture in the VA, or a rate of change in the blood mixture in the VA.

Pulse Wave Velocity

Figure 13:
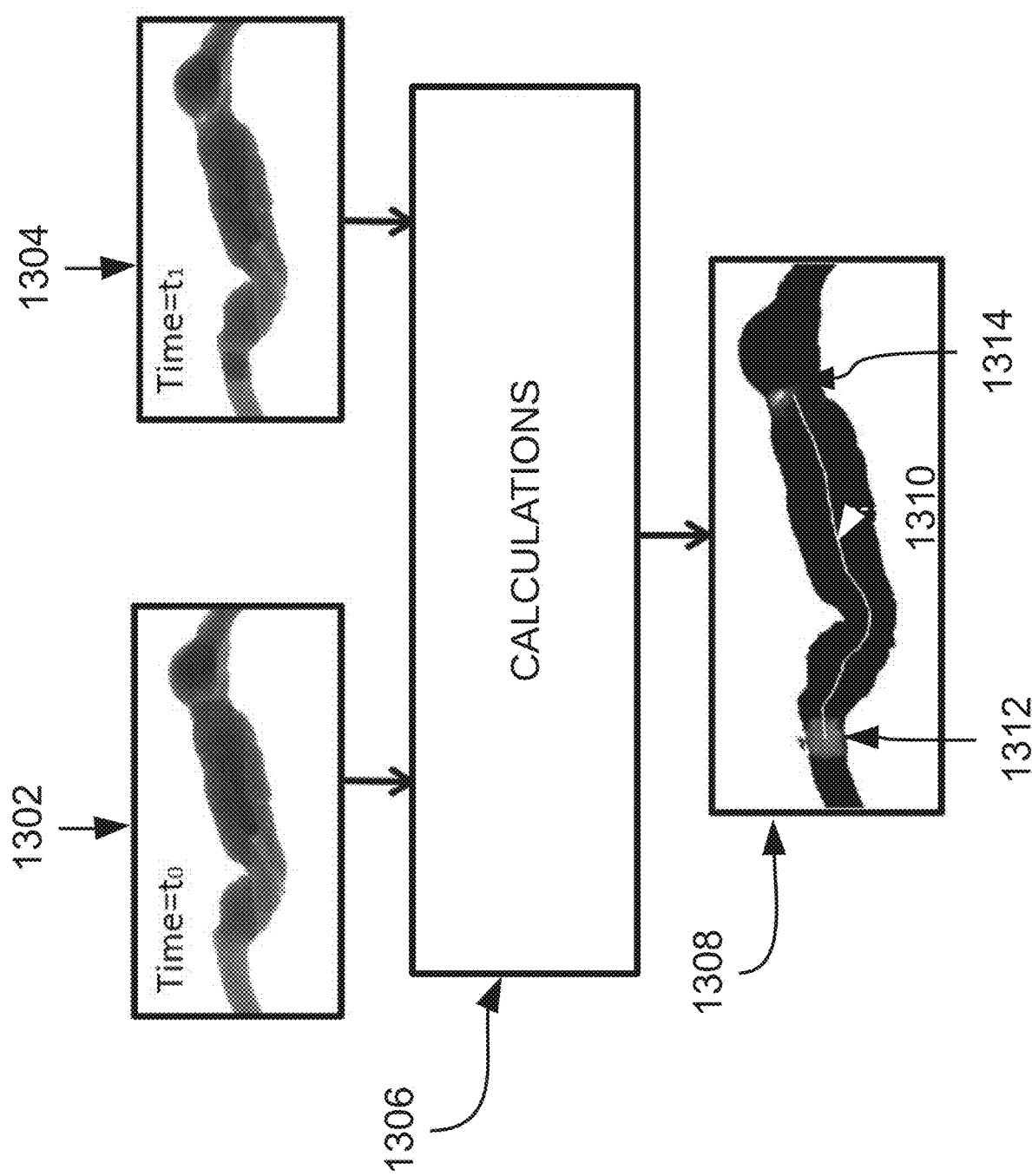
FIG. 13 is a simplified flow chart illustration of a method according to an example embodiment of the invention.

Reference is now made to FIG. 13, which is a simplified flow chart illustration of a method according to an example embodiment of the invention.

FIG. 13 illustrates a method for calculation of pulse wave velocity.

FIG. 13 shows:
- a first image 1302 obtained at a time $t_0$ as an input;
- a second image 1304 obtained at a time $t_1$ as an input; and
- a calculation unit 1306 for producing a third image 1308.

FIG. 13 illustrates an exemplary method for features extraction of pulse wave velocity.

In some embodiments, two consecutive image frames, such as the images 1302 1304 of FIG. 13, optionally each image frame after registration and/or segmentation (standardized images), are fused, producing a fused image such as the third image 1308.

In some embodiments the fused image is produced by subtraction of one of the images from the other.

In some embodiments the fused image is produced by adding one of the images to the other.

In some embodiments centers of mass of the two brightest spots 1312 1314 are calculated, and a length of a path 1312 between the centers of mass of the two brightest spots 1312 1314 along the path 1312 is measured.

In some embodiments the path 1312 is optionally a center line of the blood vessel.

Statistical Classifier Model

Figure 14:
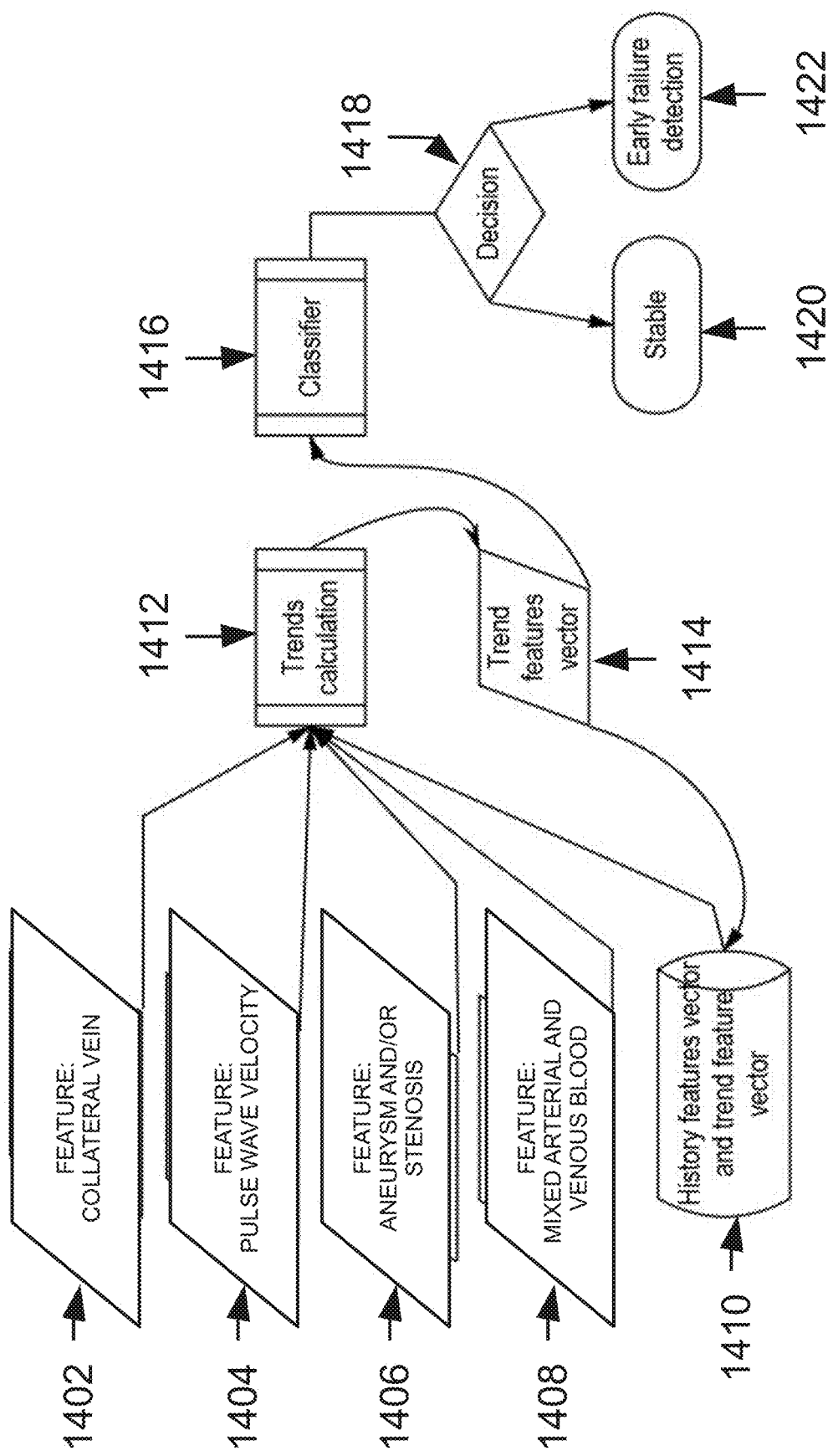
FIG. 14 is a simplified flow chart illustration of a classifier method according to an example embodiment of the invention.

Reference is now made to FIG. 14, which is a simplified flow chart illustration of a classifier method according to an example embodiment of the invention.

FIG. 14 shows input of one or more feature descriptors, such as: a collateral vein descriptor 1402, a pulse wave velocity descriptor 1404, an aneurysm and/or stenosis descriptor 1406, and an arterial and venous blood mix descriptor 1408.

In some embodiments the inputs 1402 1404 1406 1408 are fed into a trend calculation unit 1412. In some embodiments the trend calculation unit 1412 optionally accepts input of a historical and/or trend descriptor 1410, optionally from a local or a remote database.

In some embodiments the trend calculation unit 1412 produces a trend features vector 1414.

In some embodiments the trend features vector 1414 is optionally stored in the (local or remote) database.

In some embodiments the trend features vector 1414 is input to a classifier 1416.

A result of the classifier 1416 is optionally input to a decision unit 1418, which produces a decision that the VA is determined to be "stable" 1420, or that a failure is detected 1422.

In some embodiments the detecting a failure may include estimating a high probability of imminent failure of the VA.

Classification to a "stable" or an "Early failure detection" can be done by a statistical classifier model, such as SVM, logistic regression, Neural network, etc.

In some embodiments extracted features 1402 1404 1406 1408 of every phenomenon are optionally collected to one "features" vector 1414.

In some embodiments the features vector 1414 is optionally stored in a data base.

In some embodiments the features vector 1414 and a "history features vectors" 1410 are optionally sent to a "Trends calculation" unit 1412.

In some embodiments the output of the "Trends calculation" unit 1412 is a "new trend features vector" 1414, which is optionally stored in the database and/or sent to a classifier unit 1416.

In some embodiments output from the classifier unit 1416 can be detected to be "Early failure detection" or "Stable".

In some embodiments, classification is made to a maturity level or rate of maturation after VA surgery can be done.

The rate of maturation of a fistula may be expressed as X % maturation after Y number of days.

Figure 15A:
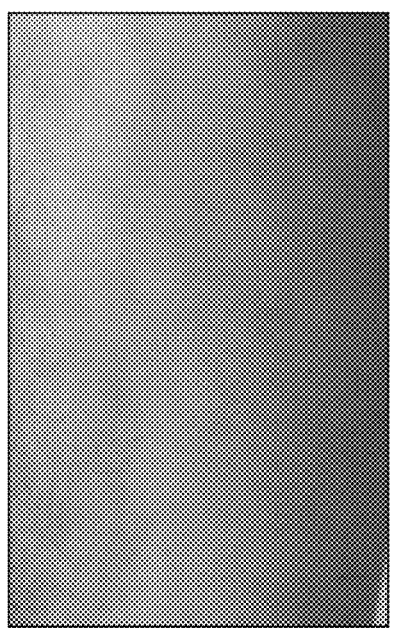
FIGS. 15A-C show three different images of a same patient arm, according to an example embodiment of the invention.
Figure 15B:
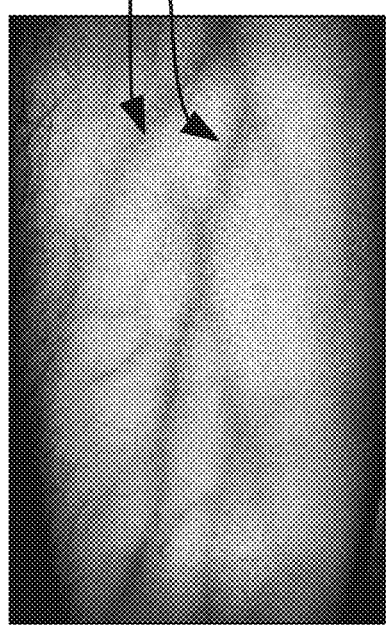
Figure 15C:

Reference is now made to FIGS. 15A-C, which show three different images of a same patient arm, according to an example embodiment of the invention.

FIG. 15A shows an image of a patient's arm in human-visible wavelengths, taken at a distance of approximately 40 centimeters from the arm.

FIG. 15B shows an image of a patient's arm in Near IR wavelengths. FIG. 15B shows that using Near IR imaging improve visibility of blood vessels such as superficial veins 1512.

FIG. 15C shows an image of a patient's arm, with points-of-interest 1522 which were automatically (by image analysis) generated at locations of the blood vessels.

When a nurse or physician examines a patient's blood vessels, they typically use a three-step procedure: look, listen and feel.

In some embodiments, systems as described herein perform a look, listen and feel based on illuminating and imaging a patient's limb and analyzing the data collected from the imaging.

In some embodiments, methods as described herein performs a look, listen and feel based on illuminating and imaging a patient's limb and analyzing the data collected from the imaging.

Reference is now made to FIG. 16A, which is a table showing a procedure for a medical person to examine a patient with reference to vascular stenotic lesions or thrombosis.

FIG. 16A is intended to show what a human is instructed to do. However, it is known that differences between humans is expected to affect such examinations.

It is noted that automatic examination is potentially able to provide better reproducibility for such examinations.

It is noted that automatic examination is potentially able to provide faster examinations with less involvement of medical staff.

Figure 16B:
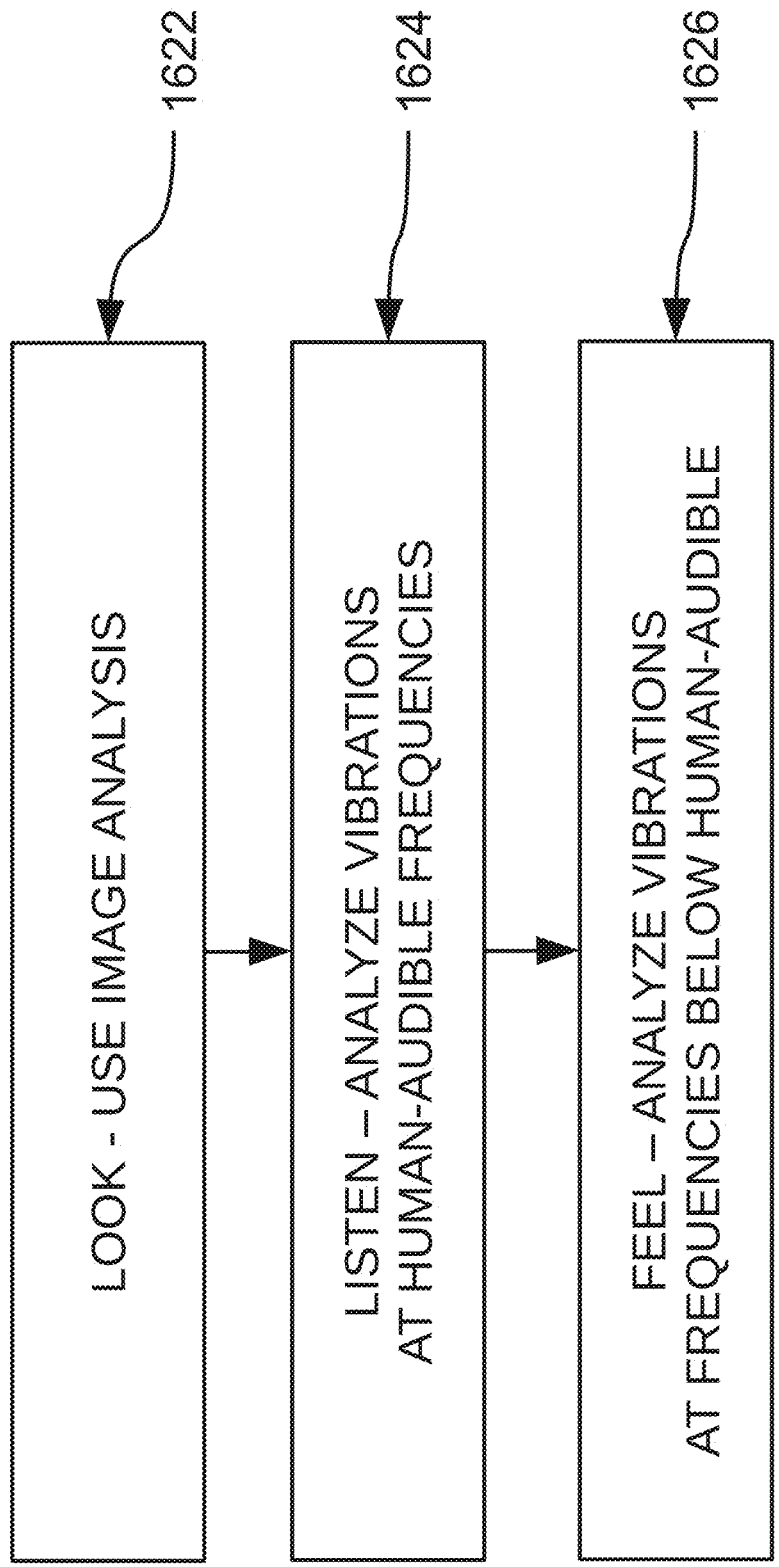
FIG. 16B is a simplified flow chart illustration of a method of examining a patient according to an example embodiment of the invention.

Reference is now made to FIG. 16B, which is a simplified flow chart illustration of a method of examining a patient according to an example embodiment of the invention.

The method of FIG. 16B includes:
 a device looking (1622) at a patient's body by capturing one or more images of the body, and using image analysis on the image(s);
 the device listening (1624) to a patient's body by capturing vibrations of the body, and analyzing the vibrations at human-audible frequencies; and
 the device feeling (1624) the patient's body by analyzing vibrations of the body, at frequencies below human-audible frequencies.

In some embodiments, the capturing one or more images of the body is optionally performed by capturing images at Near IR wavelengths.

In some embodiments, the capturing vibrations of the body is optionally performed by laser speckle imaging, as described elsewhere herein.

In some embodiments, the capturing vibrations of the body is optionally performed by a microphone touching the patient's body, and/or by a microphone attached to a stethoscope touching the patient's body.

It is noted that automatic examination, in some embodiments, is potentially able to provide such an examination without a human touching the patient, potentially usable in conditions where medical distancing is desired, such as, for example, when the patient may carry a contagious disease.

In some embodiments, the systems and methods described herein optionally "look", that is, analyze images of blood vessels, "listen", that is, analyze vibration of the patient's body at human hearing frequencies, and "feel", that is, analyze vibration of the patient's body at low frequencies, reaching lower than typical audio frequencies.

In some embodiments, a no-contact surveillance tool is provided, to complement and/or replace physical examination of vascular access (VA). Such surveillance potentially enables early detection of stenosis, potentially earlier than human examination.

In some embodiments, the surveillance tool does not contact a patient's fistula, and/or a patient's limb, even while the limb is optionally positioned in a device which enables position the fistula in a field of view of the device.

In some embodiments, recording and monitoring parameters measure by the surveillance potentially enables the early detection and/or prediction of stenosis, potentially earlier than human examination.

In some embodiments, surveillance is enabled without human touch, for example at distances greater than 10, 20, 30, 40, 50 centimeters from a location of VA.

In some embodiments, the system and methods optionally enable acquiring all parameters typically acquire by a human physical examination by look, feel, and listen.

In some embodiments, it is easier to train persons to operate monitoring VA using embodiments as described herein than using the human senses.

Using embodiments as described herein, potentially add value by recording and using same-patient historical data and tracking changes.

Using embodiments as described herein potentially enable pre- and/or post-session examination in a clinic with no physical contact.

Using embodiments as described herein potentially support medical care under COVID-19.

Using embodiments as described herein potentially enable care in a home setup, possibly operated by a patient.

Figure 17:
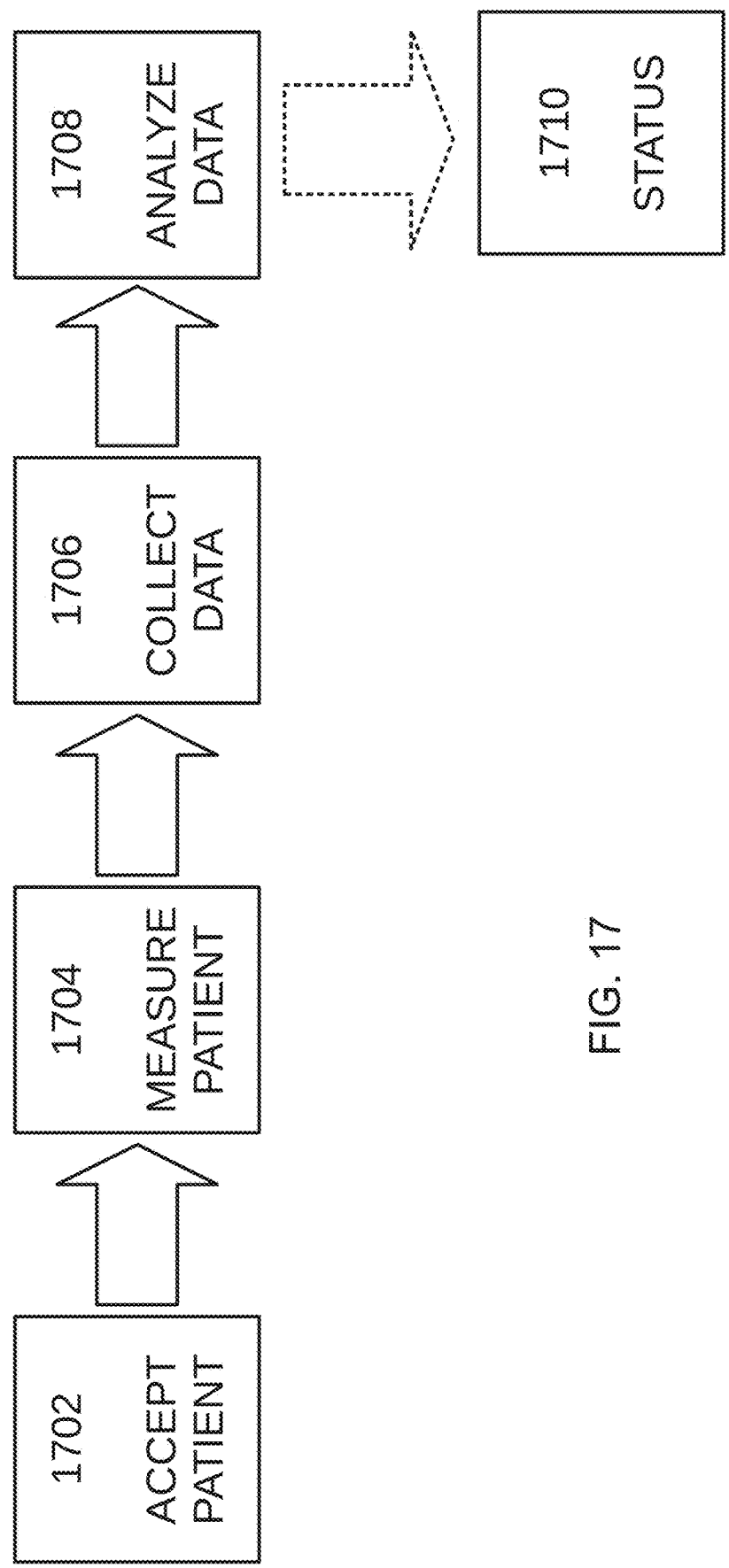
FIG. 17 is a simplified block diagram illustration of a method for examining a patient according to an example embodiment of the invention.

Reference is now made to FIG. 17, which is a simplified block diagram illustration of a method for examining a patient according to an example embodiment of the invention.

FIG. 17 shows a method including:
 accepting a patient for examination (1702);
 measuring the patient, using an embodiment of the invention (1704);
 collecting data from sensors (1706);
 analyzing the data (1708); and
 optionally providing a decision (1710) regarding a status of the patient's fistula.

The status of the patient's fistula optionally includes a determination of a medical condition and/or patency of the patient fistula. The medical condition is optionally determined to be healthy and/or functioning or having a probability of deterioration. In some embodiments a probability of deterioration above a certain threshold optionally produces a recommendation to send the patient to additional tests such as Doppler ultra-sonography or X-ray angiography.

Figures 18A, 18B:
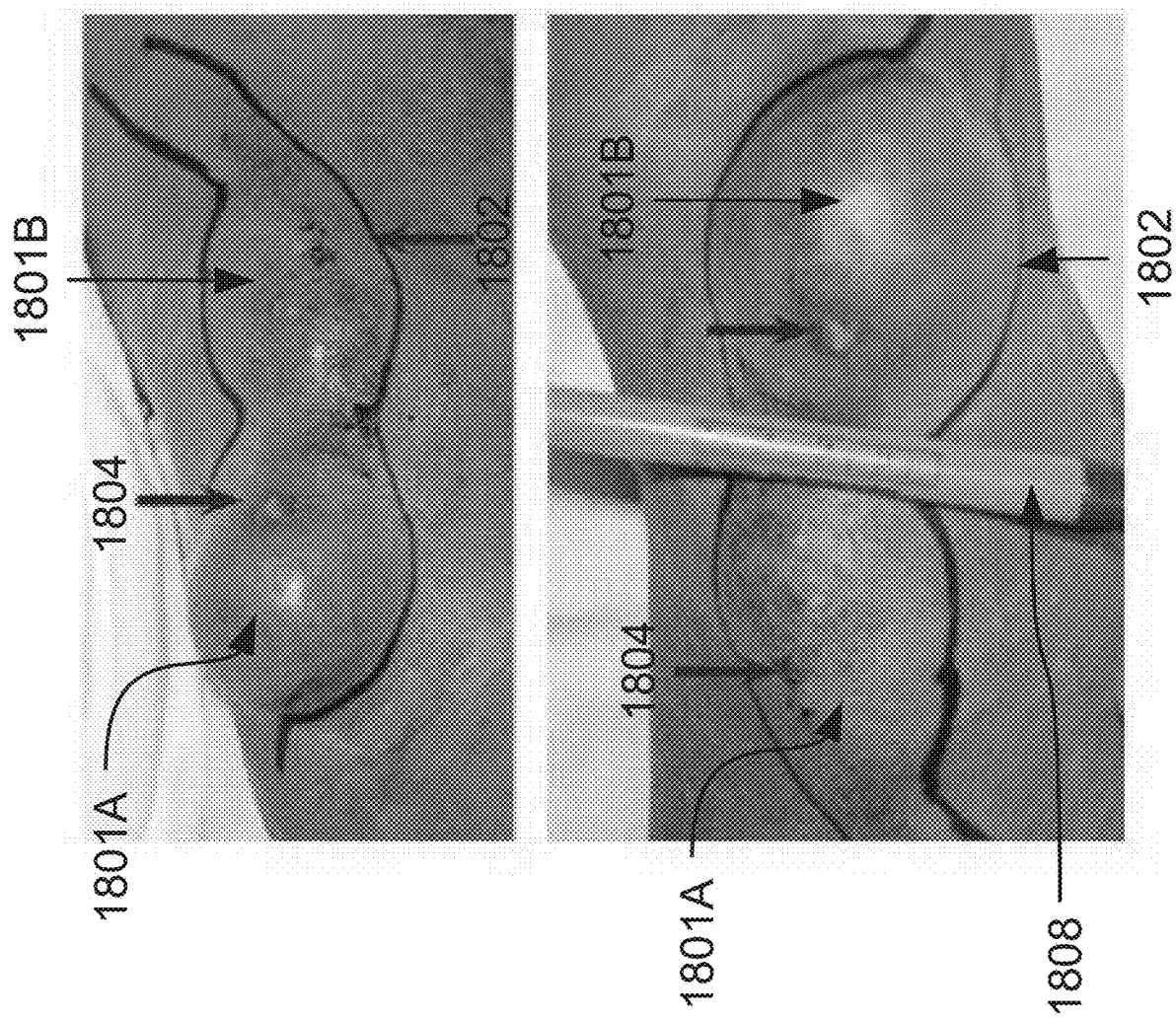
FIGS. 18A and 18B are images of a fistula of a patient taken at two different times.

Reference is now made to FIGS. 18A and 18B, which are images of a fistula of a patient taken at two different times.

FIG. 18A shows an ink marking 1802 of an outline of the fistula. FIG. 18A also shows a physical feature 1804 visible on the skin of the patient.

FIG. 18B is an image of the fistula taken at a different time. FIG. 18B shows that the ink marking 1802 change shape due to a change in the shape and/or size of the fistula. FIG. 18B also shows that the physical feature 1804 appears to have moved, relative to an outline of the fistula, or to the ink marking 1802.

FIGS. 18A and 18B are images of a 36-year-old man with a right brachiocephalic fistula created in 2004. The fistula has several aneurysms 1801A 1801B.

Figure 19A:
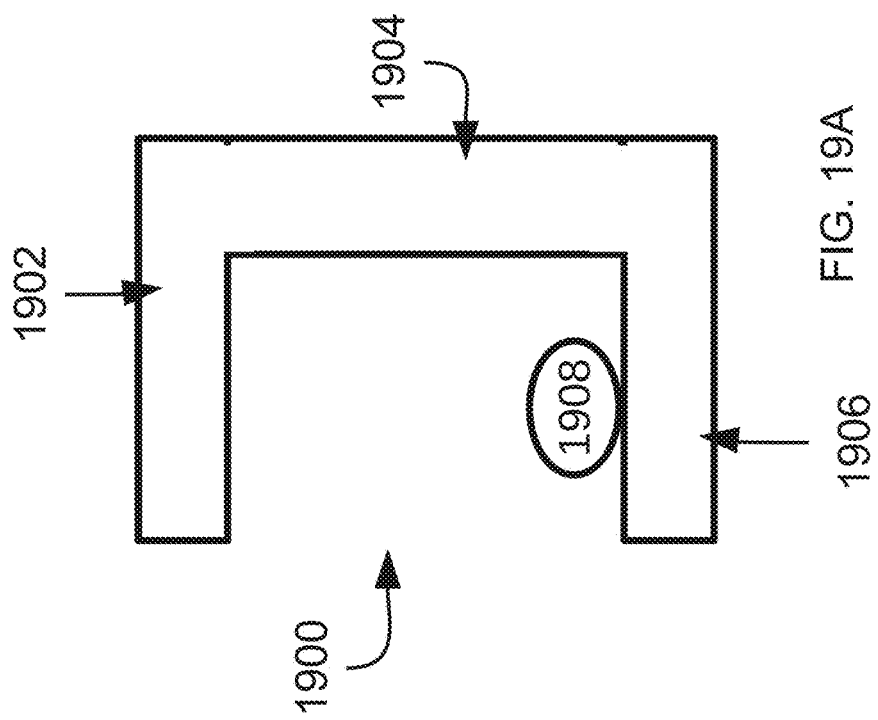
FIGS. 19A and 19B are simplified drawings of a system for monitoring vascular access (VA) and/or fistulas according to two example embodiments of the invention.
Figure 19B:
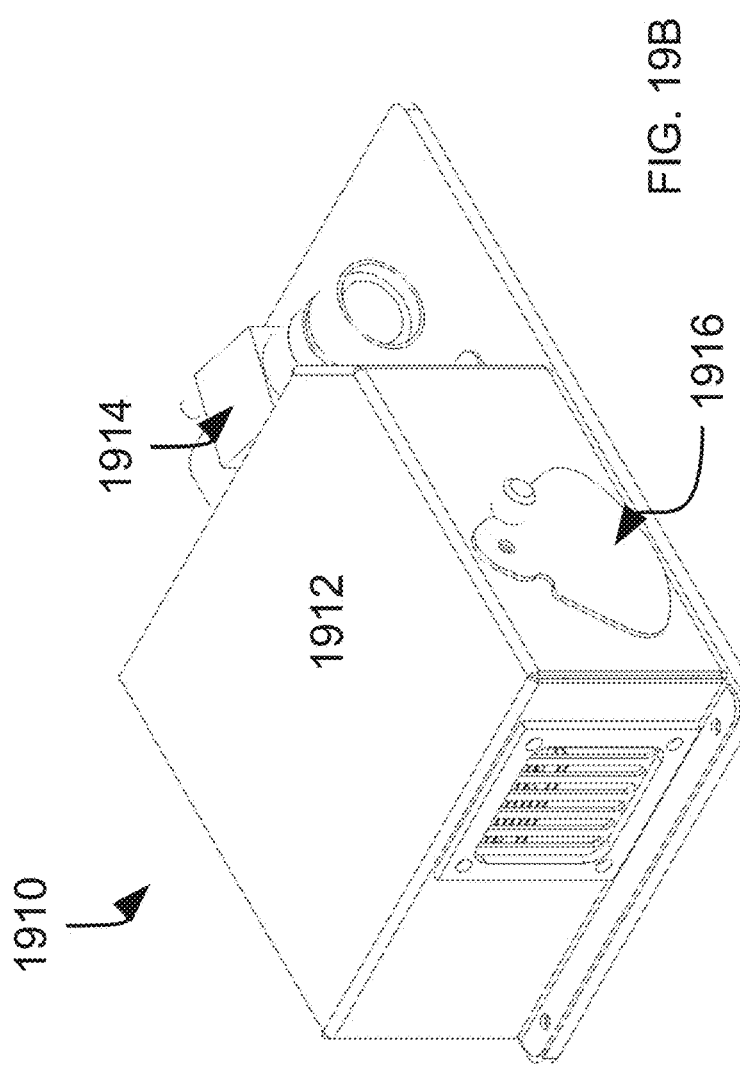

Reference is now made to FIGS. 19A and 19B, which are simplified drawings of a system for monitoring vascular access (VA) and/or fistulas according to two example embodiments of the invention.

FIG. 19A shows a system 1900 including a head 1902 and a base 1906. The head 1902 optionally includes a light projector and an imaging system. In some embodiments, the base 1906 optionally includes a shape configured to support an arm or leg in a specific position relative to the head 1902. In some embodiments, the base 1906 optionally includes a strap configured to support an arm or leg in a specific position relative to the head 1902.

FIG. 19A shows a system 1910 including a projector 1912 and an imager 1914. In some embodiments, the projector 1912 includes an optional cover 1916. In some embodiments, in especially in case when the projector includes a laser, the cover 1916 may be desired and/or required for safety.

In some embodiments, the imager 1914 is optionally capable of imaging frame at a rate above standard video rate, optionally at a rate of 60 Frames Per Seconds (FPS), above 60 FPS, above 100 FPS, above 150, 200, 300, 400, 500 and 600 FPS.

A high frame rate enables detecting vibrations of a patient's body at high frequencies, as is known in the art—Shannon's Law.

In some embodiments, a NIR fast Camera, optionally at frame rates of 150 FPS or greater, is optionally used.

In some embodiments, an off-the-shelf camera is optionally used, for example a FLIR FL3 U3 camera, capable of imaging at a frame rate of 150 FPS at a full frame size of 1.3 megapixels.

In some embodiments, the camera is used to capture a frame rate of more than 160 FPS, up to 600 FPS, 620 FPS and more.

In some embodiments, an off-the-shelf camera is optionally used, capable of imaging at a frame size in a range of 1.3-2 mega-pixels and more.

In some embodiments, an off-the-shelf camera is optionally used, capable of imaging at higher frame rates when imaging at a lower frame size. By way of some non-limiting examples, the camera optionally images at a size of 10×20 pixels, 10×10 pixels, and so on.

In some embodiments, the imager captures a small frame, less than maximum frame size and optionally down to the above-mentioned small frame sizes, of a specific location of interest on the patient's body at a location of the fistula or location of a VA point of interest.

In some embodiments, the projector optionally projects light onto the location of interest to enable a user to locate the patient's body correctly.

In some embodiments, the location of interest is a patient's fistula.

In some embodiments, more than one spot is illuminated simultaneously.

In some embodiments, one location of interest where a spot is illuminated is a patient's fistula, and another location of interest where a spot is illuminated is a location neighboring the patient's fistula, but not at the fistula.

In some embodiments, one location of interest where a spot is illuminated is a fistula aneurism, and another location of interest where a spot is illuminated is a location neighboring the fistula aneurism, but not at the fistula aneurism.

In some embodiments, the projector is a Digital Light Processing (DLP) projector.

In some embodiments, the projector is a laser projector.

In some embodiments, a location of interest, for example a fistula, or an aneurysm, or a bloated area of a body, is optionally identified by using structured lighting and image analysis, and the projector is controlled, optionally automatically controlled, to illuminate the location of interest. In some embodiments, the DLP and/or the laser projector are optionally controlled to illuminate the location of interest.

In some embodiments, a physician or nurse controls the illumination to the location of interest.

In some embodiments, a physician or nurse controls laser illumination to the location of interest.

In some embodiments, the projector is optionally capable of projecting light in multiple modes. The modes include two or more of:

projecting uniform (or approximately uniform) lighting on an area, or a limited spot, on a patient's body, potentially sufficient for imaging collateral veins;

projecting structured lighting, optionally including stripes of specific widths, equal widths or unequal widths as programmed or other patterns; and projecting one or more spots of coherent laser light, potentially useful for measuring one or more of vibration, micro vibration, and pulses, for example by Laser Speckle Interferometry.

In some embodiments the projector is capable of switching between any one of three different lighting modes: uniform, structured and spot.

In some embodiments the projector is capable of providing a spot size in a range of diameters between 0.5 mm and 5 mm on a patient's limb. For example, a spot size of approximately 1 mm.

In some embodiments the projector includes one or more LEDs and/or laser light sources, optionally at Near IR wavelengths.

In some embodiments the projector is optionally a Digital Light Processing (DLP) projector.

In some embodiments the projector optionally includes nano-mirrors to shape light.

In some embodiments the projector optionally includes Micro-Electro-Mechanical System (MEMS) mirrors to shape light.

In some embodiments the projector optionally includes a Digital Mirror Driver (DMD).

In some embodiments, the projector and the camera are packaged in one package.

Figure 20:
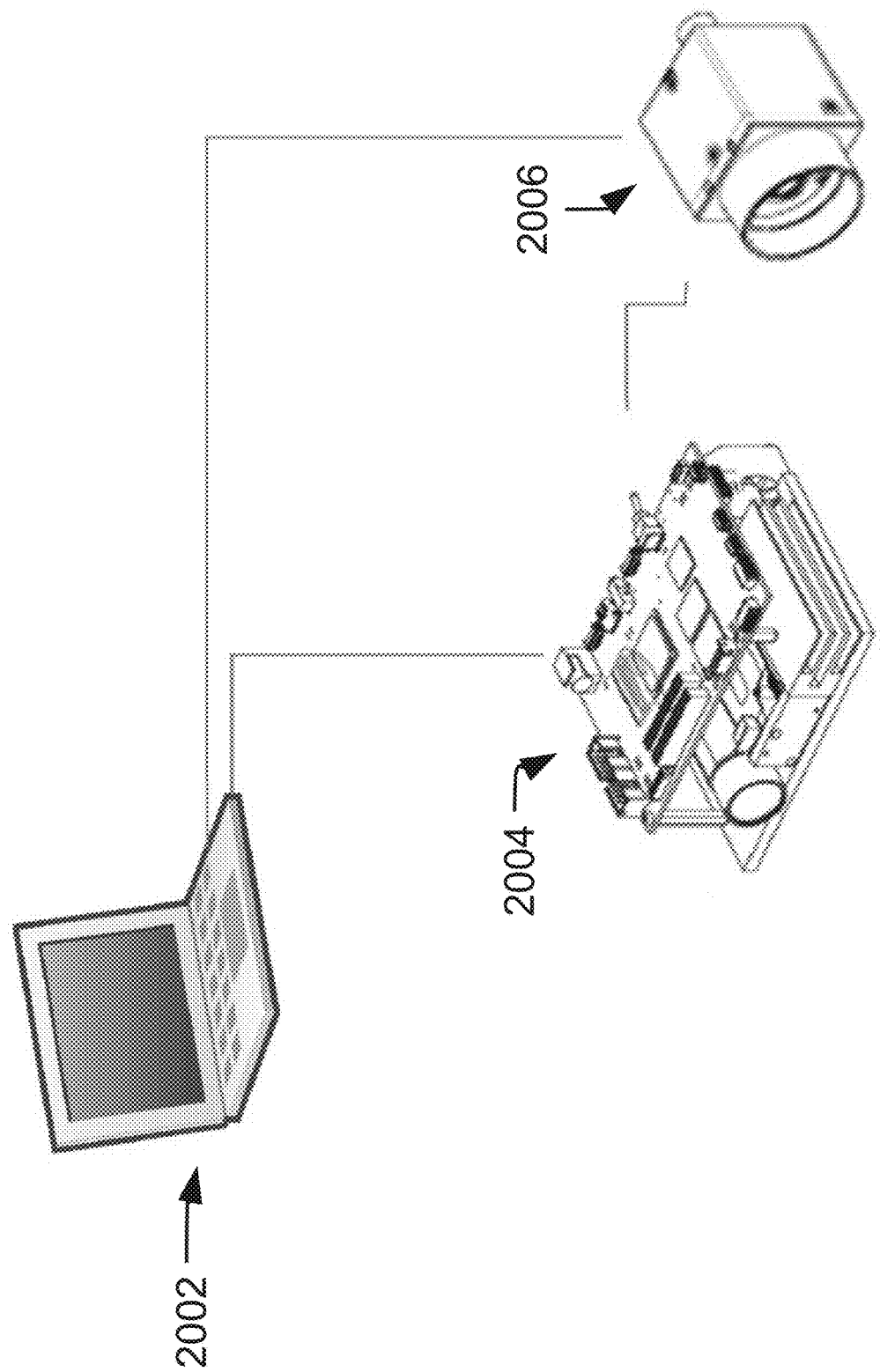
FIG. 20 is an image of a system for monitoring vascular access (VA) and/or fistulas according to an example embodiment of the invention.

Reference is now made to FIG. 20, which is an image of a system for monitoring vascular access (VA) and/or fistulas according to an example embodiment of the invention.

FIG. 20 shows a system including a projector 2004, an imager 2006 and an optional processor 2002.

Reference is now made to FIGS. 21A-C, which show three different images of a same patient's arm.

The image of FIG. 21A shows the patient's arm held below the patient's heart level. Two inflated needle insertion points 2102 2104 are shown on the patient's arm fistula.

The image of FIG. 21B shows the patient's arm held above the patient's heart level, the image captured just after the patient raised the arm to the elevated position. A first 2102 one of the insertion points is shown deflated, and a second 2104 of the insertion points is still inflated.

The image of FIG. 21C shows the patient's arm held elevated, the image captured a little later than the image of FIG. 21B. Both of the needle insertion points 2102 2104 are shown deflated and collapsed.

Examination with Elevation Test

In some embodiments, systems and methods described herein are optionally used to measure and quantify in an elevation test, that is, the measurement and quantification are performed once or more with a body or limb held below the heart level, and once or more with the body or limb held at an elevated position above heart level.

As FIGS. 21A-C show, in some instances a fistula may not drain when held at one position, and drain when held at one or more other positions. In some instances a fistula may not drain when held at one position, and also not drain when held at one or more other positions.

Differences between the positions correlate with medical condition of the fistula such as a ratio between inflow and outflow rates and/or pressure).

The rate and manner at which the fistula drains, as well as the difference between draining pattern while at different elevations correlates with medical condition of the fistula. In some embodiment, drainage rate and/or pattern are measured, optionally by generating a 3D shape and/or one or more 3D curves depicting the outer shape of the fistula and/or tracing changes between curves along the set.

In some embodiments, the drainage rate and pattern are optionally estimated by evaluating the volume encapsulated by the 3D shape and/or by one or more curve(s) and tracing the change in total volume over time, potentially providing a level and rate of draining.

In some embodiment a spatial curvature of a curve(s) can be estimated, and drainage pattern can be characterized by analyzing the changes in curvature over time.

In some embodiment the smoothness of curvature of each curve and changes in curvature smoothness over time during drainage can be used for estimation of a drainage pattern.

In some embodiment correlation between any flow related parameter estimated from analysis of measured vibrations and any parameter estimated from the drainage pattern or rate based on 3D shape or curve shape(s) is optionally used for estimating fistula health.

Figure 22A:
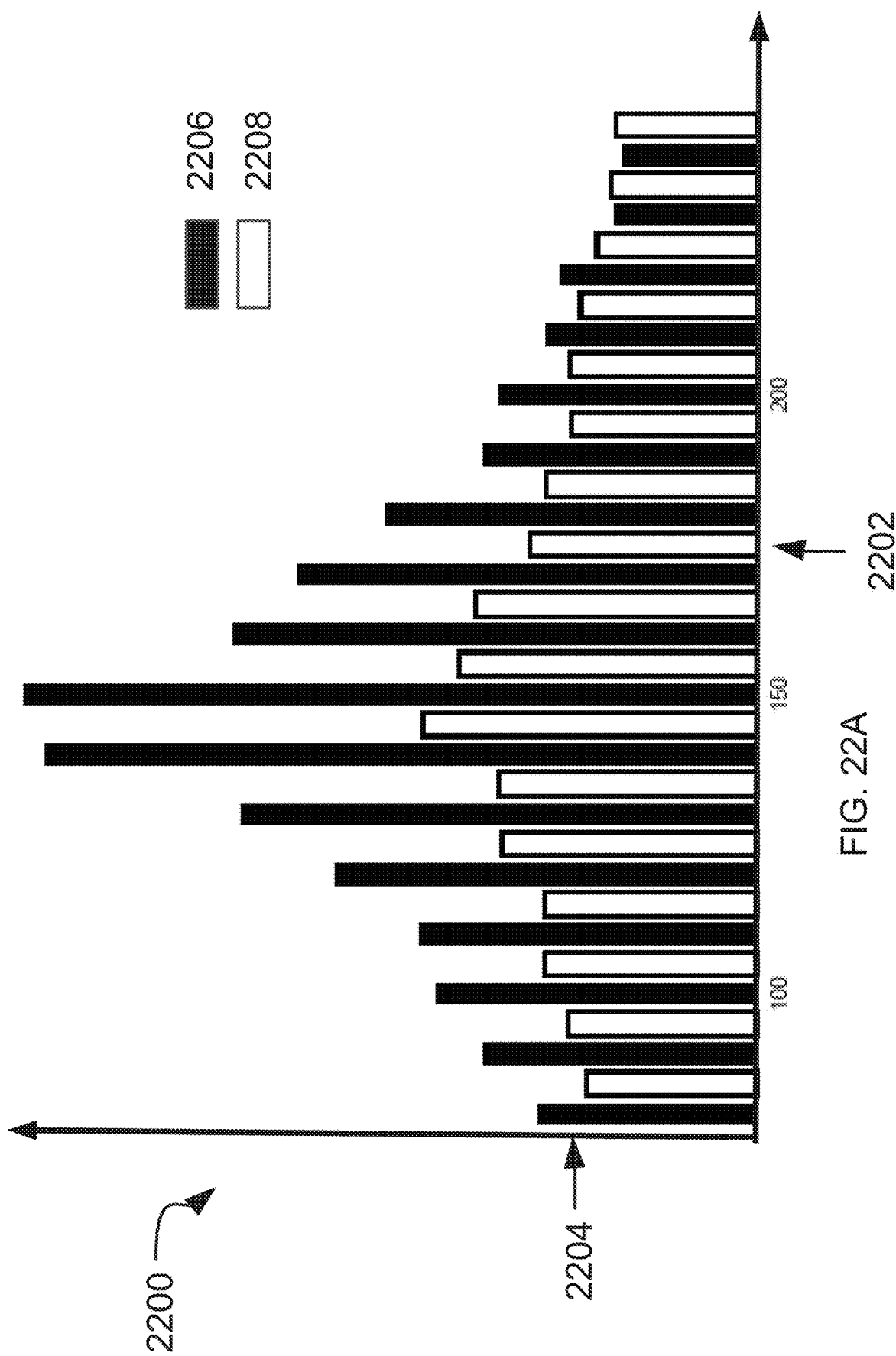
FIG. 22A is a graph showing power spectrum of vibrations measured by analysis of images produced by laser speckle imaging.

Reference is now made to FIG. 22A, which is a graph showing power spectrum of vibrations measured by analysis of images produced by laser speckle imaging.

FIG. 22A shows a graph 220, with a X-axis 2202 showing frequency ranges or bins, and a Y-axis 2204 showing relative power spectrum in the units in which it was measured.

Two groups of patients were sampled for producing this graph. A first group 2206 having a blood flow velocity (FV) greater than 500 mL/minute, and a second group 2208 having FV less than 500 mL/minute.

The graph 2200 shows us that the maximum in the power spectrum is located approximately at approximately 140 Hz for both groups. This leads us to suspect that listening to the pitch of the blood flow in both groups might not be a good method to differentiate among them. However, analyzing the power spectrum of both groups shows differences:

The first group 2206 appears to have a higher amplitude at the maximum than the second group 2208;

The second group 2208 appears to have a flatter, or broader, curve than the first group 2206.

The vibrations analyzed in the power spectrum, as shown in FIG. 22A, are caused by blood flow and/or turbulence through a blood vessel.

Flow and turbulence change over time and are affected by local physical conditions in and around the vessels through which the flow occurs. The physical conditions potentially include a pressure gradient, vessel diameter, vessel wall compliance, vessel inner surface characteristics, and so on.

The power spectrum of blood flow measured at VA/fistula locations is potentially related to physical and/or clinical flow conditions at these locations. Changes in the features of such power spectra over time potentially correlate to degradation in fistula health. Analyzing the changes in the power spectrum obtained from the VA/fistula location are potentially early stage predictive of fistula deterioration.

It is noted with reference to early stage predictions described herein, that such predictions potentially enable performing percutaneous transluminal angioplasty (PTA) earlier than would be performed based on the existing state of medical examination.

In some embodiments, the power spectrum is measured by measuring an intensity of light reflected off a patient's body. The intensity is expected to change at a frequency related to frequency of vibration of the body.

In some embodiments, the power spectrum is measured by measuring an intensity of light reflected off an illumination spot on the patient's body. In such embodiments the vibration is practically measured specifically at the illuminated spot.

In some embodiments, the power spectrum is measured by measuring differences between successive images of the body, for example small shifts of a pattern on the body. The pattern may be a mole on the skin, structured lighting, movement of a spot of light, movement of laser speckles, and similar movements.

Figure 22B:
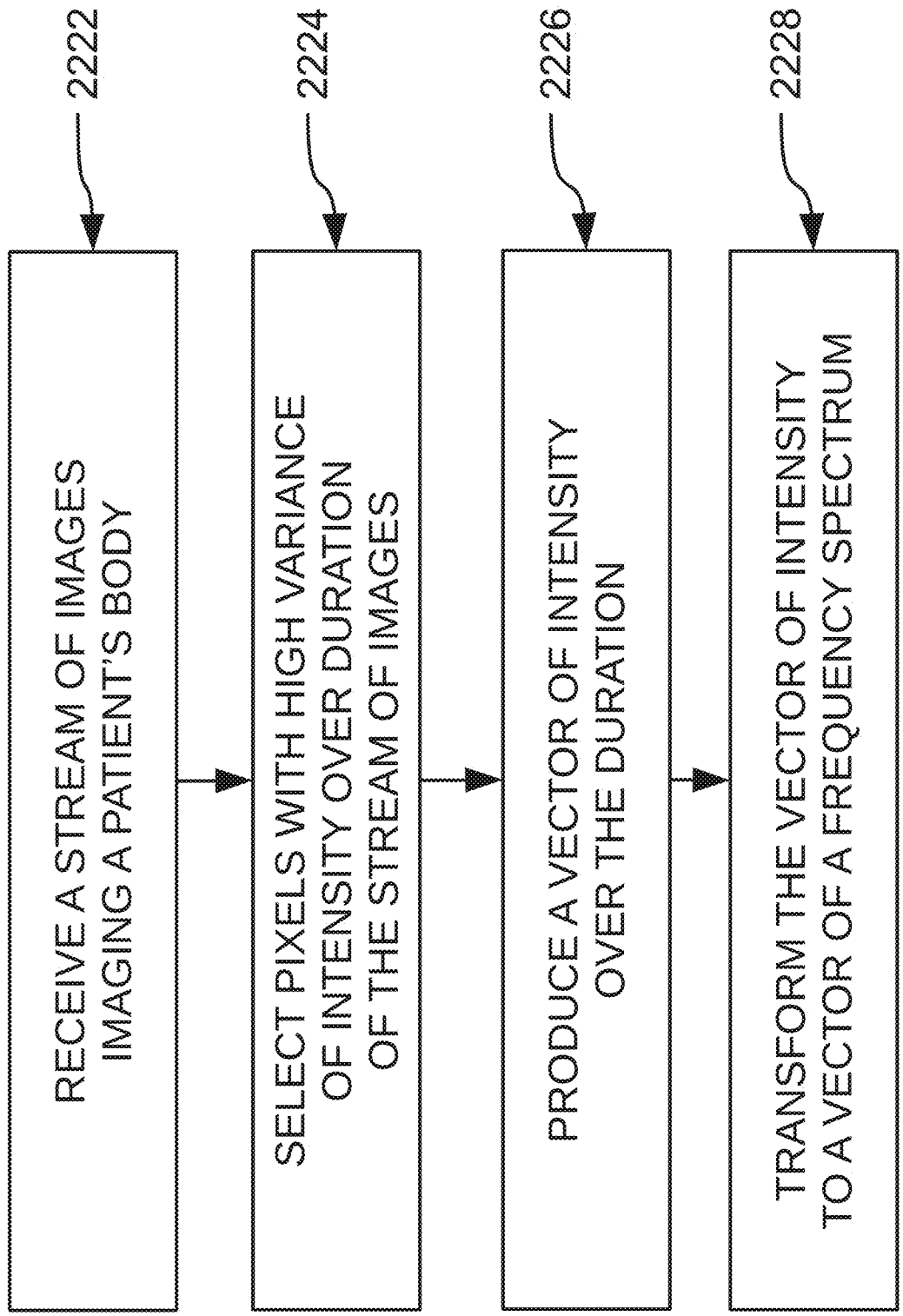
FIG. 22B is a simplified flow chart illustration of a method for transforming data from a stream of images to a frequency spectrum according to an example embodiment of the invention.

Reference is now made to FIG. 22B, which is a simplified flow chart illustration of a method for transforming data from a stream of images to a frequency spectrum according to an example embodiment of the invention.

The method of FIG. 22B includes:
receiving a stream of images imaging a patient's body (2222);
optionally selecting one or more pixels with high variance of intensity over duration of the stream of images (2224);
producing a vector of intensity over the duration (2226);
transforming the vector of intensity to a vector of a frequency spectrum (2228).

In some embodiments, the transforming is performed by a Fast Fourier Transform.

In some embodiments, before analyzing the power spectrum, the power spectrum is optionally normalized. By way of some non-limiting examples, a normalization factor is optionally calculated from: total spectrum energy, peak value, peak to baseline ratio, energy in a specific band width, and so on.

In some embodiments, a reference spectrum measured at a remote location (far from the fistula, on the other hand for example), is used as a reference. Both spectrums may or may not be normalized and the measured spectrum replaces by a difference between the spectra at the different locations.

In some embodiments, skewness or kurtosis of the measured power spectrum or the difference power spectrum are optionally used for estimating flow.

In some embodiments, a measured power spectrum is first fitted to a model, in some embodiments assuming one or more hidden model mixtures, by way of a non-limiting example a Poisson-Gaussian mixture, and model parameters are used as correlators to flow.

In some embodiments, energy in a specific frequency range is used for estimating flow.

Performing Look, Listen and Feel

We additionally describe some aspects of the invention in terms of a procedure of "Look, Listen and Feel" which is used by medical staff.

In some embodiments, a "Look, Listen and Feel" procedure is optionally performed by embodiments of the system described herein.

In some embodiments, systems as described herein perform a look, listen and feel based on illuminating and imaging a patient's limb and analyzing the data collected from the imaging.

In some embodiments, methods as described herein performs a look, listen and feel based on illuminating and imaging a patient's limb and analyzing the data collected from the imaging.

A fistula bruit, also called a vascular murmur, is an indicator of how dialysis access is functioning.

An arteriovenous fistula is one access type that is created by connecting an artery to a vein under the skin, usually in the upper or lower arm or leg. (i) The high blood flow from the artery through the vein allows the fistula to grow larger and stronger. A healthy AV fistula has a bruit (a rumbling sound that a human can hear), a thrill (a rumbling sensation that a human can feel), and good blood flow rate.

In some embodiments, the "Look" aspect is optionally performed by imaging a body or limb and analyzing an image or images to quantify blood vessel structure and/or fistula structure.

In some embodiments, the "Look" aspect is optionally performed by imaging a body or limb using structured light, and producing a 3D shape of a fistula.

In some embodiments, the "Listen" aspect is optionally performed by measuring vibrations of a body or limb and analyzing the vibrations to quantify parameter values relating to a medical condition of a fistula. In some embodiments, the "Listen" aspect includes analyzing vibrations in a frequency range within the human audible range.

In some embodiments, the "Feel" aspect is optionally performed by measuring vibrations of a body or limb and analyzing the vibrations to quantify parameter values relating to a medical condition of a fistula. In some embodiments, the "Feel" aspect includes analyzing vibrations optionally in a frequency range extending even beyond and/or below the human audible range.

In some embodiments, analyzing vibrations is optionally performed in a frequency range of less than 1,000 Hz. In some embodiments, analyzing vibrations is optionally performed in a frequency range of less than a typical human speech, for example less than 4,000 Hz.

By way of some non-limiting examples, the "Feel" aspect includes one or more of:

Measuring human pulse, which is typically in a range of 40 beats per minute and above. Such measurement needs analyzing vibrations at a frequency of 1 Hertz and even somewhat less. When such analyzing is performed by analyzing image frames of a video sequence, it is sufficient to analyze image frames at approximately double the rate of the frequency being measured, that is, for example, approximately 2 frames per second or above.

Measuring thrill, which is typically in a range of 50-250 Hertz or 50-750 Hertz. When such analyzing is performed by analyzing image frames of a video sequence, it is sufficient to analyze image frames at approximately double the rate of the frequency being measured, that is, for example, approximately 100 frames per second or above.

Analyzing and quantifying a power spectrum of the vibrations, for example as described above with reference to FIGS. 22A and 22B.

In some embodiments, the "Look, Listen and Feel" is performed without physically touching the patient, by image analysis and/or by using a specific mode of lighting.

Figure 23:
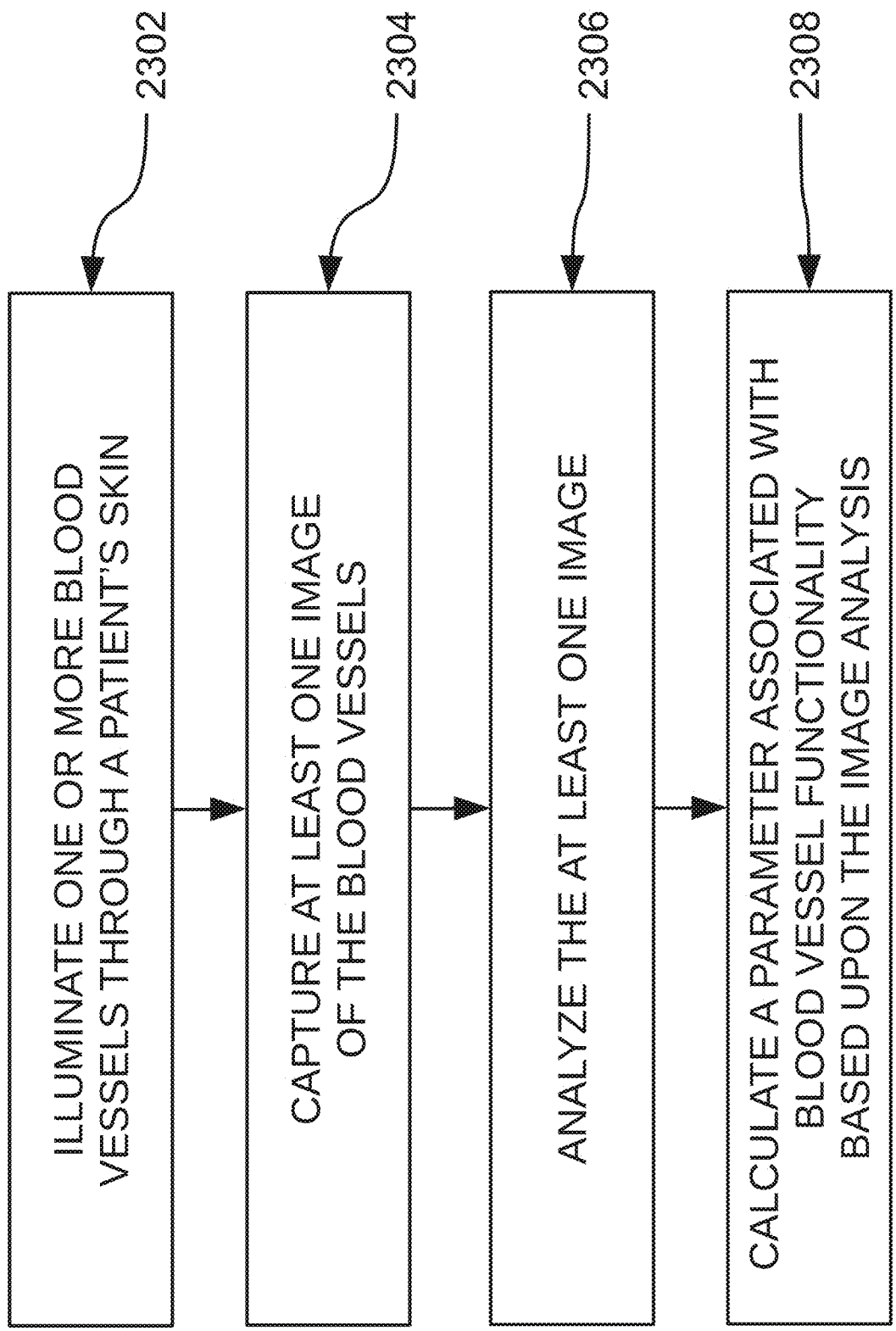
FIG. 23 is a simplified flow chart illustration of a method for monitoring blood vessel functionality according to an example embodiment of the invention.

Reference is now made to FIG. 23, which is a simplified flow chart illustration of a method for monitoring blood vessel functionality according to an example embodiment of the invention.

The method of FIG. 23 includes:
illuminating one or more blood vessels through a patient's skin (2302);
capturing at least one image of the blood vessels (2304);
analyzing the at least one image (2306); and
calculating a parameter associated with blood vessel functionality based upon the image analysis (2308).

Figure 24:
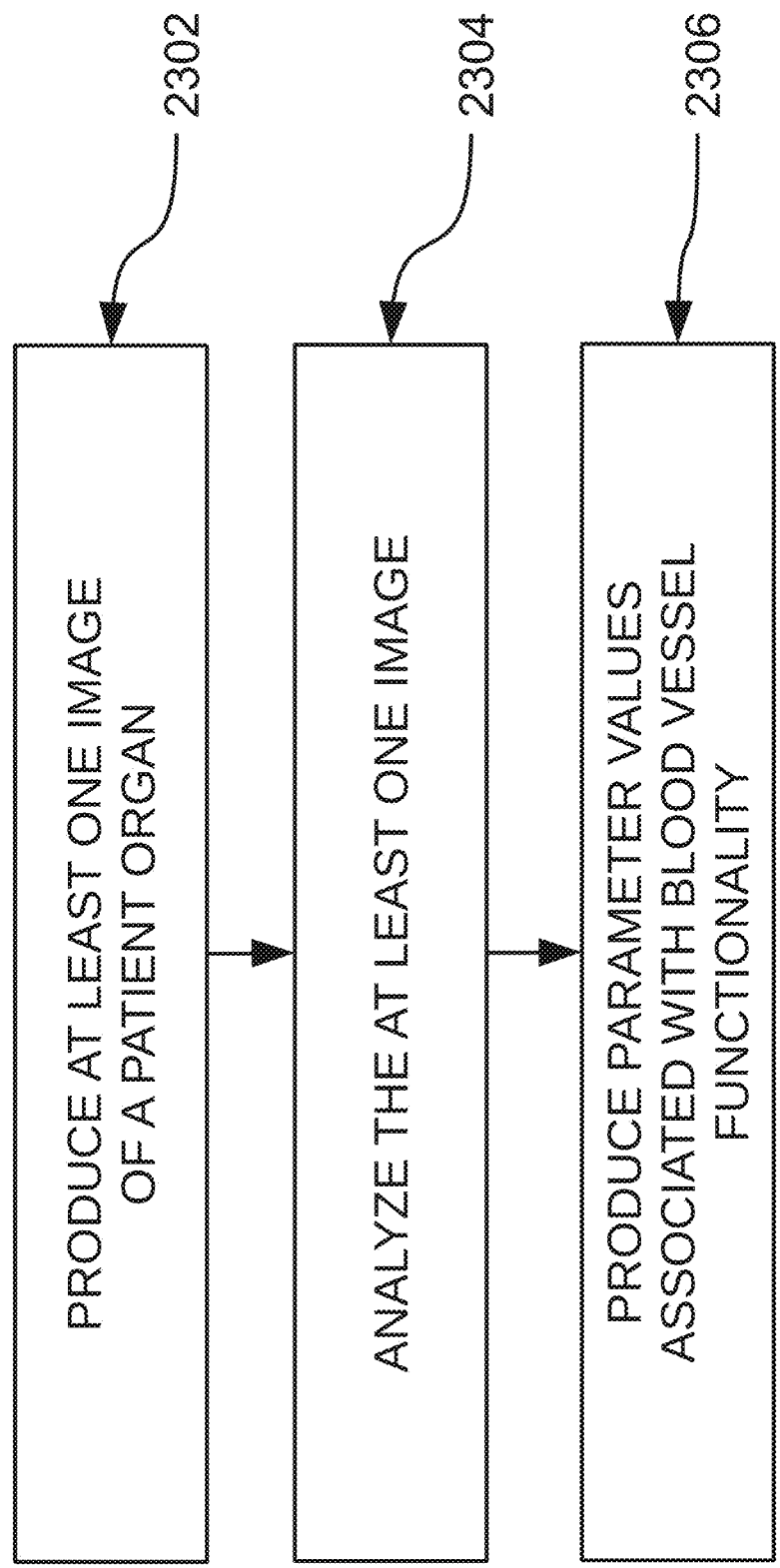
FIG. 24 is a simplified flow chart illustration of a method for replacing a physical examination performed by medical staff for monitoring blood vessel functionality according to an example embodiment of the invention.

Reference is now made to FIG. 24, which is a simplified flow chart illustration of a method for replacing a physical examination performed by medical staff for monitoring blood vessel functionality according to an example embodiment of the invention.

The method of FIG. 24 includes:
producing at least one image of a patient organ (2402);
analyzing the at least one image (2404); and
producing parameter values associated with blood vessel functionality (2406).

Although particular implementations have been disclosed herein in detail, this has been done by way of example for purposes of illustration only, and is not intended to be limiting with respect to the scope of the claims which follow. In particular, it is contemplated that various substitutions, alterations, and modifications may be made without departing from the spirit and scope of the disclosure as defined by the claims. Other aspects, advantages, and modifications are considered to be within the scope of the following claims. The claims presented are representative of the implementations and features disclosed herein. Other unclaimed implementations and features are also contemplated. Accordingly, other implementations are within the scope of the following claims.

It is expected that during the life of a patent maturing from this application many relevant image processing algorithms will be developed and the scope of the term image processing is intended to include all such new technologies a priori.

As used herein with reference to quantity or value, the term "approximately" means "within ±15% of".

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety

What is claimed is:

1. A method for monitoring vascular access in patients undergoing hemodialysis treatments by an automatic look, listen and feel examination, the method comprising:
   using a system for monitoring blood vessel functionality to look, listen and feel blood vessel functionality by:
   illuminating a patient's body with at least one illuminator;
   imaging said patient's body to capture both speckle imaging and visual images from the illumination of the patient's body;
   obtaining a shape of at least one of a vascular access (VA) and a body organ at or near a location of said VA in the patient's body using image analysis of said visual images; and
   analyzing vibrations of the patient's body at said location in the patient's body which includes blood vessels using image analysis of said speckle imaging,
   wherein the system automatically performs the look, listen and feel examination of the patient's body by:
   implementing the look by image analysis of said visual images obtained by the imaging;
   implementing the listen by the analyzing vibrations, at human audible frequencies, by image analysis of the speckle imaging obtained by the imaging; and
   implementing the feel by the analyzing vibrations, at frequencies extending to below human audible frequencies, by image analysis of the speckle imaging obtained by the imaging.

2. The method according to claim 1 wherein two or more features extracted from the look, the listen and the feel are combined to classify a condition of the VA.

3. The method according to claim 1 wherein a classifier based on machine learning is used to classify a condition of the VA.

4. The method according to claim 1 wherein the implementing the listening to the patient's body by the analyzing vibrations of the patient's body comprises analyzing vibrations at frequencies above 80 Hz.

5. The method according to claim 1 wherein:
   one or more parameters associated with blood vessel functionality are calculated based upon the image analysis of said visual images and/or of said speckle imaging; and
   an estimation of a probability of failure of the blood vessel's functionality is calculated based on the one or more parameters.

6. The method according to claim 1 wherein the analyzing vibrations of the patient's body comprises analyzing movement of patterns at a specific location in images of said speckle imaging of the location in the patient's body which includes the blood vessels.

7. The method according to claim 1 wherein the analyzing vibrations of the patient's body at said human audible frequencies and/or said frequencies extending to below human audible frequencies is done by analyzing images of said speckle imaging captured at a frame rate greater than 150 Frames Per Second (FPS).

8. The method according to claim 1 used instead of a medical practitioner performing said look listen and feel examination.

9. The method according to claim 1 wherein the system is configured to provide feedback on correct performance of the look, listen and feel examination.

10. The method according to claim 1 wherein the monitoring comprises classifying a maturity level of said VA in the patient's body.

11. The method according to claim 1, wherein said at least one illuminator is configured to project light in at least two out of three modes of projecting light: uniform illumination, structured light illumination and spot illumination.

12. The method according to claim 1 wherein obtaining the shape of the at least one of the VA and the body organ at or near the location of the VA in the patient's body comprises calculating a three-dimensional (3D) shape of a patient's fistula.

13. The method according to claim 12 wherein a rate of evacuation of a patient's fistula is calculated based on changes in the 3D shape of the patient's fistula.

14. The method according to claim 13, performed during an elevation test.

15. A system for monitoring blood vessel functionality in a patient's body, comprising:
- at least one illuminator configured to project light in at least two out of three modes of projecting light: uniform illumination, structured light illumination and spot illumination;
- at least one camera configured to image a location to capture both speckle imaging and visual images, where the illuminator is configured to illuminate for both speckle imaging and visual images; and
- a processor configured to process said speckle imaging and visual images captured by the camera to extract data regarding shape from said visual images and data regarding vibration obtained from said speckle imaging,
- wherein the processor is configured to: implement a look examination to the patient's body by image analysis of said visual images; implement a listen examination to the patient's body by analyzing vibrations obtained by image analysis of said speckle imaging at human audible frequencies; and
- implement a feel examination to the patient's body by analyzing vibrations obtained by image analysis of said speckle imaging at frequencies extending to below human audible frequencies.

16. The system according to claim 15 wherein the camera comprises a camera capable of capturing images at a frame rate greater than 150 Frames Per Second (FPS).

17. The system according to claim 15 wherein the illuminator comprises a light source in Near Infra-Red wavelengths.

18. The system according to claim 15 wherein the illuminator and the camera are packed in one container.

* * * * *